(12) United States Patent
Wu et al.

(10) Patent No.: US 10,626,511 B2
(45) Date of Patent: Apr. 21, 2020

(54) NANOELECTRODES FOR WATER SPLITTING

(71) Applicant: University of Southern California, Los Angeles, CA (US)

(72) Inventors: Wei Wu, Los Angeles, CA (US); Yifei Wang, Los Angeles, CA (US)

(73) Assignee: UNIVERSITY OF SOUTHERN CALIFORNIA, Los Angeles, CA (US)

(*) Notice: Subject to any disclaimer, the term of this patent is extended or adjusted under 35 U.S.C. 154(b) by 137 days.

(21) Appl. No.: 15/605,805

(22) Filed: May 25, 2017

(65) Prior Publication Data
US 2017/0342577 A1 Nov. 30, 2017

Related U.S. Application Data

(60) Provisional application No. 62/341,427, filed on May 25, 2016.

(51) Int. Cl.
| | |
|---|---|
| *C25B 11/04* | (2006.01) |
| *C25B 1/10* | (2006.01) |
| *B01J 19/08* | (2006.01) |
| *C25B 13/04* | (2006.01) |

(52) U.S. Cl.
CPC ......... *C25B 11/0415* (2013.01); *B01J 19/088* (2013.01); *C25B 1/10* (2013.01); *C25B 13/04* (2013.01); *B01J 2219/0809* (2013.01); *B01J 2219/0841* (2013.01); *B01J 2219/0843* (2013.01); *B01J 2219/0877* (2013.01); *Y02E 60/366* (2013.01)

(58) Field of Classification Search
CPC ............... C25B 1/02–10; C25B 1/003; C25B 11/041–0421; C25B 13/04
See application file for complete search history.

(56) References Cited

U.S. PATENT DOCUMENTS

| | | | |
|---|---|---|---|
| 2008/0116080 A1* | 5/2008 | Lal | C25B 1/003 205/334 |
| 2008/0296173 A1* | 12/2008 | Mishra | C25B 1/02 205/742 |

OTHER PUBLICATIONS

Ma et al.. Ion Accumulation and Migration Effects on Redox Cycling in Nanopore Electrode Arrays at Low Ionic Strength. ACS Nano 10, 3658-3664 (2016), (Year: 2016).*
Zoulias et al., A review on water electrolysis. TCJST 4, 41-71 (2004).
de Souza et al., Electrochemical hydrogen production from water electrolysis using ionic liquid as electrolytes: Towards the best device. Journal of Power Sources 164, 792-798 (2007).
Leroy et al., Industrial water electrolysis: Present and future. International Journal of Hydrogen Energy 8, 401-417 (1983).
Ma et al., Redox Cycling on Recessed Ring-Disk Nanoelectrode Arrays in the Absence of Supporting Electrolyte. Journal of the American Chemical Society 136, 7225-7228 (2014).
(Continued)

*Primary Examiner* — Nicholas A Smith
(74) *Attorney, Agent, or Firm* — Linda B. Huber; Nixon Peabody LLP

(57) ABSTRACT

In various embodiments, the invention teaches a method for water splitting with much higher efficiency than previous methods. By decreasing the distance between two electrodes to nanometer scale, even shorter than the electric field screening length, the external power required for water splitting is significantly reduced.

21 Claims, 60 Drawing Sheets
(23 of 60 Drawing Sheet(s) Filed in Color)

(56) References Cited

OTHER PUBLICATIONS

Chen et al., Redox Cycling in Nanogap Electrochemical Cells. The Role of Electrostatics in Determining the Cell Response. The Journal of Physical Chemistry C 120, 17251-17260 (2016).
Xiong et al., Ion Transport within High Electric Fields in Nanogap Electrochemical Cells. ACS Nano 9, 8520-8529 (2015).
Ma et al., Ion Accumulation and Migration Effects on Redox Cycling in Nanopore Electrode Arrays at Low Ionic Strength. ACS Nano 10, 3658-3664 (2016).
Fu et al., Electrochemistry at single molecule occupancy in nanopore-confined recessed ring-disk electrode arrays. Faraday Discuss. (2016).
Laegreid et al., Sputtering Yields of Metals for Ar+ and Ne+ Ions with Energies from 50 to 600 ev. Journal of Applied Physics 32, 365 (1961).
Wang et al., Low DC-bias silicon nitride anisotropic etching. Journal of Vacuum Science & Technology B, Nanotechnology and Microelectronics: Materials, Processing, Measurement, and Phenomena 33, 06FA01 (2015).
Takeno et al., Atlas of Eh-pH diagrams. Geological survey of Japan open file report 419, 102 (2005).
Diaz-Morales et al., Electrochemical water splitting by gold: evidence for an oxide decomposition mechanism. Chemical Science 4, 2334 (2013).
Pashley et al., De-Gassed Water Is a Better Cleaning Agent. The Journal of Physical Chemistry B 109, 1231-1238 (2005).
Oesch et al., Electrochemical study of gold electrodes with anodic oxide films—I. Formation and reduction behaviour of anodic oxides on gold. Electrochimica Acta 28, 1237-1246 (1983).
Rossmeisl et al., Electrolysis of water on (oxidized) metal surfaces. Chemical Physics 319, 178-184 (2005).
Joshi et al., Microscopic analysis for water stressed by high electric fields in the prebreakdown regime. Journal of Applied Physics 96, 3617 (2004).
Gao et al., J. Surface-enhanced Raman scattering at gold electrodes: dependence on electrochemical pretreatment conditions and comparisons with silver. Journal of Electroanalytical Chemistry and Interfacial Electrochemistry 233, 211-222 (1987).
Yeo et al., Identification of Hydroperoxy Species as Reaction Intermediates in the Electrochemical Evolution of Oxygen on Gold. ChemPhysChem n/a-n/a (2010).
Hao et al., Electrochemical corrosion behaviors of ITO films at anodic and cathodic polarization in sodium hydroxide solution. in 1-4 (IEEE, 2008).
Matsumoto et al., Electrocatalytic properties of transition metal oxides for oxygen evolution reaction. Materials Chemistry and Physics 14, 397-426 (1986).
Chen et al., Atomic layer-deposited tunnel oxide stabilizes silicon photoanodes for water oxidation. Nature Materials 10, 539-544 (2011).
Bao, Photoelectrochemical water splitting: A new use for bandgap engineering. Nature Nanotechnology 10, 19-20 (2015).
Lohrengel et al., Electrochemical properties of anodic gold oxide layers—I. Electrochimica Acta 21, 957-965 (1976).
Conway et al., Electrochemistry of the nickel-oxide electrode—V. Self-passivation effects in oxygen-evolution kinectics. Electrochimica Acta 14, 677-694 (1969).
Lu et al., Electrochemical-Ellipsometric Studies of Oxide Film Formed on Nickel during Oxygen Evolution. Journal of the Electrochemical Society 125, 1416 (1978).

* cited by examiner

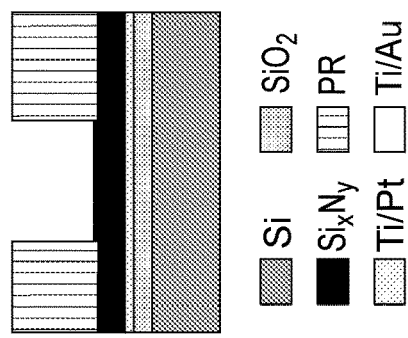
FIG. 10D
4. Photolithography
Legend: Si, SiO₂, Si$_x$N$_y$, PR, Ti/Pt, Ti/Au
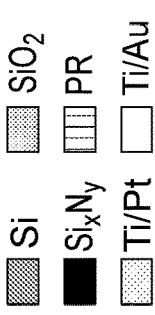
FIG. 10C
3. PECVD silicon nitride
FIG. 10G
7. Silicon nitride etching
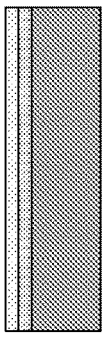
FIG. 10B
2. Cathode metal evaporation
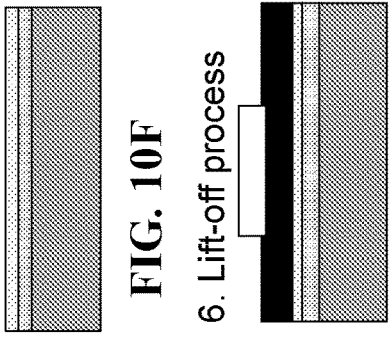
FIG. 10F
6. Lift-off process
FIG. 10A
1. Thermal oxidation
FIG. 10E
5. Anode metal evaporation

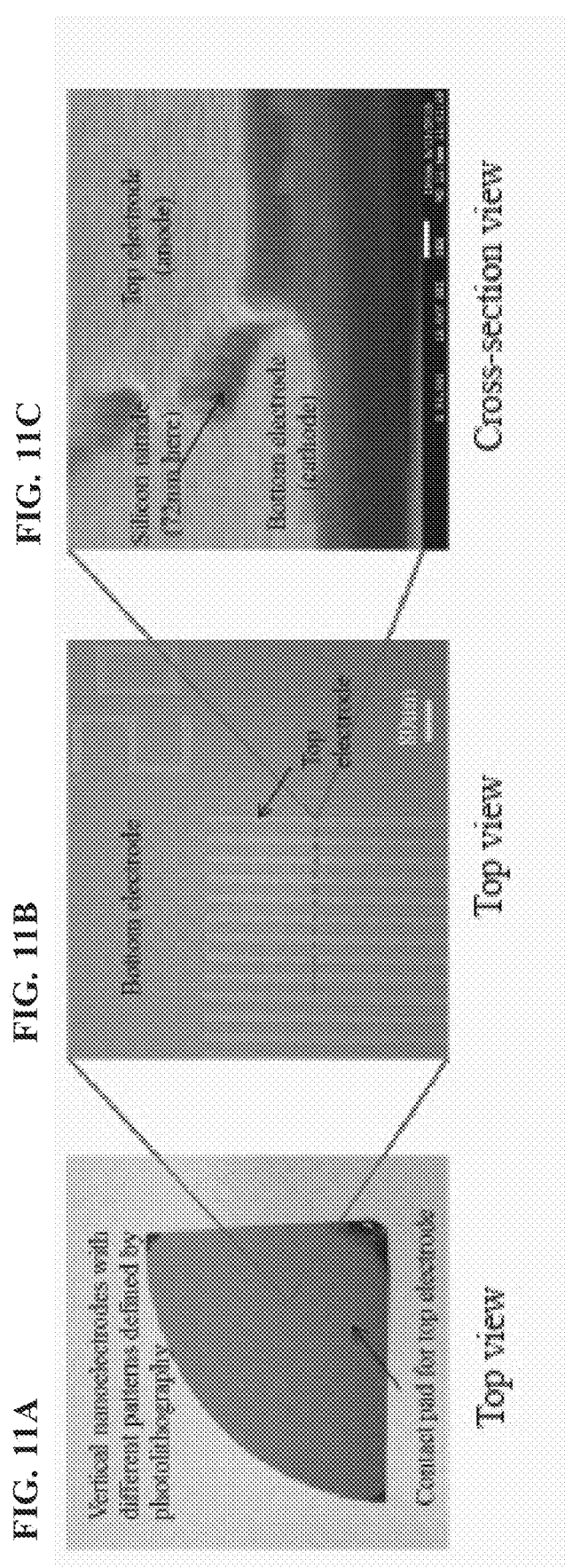

Thinner SiN will be more likely to get short-circuit at the beginning.
Due to sputtered nano metal pieces at the beginning Sometimes, plateaus around 2V in first several tests, so that two periods....

Plateaus smoothen gradually. This is due to bubbles.

two periods

Smaller gap, and smaller half-pitch => more likely to get negative resistance and plateaus. Nanobubbles have big effect on small gaps, and less effect on larger gaps.

One sample with larger pitch

One sample with smaller pitch

Surface states change: Au oxidation. So bubbles will be easier to form and leave.

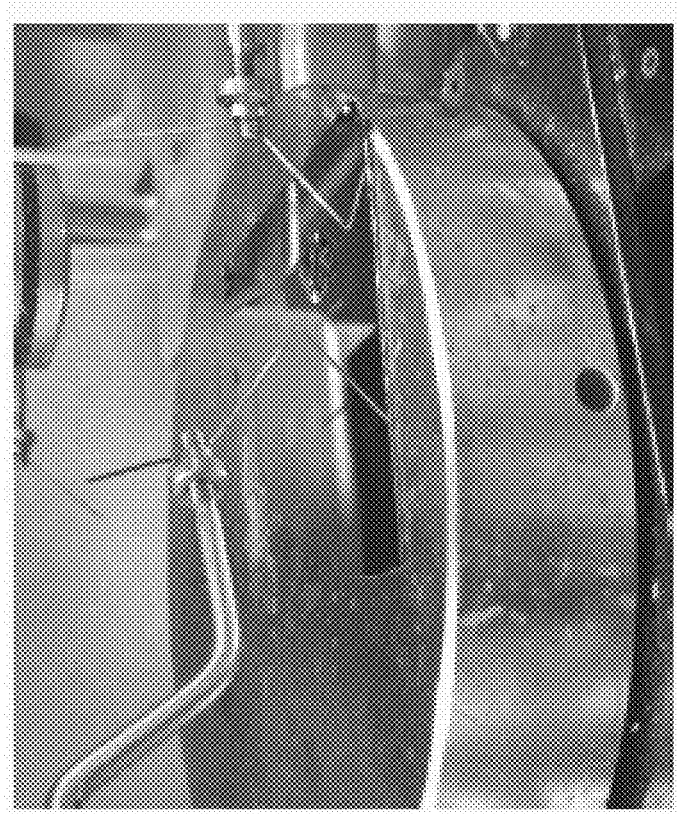
FIG. 27A Before first test
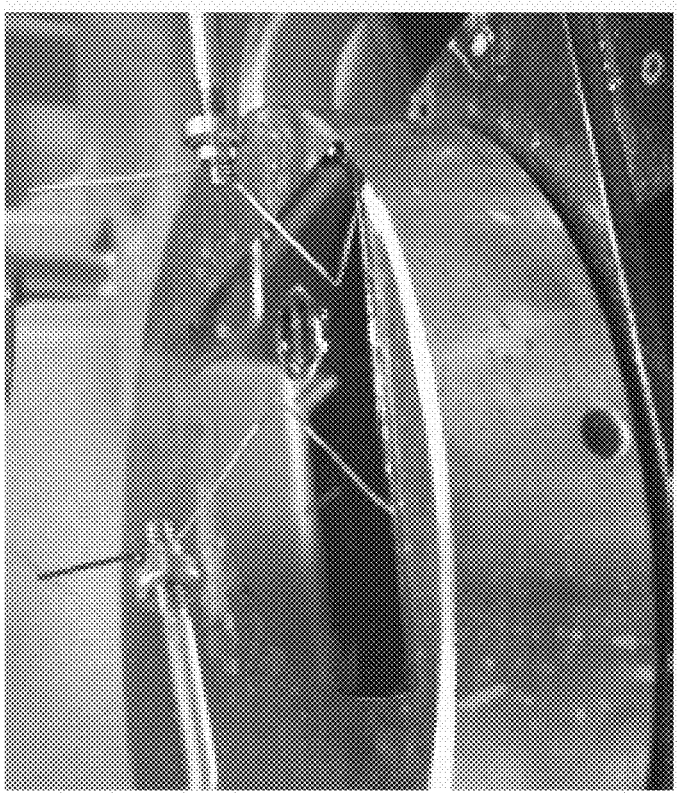
FIG. 27B After first test

- Au electrochemically oxidized after several tests.
- For thicker samples, the damages were fewer and smaller than the thinner silicon nitride samples.
- TiO2 layer protection. Or use ITO as electrode materials.
- New design to connect all these "end"s can reduce the damages.

*Sample preparation*

1. Blank Si wafer

2. PECVD silicon nitride at 275° C

3. Patterns defined by photolithography

4. Cr deposited by E-beam evaporation

5. Lift-off process

6. Silicon nitride dry etching by different recipes

Silicon
Silicon nitride
Photoresist
Cr

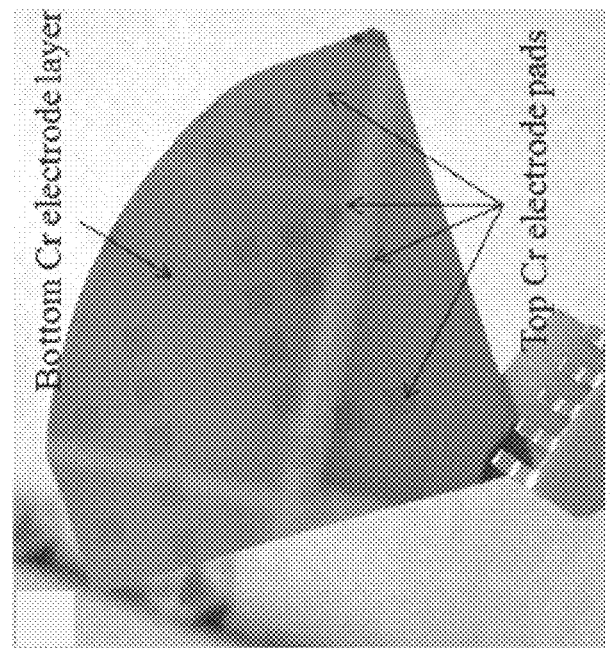 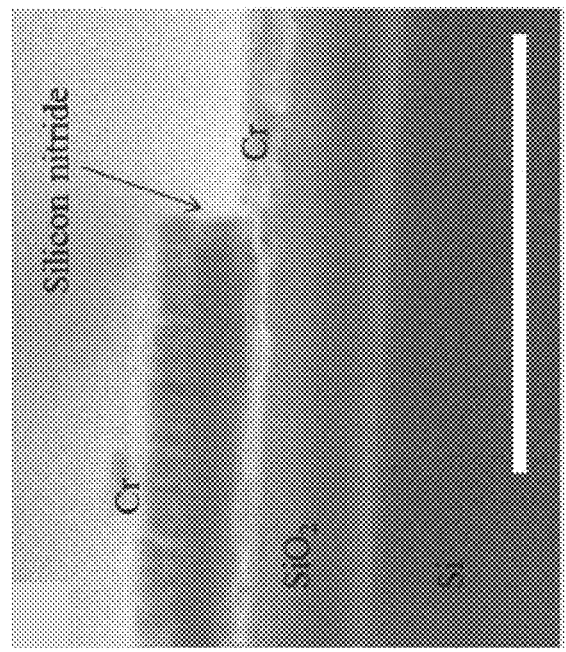
FIG. 38A
FIG. 38B

FIG. 39

Table 1

| Etching parameters | Value |
|---|---|
| SF$_6$ (sccm) | 8 |
| C$_4$F$_8$ (sccm) | 22 |
| C/F ratio | 0.3995 |
| RF power (W) | 6 |
| ICP power (W) | 300 |
| Pressure (mTorr) | 5 |
| DC bias (V) | 34 |
| Etching rate (nm/min) | 40 |

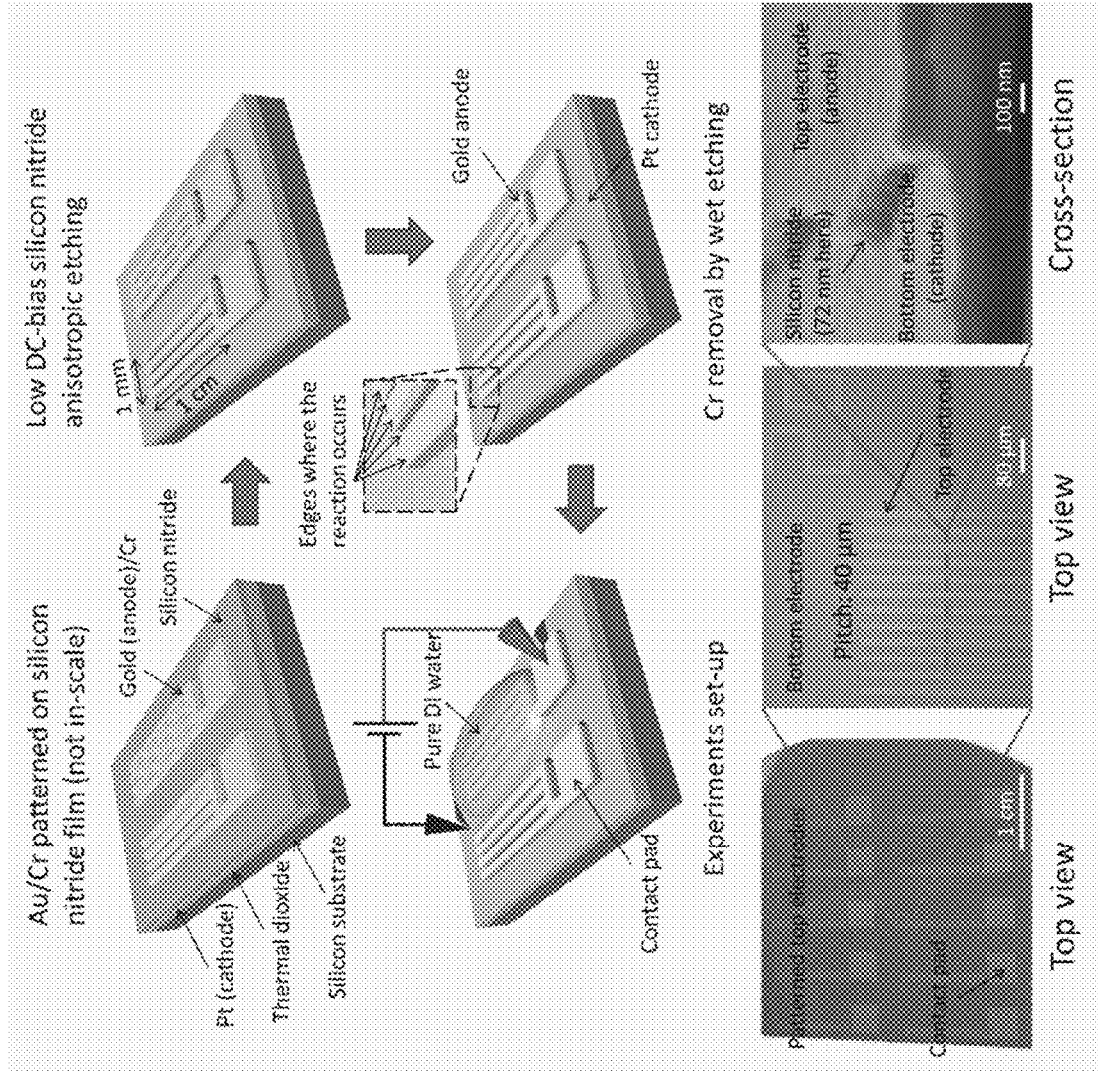

| SF6 (sccm) | 8.0 | C4F8 (sccm) | 10.0 |
| Pressure (mT) | 7.0 | Temp (° C) | 20 |
| Strike RF (W) | 40 | Strike ICP (W) | 2300 |
| Strike Time (s) | 5 | Etch RF (W) | 6 |
| Etch ICP (W) | 2300 | DC Bias (V) | 19-21 |
| Etching Rate | > 80 nm/min | Vertical Sidewalls | |

FIG. 53A
FIG. 53B
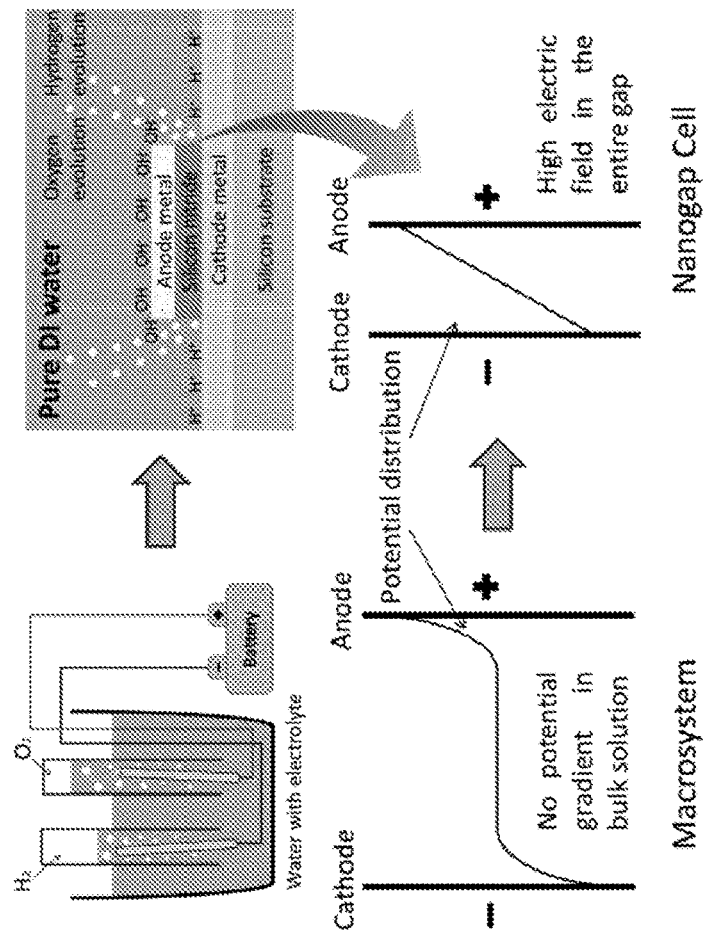
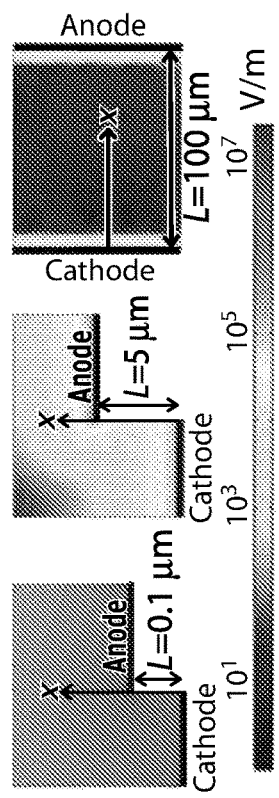

NANOELECTRODES FOR WATER SPLITTING

CROSS-REFERENCE TO RELATED APPLICATIONS

This application claims the benefit under 35 U.S.C. § 119(e) of U.S. Provisional Patent Application No. 62/341,427 filed on May 25, 2016, which is incorporated herein by reference in its entirety.

FIELD OF THE INVENTION

The present invention generally relates to the field of electrochemistry.

BACKGROUND

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

As a sustainable carbon-free clean energy, hydrogen generation has drawn increasing attention in recent years. Industrial approaches for hydrogen generation mainly include steam-reforming and water electrolysis. Steam-reforming technology utilizes natural gas as source, and therefore greenhouse gases will be generated. Water electrolysis does not have such problems. However, it has much lower efficiency due to the relatively high amount of external power needed. That is because Ohmic loss resulting from water resistivity between two electrodes will be very large, especially when current density is increasing. Meanwhile, many researches are focusing on photolysis water splitting, especially its material catalysis technology. However, it is still relatively inefficient for industrial applications and has only been applied in a laboratory setting.

There is clearly a need in the art for improved compositions, systems, articles of manufacture, and methods for facilitating water electrolysis and similar processes.

SUMMARY OF THE INVENTION

The following embodiments and aspects thereof are described and illustrated in conjunction with systems, compositions, articles of manufacture, and methods which are meant to be exemplary and illustrative, not limiting in scope.

In various embodiments, the present invention provides a system comprising an anode and a cathode, wherein the anode and the cathode are separated by a distance of 10 nm-2 μm. In some embodiments, the system further comprises a dielectric material situated between the anode and the cathode, wherein the dielectric material is 10 nm-2 μm thick. In some embodiments, the system has a metal-insulator-metal (MIM) structure. In some embodiments, a portion of the anode is coated with a dielectric material. In some embodiments, the dielectric material comprises silicon nitride. In some embodiments, the cathode comprises a metal. In some embodiments, the cathode comprises a metal, wherein the metal is Ti or Pt, or a combination thereof. In some embodiments, the anode comprises a metal. In some embodiments, the anode comprises a metal, wherein the metal is Ti, Au, Ni, or indium-tin-oxide (ITO), or a combination thereof. In some embodiments, the system further comprises a substrate in contact with the cathode. In some embodiments, the substrate comprises silicon. In some embodiments, the system further comprises water. In some embodiments, the system is a horizontal nanoelectrode system. In some embodiments, the system is a vertical nanoelectrode system.

In various embodiments, the present invention provides a composition comprising an anode, a cathode, a substrate in contact with the cathode, and a dielectric material situated between the anode and the cathode, wherein the dielectric material is 10 nm-2 μm thick.

In various embodiments, the present invention provides a method for generating hydrogen, comprising applying an electric current to a system of the invention so as to create an electric field between the anode and cathode.

In various embodiments, the present invention provides a method for fabricating a nanoelectrode device, comprising: depositing a cathode metal on a substrate to provide a cathode; depositing a dielectric material on said cathode, wherein said dielectric material is 10 nm-2 μm thick; depositing an anode metal on said dielectric material to provide an anode; and etching the dielectric material. In some embodiments, the etching comprises using a low-DC bias reactive-ion etching (RIE) process.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments are illustrated in referenced figures. It is intended that the embodiments and figures disclosed herein are to be considered illustrative rather than restrictive.

FIG. 10A-FIG. 10G depicts in accordance with various embodiments of the invention, a diagram of a fabrication process for a composition comprising nanoelectrodes.

FIG. 11A-FIG. 11C depicts in accordance with various embodiments of the invention, results of the fabrication process. The gap between two electrodes was pushed to 37 nm, much smaller than the Debye-length (around 1 μm for pure water). The system used is different from a macro-system, as the mechanism for nanogapped electrodes is field-driven current rather than transportation-driven current. It was demonstrated that higher efficiency could be achieved, even at room temperature, in pure water.

(FIG. 12A) I/V curves of the same pattern with different silicon nitride thickness. Obvious higher efficiency will occur with thinner silicon nitride layers. (FIG. 12B) A few bubbles generated at around 2V. (FIG. 12C) Lots of bubbles generated at around 4V.

FIG. 27A-FIG. 27B depicts in accordance with various embodiments of the invention, hydrophilicity change after first test, partially due to hydrogen/OH bond and residue Au oxidation.

(FIG. 36B) SEM image of a beaklike structure. The scale bar is 500 nm.

FIG. 38A-FIG. 38B depict in accordance with various embodiments of the invention, (FIG. 38A) testing sample with MIM sandwiched-like structures. (FIG. 38B) SEM image of the cross section of a testing sample. The scale bar is 500 nm.

FIG. 39 depicts in accordance with various embodiments of the invention, Table 1 showing parameters of an effective recipe for low DC-bias silicon nitride etching.

(FIG. 40A) Schematic diagram of potential distribution in macrosystem and our sandwiched-like nanogap cells. Schematic diagram of potential distribution comparison between macrosystem and our sandwiched-like nanogap cells. (FIG. 40B) Simulation results to show the electric field distribution (1-D plot and 2-D plot) between two electrodes with gap distance of 0.1 µm (0.1λd, sandwiched-like NEC), 5.0 µm (5λd, sandwiched-like NEC) and 100 µm (macrosystem, plate electrodes).

(FIG. 41A) Pure water electrolysis in macrosystem is self-limited due to the lack of rapid ion transport inside bulk solution. (FIG. 41B) In sodium hydroxide solution, water splitting reaction can keep occurring but is limited by mass transport (mainly diffusion). (FIG. 41C) In nanogap cell, high electric field in the entire gap can couple the two-half reactions together and enhance water ionization and mass transport (mainly migration), leading to efficient pure water splitting limited by electron-transfer, and completely opposite pH-value distribution compared to macrosystem. In nanogap cell, high electric field in the entire gap can enhance water ionization and mass transport (mainly migration), leading to efficient pure water splitting limited by electron-transfer, and completely opposite pH-value distribution compared to that in macrosystem.

FIG. 42A-FIG. 42D depicts in accordance with various embodiments of the invention, fabrication procedures and results of our metal-dielectric-metal sandwiched-like NECs. This fabrication method can be simply applied on large area with high yield. Dimensions: the gap distance between the two electrodes, or thickness of silicon nitride, varied from 37 nm to 1.4 µm; thermal silicon dioxide, 100 nm thick; Pt, 100 nm thick; Ti, 2 nm thick; gold, 40 nm thick; Cr, 10 nm thick; the contact pads were 3.5 mm by 3.5 mm; the grating regions were 1 cm by 1 mm, with different grating pitches from 10 µm to 80 µm.

(FIG. 43A) Linear I-V curves showed larger current generated from smaller gap distances. (FIG. 43B) A voltage plateau around 0.9 V shown on the log I vs. V curves. (FIG. 43C) The plot of electrolysis current vs. gap distance$^{-1}$ at different voltages demonstrated that the pure water splitting was limited by electron-transfer due to the high electric field in the entire gap to enhance mass transport. (FIG. 43D) Bubble generation around 2 V. Sometimes bubble generation were very few, which may result from nanobubbles dissolved into water.

(FIG. 44A) The relationship between electrolysis current at 1.8 V and the number of edges. The number was calculated from the grating pitches since the grating region was fixed with width of 1 mm (each grating line had two edges). (FIG. 44B) Schematic diagram of the mechanisms of the different reaction locations for pure water splitting and water splitting in sodium hydroxide solution. In FIG. 44A, the slope (increased current per edge) from the pure water curve was almost 4 times of the slope from the sodium hydroxide solution curve, indicating much larger contribution to electrolysis current from field-driven effect than from diffusion effect. The extrapolated intercept value 0.32 mA of sodium hydroxide solution indicated the nature of entire surface involved into the reaction. For pure water, the background current 0.031 mA was much smaller, probably resulting from capacitive current or ionic impurities.

(FIG. 51A) Large droplet provided large current. (FIG. 51B) Bubbles formed at non-grating region. The devices were with 72 nm gap distance.

FIG. 53A-FIG. 53B depict in accordance with various embodiments of the invention, high electric field distributed in the entire gap between anode and cathode in NECs. FIG. 53A schematic diagram of potential distribution in macrosystem and our sandwiched-like nanogap cells. FIG. 53B simulation results to show the electric field distribution (1-D plot and 2-D plot) between two electrodes with gap distance of 37 nm (minimum experimentally achieved value), 0.1 µm (deep-sub-Debye-length, sandwiched-like NEC), 5.0 µm (comparable to Debye-length, sandwiched-like NEC) and 100 µm (macrosystem, plate electrodes).

FIG. 54A the relationship between electrolysis current at 1.8 V and the number of edges. The number was calculated from the grating pitches since the width of the grating region was fixed to 1 mm (each grating line had two edges). FIG. 54B schematic diagram of the mechanisms showing the different reaction locations in pure water splitting and water splitting in sodium hydroxide solution.

FIG. 55A shows a vertical nanoelectrode device in which two conductive layers as anode and cathode, in which there is a dielectric layer located between the anode and the cathode. The thickness of the dielectric layer is only nanometers thick (e.g., 5 nm-5 μm) and the whole structure is a sandwich-like structure. The thickness of the dielectric material layer is what establishes the distance (i.e., gap or gap distance) between the cathode and the anode, and this distance is in the nanometer scale (e.g., 5 nm-5 μm). FIG. 55B shows a horizontal nanoelectrode system in which both cathode and anode are fabricated in the same plane. The whole structure is comb-like structure and the space (i.e. gap or gap distance) between each finger-pair is in nanometer scale (e.g., 10 nm-5 μm).

DETAILED DESCRIPTION OF THE INVENTION

Figure 1:
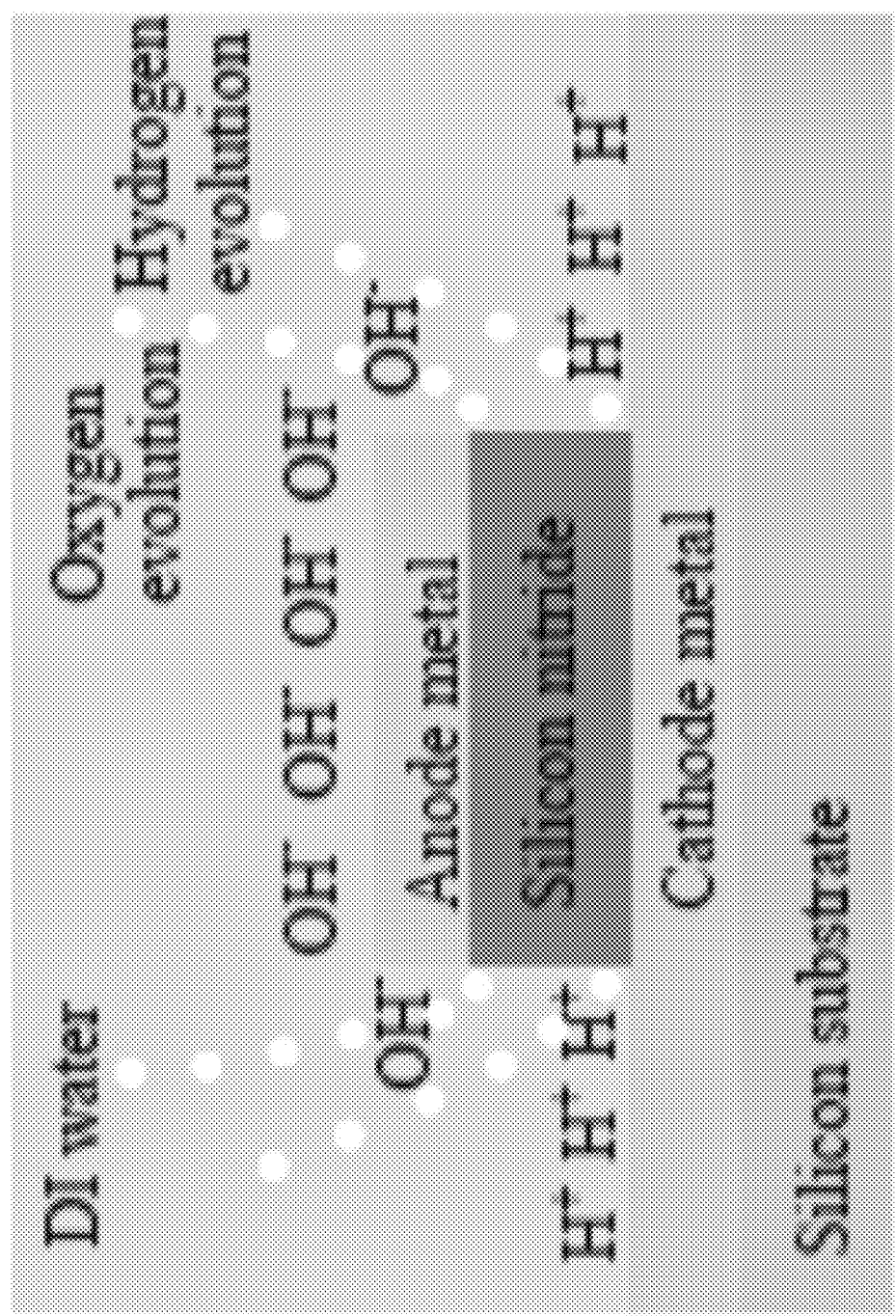
FIG. 1 depicts in accordance with various embodiments of the invention, water electrolysis by nanoelectrodes. The thickness of silicon nitride is controlled to reduce the distance between two electrodes.

All references cited herein are incorporated by reference in their entirety as though fully set forth. Unless otherwise defined, all technical and scientific terms used herein have the same meaning as commonly understood by one of ordinary skill in the art to which this invention belongs.

One skilled in the art will recognize many methods and materials similar or equivalent to those described herein, which could be used in the practice of the present invention. Other features and advantages of the invention will become apparent from the following detailed description, taken in conjunction with the accompanying drawings, which illustrate, by way of example, various features of embodiments of the invention. Indeed, the present invention is in no way limited to the methods and materials described. For convenience, certain terms employed herein, in the specification, examples and appended claims are collected here.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this invention belongs. It should be understood that this invention is not limited to the particular methodology, protocols, and reagents, etc., described herein and as such can vary. The definitions and terminology used herein are provided to aid in describing particular embodiments, and are not intended to limit the claimed invention, because the scope of the invention is limited only by the claims.

As used herein the term "comprising" or "comprises" is used in reference to compositions, methods, systems, articles of manufacture, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). As used herein, the term "comprising" or "comprises" means that other elements can also be present in addition to the defined elements presented. The use of "comprising" indicates inclusion rather than limitation.

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

"Optional" or "optionally" means that the subsequently described circumstance may or may not occur, so that the description includes instances where the circumstance occurs and instances where it does not.

With the foregoing background in mind, in some embodiments, the invention teaches compositions, systems, articles of manufacture, and methods for water splitting and similar reactions with higher efficiency than previously reported. By decreasing the distance between two electrodes to nanometer scale, even shorter than the electric field screening length, the external power required for water splitting is significantly decreased. The deep-sub-Debye-length nanogapped electrodes systems described in certain embodiments herein, and demonstrated in certain drawings submitted herewith, lead to a high electric field inside the entire gap for enhancement of water molecule ionization, and therefore enhancement of splitting rate, transportation rate and reaction rate. Once $OH^-$ ions are generated near the cathode area, they won't accumulate there to stop the reactions, but move to the anode area under high electric field. In this way, the reactions won't self-stop. Advantageously, the inventive compositions, systems, articles of manufacture, and methods allow for water splitting at room temperature, which cannot be achieved by previous known methods. The inventive nanogapped electrodes systems have a lower overpotential, higher localized concentration, faster transport rate, and larger ionization, which can accelerate the whole reaction of water electrolysis. Different from a macro-system, the inventive systems, especially as described in the "Examples" section and drawings, are based on field-driven current, and therefore can split water even at room temperature, as indicated above. Disclosed herein and depicted in the drawings submitted herewith are both vertical nanoelectrode and horizontal nanoelectrode structures. In some embodiments, the invention also teaches a solution for anode protection during water splitting. Importantly, the technology described in the present application can be applied to most of the water splitting methods, including electrolysis, photolysis, thermolysis, and the like.

The underlying technologies of the compositions, systems, articles of manufacture, and methods can also be applied to many electrochemical industries, including hydrogen production, chlorine production, and sodium hydroxide production, just to name a few.

Hydrogen is a high energy density source, and therefore embodiments of the present invention provide for high energy density storage. The inventive nanogapped electrodes systems can combine with those renewable energy generation methods (e.g., wind electricity generation), to store hydrogen. Then, a fuel cell system can be applied to the generated hydrogen for power generation. Advantageously, by integrating with energy collection technology, embodiments of the invention also allow for a portable device for hydrogen generation.

In various embodiments, nanoelectrodes of the present invention are fabricated by nanofabrication technology, including but limited to the type described and depicted in the drawings submitted herewith and in the "Examples" section.

Figure 55A:
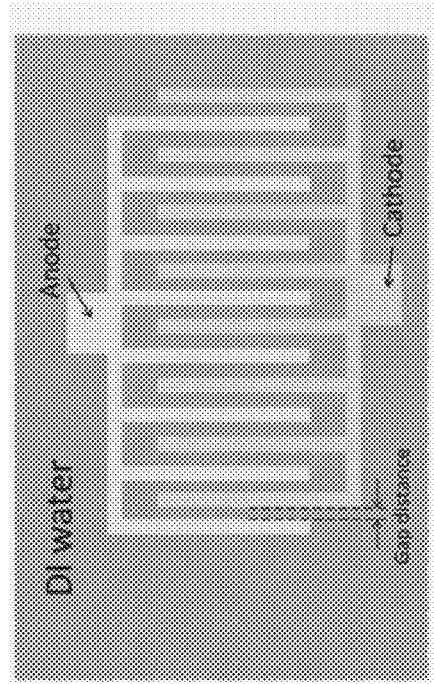
FIG. 55A-FIG. 55B depict in accordance with various embodiments of the invention, a schematic of a vertical nanogap electrode system (vertical nanoelectrode system) and horizontal nanogap electrode system (horizontal nanoelectrode system).
Figure 55B:
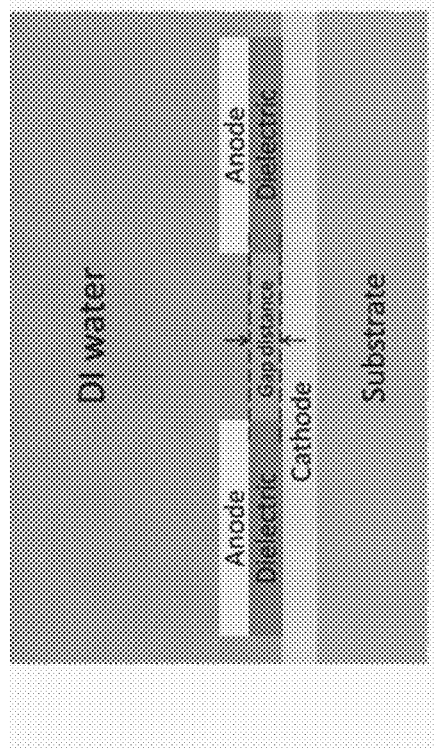

Two general types of nanoelectrode structures are included in the various embodiments described herein (FIG. 55A and FIG. 55B). The first general type is vertical nanoelectrodes, which include two conductive layers as anode and cathode, in which there is a dielectric layer (FIG. 55A). The thickness of the dielectric layer is only nanometers thick (e.g., 5 nm-5 μm) and the whole structure is a sandwich-like structure. The thickness of the dielectric material layer is what establishes the distance (i.e., gap or gap distance) between the cathode and the anode, and this distance is in the nanometer scale (e.g., 5 nm-5 μm). During the fabrication process, in order to avoid short-circuit between two conductive layers low DC-bias dry etching technology is used, as described in greater detail in the "Examples" section. The second general type of nanoelectrode structure is horizontal nanoelectrodes. In this type, both cathode and anode are fabricated in the same plane. The whole structure is comb-like structure and the space (i.e. gap or gap distance) between each finger-pair is in nanometer scale (e.g., 10 nm-5 μm) (FIG. 55B). Experimentation revealed that even the most inert metal gold could not survive as anodes due to electrochemical reactions during water splitting. This effect significantly decreases the lifetime of nanoelectrode devices. As a solution to this problem, the inventors have discovered that indium-tin-oxide (ITO) can be used as anode material because it is at the highest oxidation state and could be oxidized further. Another solution to avoid anode attack is to deposit one ultra-thin dielectric layer (e.g. $TiO_2$) on anodes as a protection layer. Besides ITO replacement and $TiO_2$ layer protection, new methods can be used to avoid anode damage by new design of the electro layout to avoid tip field effects. The energy band of the anode and the dielectric protection layer can be engineered carefully to obtain best match between each other, in order to give higher efficiency. The voltage required based on these nanoelectrode devices is only around 1.5 V, which most portable energy collectors could achieve. Meanwhile, these devices don't require huge setup used in industrial applications, which provides a solution for portable hydrogen generation technology.

In various embodiments, the invention also teaches an effective approach for silicon nitride plasma dry etching, with low DC-bias (self-bias) and vertical sidewalls. Four main factors were considered: capacitively coupled radio frequency power, inductively coupled plasma power, pressure in the etching chamber, and the combination of etching gases. By meticulously controlling these factors, low DC-bias silicon nitride anisotropic etching without argon bombardment was successfully achieved, with DC-bias of only 34 V and etching rate of 40 nm/min (See "Examples" section). The inventive etching protocols described in the "Examples" section can avoid short-circuits effectively when patterning sub-50 nm thick silicon nitride layer as a dielectric layer between two metal layers, such as required for certain embodiments of nanoelectrodes-based systems described herein.

In various embodiments, the invention provides a system that comprises an anode and a cathode. In various embodiments, the invention provides a system that comprises an anode and a cathode, wherein the anode and the cathode are separated by a distance of 10 nm-5 μm. In some embodiments, the invention teaches a system that includes an anode and a cathode, wherein said anode and cathode are separated by a distance of 10 nm-5 μm. In some embodiments, the invention teaches a system that includes an anode and a cathode, wherein said anode and cathode are separated by a distance of 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-0.1 μm, 10 nm-0.2 μm, 10 nm-0.3 μm, 10 nm-0.4 μm, 10 nm-0.5 μm, 10 nm-0.6 μm, 10 nm-0.7 μm, 10 nm-0.8 μm, 10 nm-0.9 μm, 10 nm-1 μm, 10 nm-2 μm, 10 nm-3 μm, 10 nm-4 μm, 10 nm-5 μm, 20 nm-30 nm, 20 nm-40 nm, 20 nm-50 nm, 20 nm-60 nm, 20 nm-70 nm, 20 nm-80 nm, 20 nm-90 nm, 20 nm-0.1 μm, 20 nm-0.2 μm, 20 nm-0.3 μm, 20 nm-0.4 μm, 20 nm-0.5 μm, 20 nm-0.6 μm, 20 nm-0.7 μm, 20 nm-0.8 μm, 20 nm-0.9 μm, 20 nm-1 μm, 20 nm-2 μm, 20 nm-3 μm, 20 nm-4 μm, 20 nm-5 μm, 30 nm-40 nm, 30 nm-50 nm, 30 nm-60 nm, 30 nm-70 nm, 30 nm-80 nm, 30 nm-90 nm, 30 nm-0.1 μm, 30 nm-0.2 μm, 30 nm-0.3 μm, 30 nm-0.4 μm, 30 nm-0.5 μm, 30 nm-0.6 μm, 30 nm-0.7 μm, 30 nm-0.8 μm, 30 nm-0.9 μm, 30 nm-1 μm, 30 nm-2 μm, 30 nm-3 μm, 30 nm-4 μm, or 30 nm-5 μm. In some embodiments, the invention teaches a system that includes an anode and a cathode, wherein said anode and cathode are separated by a distance of 37 nm. In some embodiments, the invention teaches a system that includes an anode and a cathode, wherein said anode and cathode are separated by a distance of 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-150 nm, 10 nm-200 nm, 10 nm-250 nm, 10 nm-300 nm, 10 nm-350 nm, 10 nm-400 nm, 10 nm-450 nm, 10 nm-500 nm, 10 nm-550 nm, 10 nm-600 nm, 10 nm-650 nm, 10 nm-700 nm, 10 nm-750 nm, 10 nm-800 nm, 10 nm-850 nm, 10 nm-900 nm, 10 nm-950 nm, 10 nm-1000 nm, 10 nm-1100 nm, 10 nm-1200 nm, 10 nm-1300 nm, 10 nm-1400 nm, 10 nm-1500 nm, 10 nm-1600 nm, 10 nm-1700 nm, 10 nm-1800 nm, 10 nm-1900 nm, or 10 nm-2000 nm. In some embodiments, the invention teaches a system that includes and anode and a cathode, wherein said anode and cathode are separated by a distance of 10 nm-2 μm. In some embodiments, the invention teaches a system that includes and anode and a cathode, wherein said anode and cathode are separated by a distance of 10 nm-1 μm. In some embodiments, the invention teaches a system that includes and anode and a cathode, wherein said anode and cathode are separated by a distance of 10 nm-500 nm.

In some embodiments, the system further comprises a dielectric material positioned or situated between the anode and the cathode. In some embodiments, the system further includes a dielectric material situated between the anode and cathode. In some embodiments, the dielectric material is 5-100 nm, 100-200 nm, 200-500 nm, 500 nm-5 µm (or more) thick. In some embodiments, the dielectric material thickness is 5 nm-10 nm, 5 nm-20 nm, 5 nm-30 nm, 5 nm-40 nm, 5 nm-50 nm, 5 nm-60 nm, 5 nm-70 nm, 5 nm-80 nm, 5 nm-90 nm, 5 nm-100 nm, 5 nm-200 nm, 5 nm-300 nm, 5 nm-400 nm, 5 nm-500 nm, 5 nm-1 µm, 5 nm-2 µm, 5 nm-3 µm, 5 nm-4 µm, 5 nm-5 µm, 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-200 nm, 10 nm-300 nm, 10 nm-400 nm, 10 nm-500 nm, 10 nm-1 µm, 10 nm-2 µm, 10 nm-3 µm, 10 nm-4 µm, 10 nm-5 µm, 20 nm-30 nm, 20 nm-40 nm, 20 nm-50 nm, 20 nm-60 nm, 20 nm-70 nm, 20 nm-80 nm, 20 nm-90 nm, 20 nm-100 nm, 20 nm-200 nm, 20 nm-300 nm, 20 nm-400 nm, 20 nm-500 nm, 20 nm-1 µm, 20 nm-2 µm, 20 nm-3 µm, 20 nm-4 µm, 20 nm-5 µm, 30 nm-40 nm, 30 nm-50 nm, 30 nm-60 nm, 30 nm-70 nm, 30 nm-80 nm, 30 nm-90 nm, 30 nm-100 nm, 30 nm-200 nm, 30 nm-300 nm, 30 nm-400 nm, 30 nm-500 nm, 30 nm-1 µm, 30 nm-2 µm, 30 nm-3 µm, 30 nm-4 µm or 30 nm-5 µm. In some embodiments, the system further includes a dielectric material situated between the anode and cathode, wherein the dielectric material thickness is 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-150 nm, 10 nm-200 nm, 10 nm-250 nm, 10 nm-300 nm, 10 nm-350 nm, 10 nm-400 nm, 10 nm-450 nm, 10 nm-500 nm, 10 nm-550 nm, 10 nm-600 nm, 10 nm-650 nm, 10 nm-700 nm, 10 nm-750 nm, 10 nm-800 nm, 10 nm-850 nm, 10 nm-900 nm, 10 nm-950 nm, 10 nm-1000 nm, 10 nm-1100 nm, 10 nm-1200 nm, 10 nm-1300 nm, 10 nm-1400 nm, 10 nm-1500 nm, 10 nm-1600 nm, 10 nm-1700 nm, 10 nm-1800 nm, 10 nm-1900 nm, or 10 nm-2000 nm. In some embodiments, the system further includes a dielectric material situated between the anode and cathode, wherein the dielectric material thickness is 10 nm-2 µm. In some embodiments, the system further includes a dielectric material situated between the anode and cathode, wherein the dielectric material thickness is 10 nm-1 µm. In some embodiments, the system further includes a dielectric material situated between the anode and cathode, wherein the dielectric material thickness is 10 nm-500 nm.

In certain embodiments, a portion of the anode is coated with a dielectric material. In some embodiments, the dielectric material of the system includes silicon nitride. In some embodiments, the cathode of the system includes Ti and/or Pt. In certain embodiments, the anode of the system includes indium-tin-oxide (ITO). In some embodiments, the anode of the system includes Ti and/or Au, or Ni. In some embodiments, the system further includes a layer of silicon substrate in contact with the cathode. In some embodiments, the system, with or without a layer of dielectric material between the anode and cathode, further includes water.

In some embodiments, the invention teaches an article of manufacture that comprises an anode and a cathode. In some embodiments, the invention teaches an article of manufacture that comprises an anode and a cathode, wherein said anode and cathode are separated by a distance of 10 nm-5 µm. In some embodiments, the invention teaches an article of manufacture that includes an anode and a cathode, wherein said anode and cathode are separated by a distance of 10 nm-5 µm. In some embodiments, the invention teaches an article of manufacture that includes an anode and a cathode, wherein said anode and cathode are separated by a distance of 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-0.1 µm, 10 nm-0.2 µm, 10 nm-0.3 µm, 10 nm-0.4 µm, 10 nm-0.5 µm, 10 nm-0.6 µm, 10 nm-0.7 µm, 10 nm-0.8 µm, 10 nm-0.9 µm, 10 nm-1 µm, 10 nm-2 µm, 10 nm-3 µm, 10 nm-4 µm, 10 nm-5 µm, 20 nm-30 nm, 20 nm-40 nm, 20 nm-50 nm, 20 nm-60 nm, 20 nm-70 nm, 20 nm-80 nm, 20 nm-90 nm, 20 nm-0.1 µm, 20 nm-0.2 µm, 20 nm-0.3 µm, 20 nm-0.4 µm, 20 nm-0.5 µm, 20 nm-0.6 µm, 20 nm-0.7 µm, 20 nm-0.8 µm, 20 nm-0.9 µm, 20 nm-1 µm, 20 nm-2 µm, 20 nm-3 µm, 20 nm-4 µm, 20 nm-5 µm, 30 nm-40 nm, 30 nm-50 nm, 30 nm-60 nm, 30 nm-70 nm, 30 nm-80 nm, 30 nm-90 nm, 30 nm-0.1 µm, 30 nm-0.2 µm, 30 nm-0.3 µm, 30 nm-0.4 µm, 30 nm-0.5 µm, 30 nm-0.6 µm, 30 nm-0.7 µm, 30 nm-0.8 µm, 30 nm-0.9 µm, 30 nm-1 µm, 30 nm-2 µm, 30 nm-3 µm, 30 nm-4 µm, or 30 nm-5 µm. In some embodiments, the invention teaches an article of manufacture that includes an anode and a cathode, wherein said anode and cathode are separated by a distance of 37 nm. In some embodiments, the invention teaches an article of manufacture that includes an anode and a cathode, wherein said anode and cathode are separated by a distance of 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-150 nm, 10 nm-200 nm, 10 nm-250 nm, 10 nm-300 nm, 10 nm-350 nm, 10 nm-400 nm, 10 nm-450 nm, 10 nm-500 nm, 10 nm-550 nm, 10 nm-600 nm, 10 nm-650 nm, 10 nm-700 nm, 10 nm-750 nm, 10 nm-800 nm, 10 nm-850 nm, 10 nm-900 nm, 10 nm-950 nm, 10 nm-1000 nm, 10 nm-1100 nm, 10 nm-1200 nm, 10 nm-1300 nm, 10 nm-1400 nm, 10 nm-1500 nm, 10 nm-1600 nm, 10 nm-1700 nm, 10 nm-1800 nm, 10 nm-1900 nm, or 10 nm-2000 nm. In some embodiments, the invention teaches an article of manufacture that includes an anode and a cathode, wherein said anode and cathode are separated by a distance of 10 nm-2 µm. In some embodiments, the invention teaches an article of manufacture that includes an anode and a cathode, wherein said anode and cathode are separated by a distance of 10 nm-1 µm. In some embodiments, the invention teaches an article of manufacture that includes an anode and a cathode, wherein said anode and cathode are separated by a distance of 10 nm-500 nm.

In some embodiments, the article of manufacture further comprises a dielectric material situated between the anode and cathode. In some embodiments, the article of manufacture further includes a dielectric material situated between the anode and cathode. In some embodiments, the dielectric material is 5-100 nm, 100-200 nm, 200-500 nm, 500 nm-5 µm (or more) thick. In some embodiments, the dielectric material is 5 nm-10 nm, 5 nm-20 nm, 5 nm-30 nm, 5 nm-40 nm, 5 nm-50 nm, 5 nm-60 nm, 5 nm-70 nm, 5 nm-80 nm, 5 nm-90 nm, 5 nm-100 nm, 5 nm-200 nm, 5 nm-300 nm, 5 nm-400 nm, 5 nm-500 nm, 5 nm-1 µm, 5 nm-2 µm, 5 nm-3 µm, 5 nm-4 µm, 5 nm-5 µm, 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-200 nm, 10 nm-300 nm, 10 nm-400 nm, 10 nm-500 nm, 10 nm-1 µm, 10 nm-2 µm, 10 nm-3 µm, 10 nm-4 µm, 10 nm-5 µm, 20 nm-30 nm, 20 nm-40 nm, 20 nm-50 nm, 20 nm-60 nm, 20 nm-70 nm, 20 nm-80 nm, 20 nm-90 nm, 20 nm-100 nm, 20 nm-200 nm, 20 nm-300 nm, 20 nm-400 nm, 20 nm-500 nm, 20 nm-1 µm, 20 nm-2 µm, 20 nm-3 µm, 20 nm-4 µm, 20 nm-5 µm, 30 nm-40 nm, 30 nm-50 nm, 30 nm-60 nm, 30 nm-70 nm, 30 nm-80 nm, 30 nm-90 nm, 30 nm-100 nm, 30 nm-200 nm, 30 nm-300 nm, 30 nm-400 nm, 30 nm-500 nm, 30 nm-1 µm, 30 nm-2 µm, 30 nm-3 µm, 30 nm-4 µm, or 30 nm-5 µm. In some embodiments, the article of manufacture further includes a dielectric material situated between the anode and cathode, wherein the dielectric material thickness is 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-150 nm, 10 nm-200 nm, 10 nm-250 nm, 10 nm-300 nm, 10 nm-350 nm, 10 nm-400 nm, 10 nm-450 nm, 10 nm-500 nm, 10 nm-550 nm, 10 nm-600 nm, 10 nm-650 nm, 10 nm-700 nm, 10 nm-750 nm, 10 nm-800 nm, 10 nm-850 nm, 10 nm-900 nm, 10 nm-950 nm, 10 nm-1000 nm, 10 nm-1100 nm, 10 nm-1200 nm, 10 nm-1300 nm, 10 nm-1400 nm, 10 nm-1500 nm, 10 nm-1600 nm, 10 nm-1700 nm, 10 nm-1800 nm, 10 nm-1900 nm, or 10 nm-2000 nm. In some embodiments, the article of manufacture further includes a dielectric material situated between the anode and cathode, wherein the dielectric material thickness is 10 nm-2 µm. In some embodiments, the article of manufacture further includes a dielectric material situated between the anode and cathode, wherein the dielectric material thickness is 10 nm-1 µm. In some embodiments, the article of manufacture further includes a dielectric material situated between the anode and cathode, wherein the dielectric material thickness is 10 nm-500 nm.

In certain embodiments, a portion of the anode is coated with a dielectric material. In some embodiments, the dielectric material of the article of manufacture includes silicon nitride. In some embodiments, the cathode of the article of manufacture includes Ti and/or Pt. In certain embodiments, the anode of the article of manufacture includes indium-tin-oxide (ITO). In some embodiments, the anode of the article of manufacture includes Ti and/or Au, or Ni. In some embodiments, the article of manufacture further includes a layer of silicon substrate in contact with the cathode. In some embodiments, the article of manufacture, with or without a layer of dielectric material between the anode and cathode, further includes water.

In various embodiments, the invention teaches a composition that comprises an anode and a cathode. In various embodiments, the invention teaches a composition that comprises an anode, a cathode, and a dielectric material, wherein the dielectric material is positioned between the anode and the cathode. In various embodiments, the invention teaches a composition that includes an anode, a cathode, and a dielectric material situated between the anode and cathode. In some embodiments, the dielectric material is 5-100 nm, 100-200 nm, 200-500 nm, 500 nm-5 µm (or more) thick. In some embodiments, the dielectric material is 5 nm-10 nm, 5 nm-20 nm, 5 nm-30 nm, 5 nm-40 nm, 5 nm-50 nm, 5 nm-60 nm, 5 nm-70 nm, 5 nm-80 nm, 5 nm-90 nm, 5 nm-100 nm, 5 nm-200 nm, 5 nm-300 nm, 5 nm-400 nm, 5 nm-500 nm, 5 nm-1 µm, 5 nm-2 µm, 5 nm-3 µm, 5 nm-4 µm, 5 nm-5 µm, 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-200 nm, 10 nm-300 nm, 10 nm-400 nm, 10 nm-500 nm, 10 nm-1 µm, 10 nm-2 µm, 10 nm-3 µm, 10 nm-4 µm, 10 nm-5 µm, 20 nm-30 nm, 20 nm-40 nm, 20 nm-50 nm, 20 nm-60 nm, 20 nm-70 nm, 20 nm-80 nm, 20 nm-90 nm, 20 nm-100 nm, 20 nm-200 nm, 20 nm-300 nm, 20 nm-400 nm, 20 nm-500 nm, 20 nm-1 µm, 20 nm-2 µm, 20 nm-3 µm, 20 nm-4 µm, 20 nm-5 µm, 30 nm-40 nm, 30 nm-50 nm, 30 nm-60 nm, 30 nm-70 nm, 30 nm-80 nm, 30 nm-90 nm, 30 nm-100 nm, 30 nm-200 nm, 30 nm-300 nm, 30 nm-400 nm, 30 nm-500 nm, 30 nm-1 µm, 30 nm-2 µm, 30 nm-3 µm, 30 nm-4 µm, or 30 nm-5 µm. In some embodiments, the invention teaches a composition that includes an anode, a cathode, and a dielectric material situated between the anode and cathode, wherein the dielectric material thickness is 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-150 nm, 10 nm-200 nm, 10 nm-250 nm, 10 nm-300 nm, 10 nm-350 nm, 10 nm-400 nm, 10 nm-450 nm, 10 nm-500 nm, 10 nm-550 nm, 10 nm-600 nm, 10 nm-650 nm, 10 nm-700 nm, 10 nm-750 nm, 10 nm-800 nm, 10 nm-850 nm, 10 nm-900 nm, 10 nm-950 nm, 10 nm-1000 nm, 10 nm-1100 nm, 10 nm-1200 nm, 10 nm-1300 nm, 10 nm-1400 nm, 10 nm-1500 nm, 10 nm-1600 nm, 10 nm-1700 nm, 10 nm-1800 nm, 10 nm-1900 nm, or 10 nm-2000 nm. In some embodiments, the invention teaches a composition that includes an anode, a cathode, and a dielectric material situated between the anode and cathode, wherein the dielectric material thickness is 10 nm-2 µm. In some embodiments, the invention teaches a composition that includes an anode, a cathode, and a dielectric material situated between the anode and cathode, wherein the dielectric material thickness is 10 nm-1 µm. In some embodiments, the invention teaches a composition that includes an anode, a cathode, and a dielectric material situated between the anode and cathode, wherein the dielectric material thickness is 10 nm-500 nm.

In some embodiments, the dielectric material includes silicon nitride. In some embodiments, the cathode includes Ti and/or Pt. In some embodiments, the anode includes indium-tin-oxide. In certain embodiments, the anode includes Ti and/or Au, or Ni. In some embodiments, the system further includes a layer of silicon substrate in contact with said cathode. In some embodiments, said anode and cathode are separated by a distance of 10 nm-5 µm. In some embodiments, said anode and cathode are separated by a distance of 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-0.1 µm, 10 nm-0.2 µm, 10 nm-0.3 µm, 10 nm-0.4 µm, 10 nm-0.5 µm, 10 nm-0.6 µm, 10 nm-0.7 µm, 10 nm-0.8 µm, 10 nm-0.9 µm, 10 nm-1 µm, 10 nm-2 µm, 10 nm-3 µm, 10 nm-4 µm, 10-5 µm, 20 nm-30 nm, 20 nm-40 nm, 20 nm-50 nm, 20 nm-60 nm, 20 nm-70 nm, 20 nm-80 nm, 20 nm-90 nm, 20 nm-0.1 µm, 20 nm-0.2 µm, 20 nm-0.3 µm, 20 nm-0.4 µm, 20 nm-0.5 µm, 20 nm-0.6 µm, 20 nm-0.7 µm, 20 nm-0.8 µm, 20 nm-0.9 µm, 20 nm-1 µm, 20 nm-2 µm, 20 nm-3 µm, 20 nm-4 µm, 20 nm-5 µm, 30 nm-40 nm, 30 nm-50 nm, 30 nm-60 nm, 30 nm-70 nm, 30 nm-80 nm, 30 nm-90 nm, 30 nm-0.1 µm, 30 nm-0.2 µm, 30 nm-0.3 µm, 30 nm-0.4 µm, 30 nm-0.5 µm, 30 nm-0.6 µm, 30 nm-0.7 µm, 30 nm-0.8 µm, 30 nm-0.9 µm, 30 nm-1 µm, 30 nm-2 µm, 30 nm-3 µm, 30 nm-4 µm, or 30 nm-5 µm. In some embodiments, said anode and cathode are separated by a distance of 37 nm. In some embodiments, said anode and cathode are separated by a distance of 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-150 nm, 10 nm-200 nm, 10 nm-250 nm, 10 nm-300 nm, 10 nm-350 nm, 10 nm-400 nm, 10 nm-450 nm, 10 nm-500 nm, 10 nm-550 nm, 10 nm-600 nm, 10 nm-650 nm, 10 nm-700 nm, 10 nm-750 nm, 10 nm-800 nm, 10 nm-850 nm, 10 nm-900 nm, 10 nm-950 nm, 10 nm-1000 nm, 10 nm-1100 nm, 10 nm-1200 nm, 10 nm-1300 nm, 10 nm-1400 nm, 10 nm-1500 nm, 10 nm-1600 nm, 10 nm-1700 nm, 10 nm-1800 nm, 10 nm-1900 nm, or 10 nm-2000 nm. In some embodiments, said anode and cathode are separated by a distance of 10 nm-2 µm. In some embodiments, said anode and cathode are separated by a distance of 10 nm-1 µm. In some embodiments, said anode and cathode are separated by a distance of 10 nm-500 nm.

In various embodiments, the present invention provides a system comprising an anode and a cathode, wherein said anode and cathode are separated by a distance of 10 nm-5 µm. In some embodiments, the system further comprises a dielectric material situated between the anode and cathode.

In some embodiments, a portion of the anode is coated with a dielectric material. In some embodiments, the dielectric material comprises silicon nitride. In some embodiments, the cathode comprises Ti and/or Pt. In some embodiments, the anode comprises indium-tin-oxide (ITO). In some embodiments, the anode comprises Ti and/or Au, or Ni. In some embodiments, the system further comprises a layer of silicon substrate in contact with said cathode. In some embodiments, the system further comprises water.

In various embodiments, the present invention provides a composition comprising an anode, a cathode, and a dielectric material situated between the anode and cathode. In some embodiments, the dielectric material is 10 nm-5 µm thick. In some embodiments, the dielectric material comprises silicon nitride. In some embodiments, the cathode comprises Ti and/or Pt. In some embodiments, the anode comprises Ti and/or Au, or Ni. In some embodiments, the composition further comprises a layer of silicon substrate in contact with said cathode.

In various embodiments, the present invention provides a method for generating hydrogen, comprising applying an electric current to a system of the invention so as to create an electric field between the anode and cathode.

In various embodiments, the present invention provides a method for fabricating a nanoelectrode device, comprising: depositing a cathode metal on a substrate to provide a cathode; depositing a dielectric material on said cathode; and depositing an anode metal on said dielectric material to provide an anode. In some embodiments, the nanoelectrode device is a vertical nanoelectrode.

In various embodiments, the invention teaches a method for generating hydrogen. In some embodiments, the method includes applying an electric current to the systems including water described above or demonstrated in the drawings submitted herewith, so as to create an electric field between the anode and cathode, and thereby generate hydrogen.

In various embodiments, the invention teaches a method for generating hydrogen. In some embodiments, the method includes applying an electric current to the articles of manufacture including water described above or demonstrated in the drawings submitted herewith, so as to create an electric field between the anode and cathode, and thereby generate hydrogen.

In various embodiments, the invention teaches a method for fabricating a nanoelectrode device, comprising: depositing a cathode metal on a substrate to provide a cathode; and depositing an anode metal on the substrate to provide an anode, wherein said cathode and said anode are separated by a distance of 10 nm-5 µm. In some embodiments, said anode and cathode are separated by a distance of 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-0.1 µm, 10 nm-0.2 µm, 10 nm-0.3 µm, 10 nm-0.4 µm, 10 nm-0.5 µm, 10 nm-0.6 µm, 10 nm-0.7 µm, 10 nm-0.8 µm, 10 nm-0.9 µm, 10 nm-1 µm, 10 nm-2 µm, 10 nm-3 µm, 10 nm-4 µm, 10-5 µm, 20 nm-30 nm, 20 nm-40 nm, 20 nm-50 nm, 20 nm-60 nm, 20 nm-70 nm, 20 nm-80 nm, 20 nm-90 nm, 20 nm-0.1 µm, 20 nm-0.2 µm, 20 nm-0.3 µm, 20 nm-0.4 µm, 20 nm-0.5 µm, 20 nm-0.6 µm, 20 nm-0.7 µm, 20 nm-0.8 µm, 20 nm-0.9 µm, 20 nm-1 µm, 20 nm-2 µm, 20 nm-3 µm, 20 nm-4 µm, 20 nm-5 µm, 30 nm-40 nm, 30 nm-50 nm, 30 nm-60 nm, 30 nm-70 nm, 30 nm-80 nm, 30 nm-90 nm, 30 nm-0.1 µm, 30 nm-0.2 µm, 30 nm-0.3 µm, 30 nm-0.4 µm, 30 nm-0.5 µm, 30 nm-0.6 µm, 30 nm-0.7 µm, 30 nm-0.8 µm, 30 nm-0.9 µm, 30 nm-1 µm, 30 nm-2 µm, 30 nm-3 µm, 30 nm-4 µm, or 30 nm-5 µm. In some embodiments, said anode and cathode are separated by a distance of 37 nm. In some embodiments, said anode and cathode are separated by a distance of 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-150 nm, 10 nm-200 nm, 10 nm-250 nm, 10 nm-300 nm, 10 nm-350 nm, 10 nm-400 nm, 10 nm-450 nm, 10 nm-500 nm, 10 nm-550 nm, 10 nm-600 nm, 10 nm-650 nm, 10 nm-700 nm, 10 nm-750 nm, 10 nm-800 nm, 10 nm-850 nm, 10 nm-900 nm, 10 nm-950 nm, 10 nm-1000 nm, 10 nm-1100 nm, 10 nm-1200 nm, 10 nm-1300 nm, 10 nm-1400 nm, 10 nm-1500 nm, 10 nm-1600 nm, 10 nm-1700 nm, 10 nm-1800 nm, 10 nm-1900 nm, or 10 nm-2000 nm. In some embodiments, said anode and cathode are separated by a distance of 10 nm-2 µm. In some embodiments, said anode and cathode are separated by a distance of 10 nm-1 µm. In some embodiments, said anode and cathode are separated by a distance of 10 nm-500 nm. In various embodiments, the invention teaches a method for fabricating a nanoelectrode device, comprising: (a) assembling a cathode and an anode, wherein the cathode is prepared by depositing a cathode metal on a substrate, and wherein the anode is prepared by depositing an anode metal on the substrate to provide an anode, wherein said cathode and said anode are separated by a distance of 10 nm-5 µm. In some embodiments, the nanoelectrode device is a horizontal nanoelectrode. In some embodiments, the cathode has a comb-like structure. In some embodiments, the anode has a comb-like structure. In some embodiments, the horizontal nanoelectrode may have the structure as shown in FIG. 55B.

In various embodiments, the invention teaches a method for fabricating a nanoelectrode device, comprising: (a) assembling a cathode and an anode, having a dielectric material between said cathode and said anode, wherein the cathode is prepared by depositing a cathode metal on a substrate, and depositing a layer of a dielectric material on said cathode, and wherein the anode is prepared by depositing an anode metal on said dielectric material. In various embodiments, the invention teaches a method for fabricating a nanoelectrode device, comprising: depositing a cathode metal on a substrate to provide a cathode; depositing a layer of a dielectric material on said cathode; and depositing an anode metal onto the dielectric material to provide an anode. In various embodiments, the invention teaches a method for fabricating a nanoelectrode device, comprising: depositing a cathode metal on a substrate to provide a cathode; depositing a dielectric material on said cathode; and depositing an anode metal on said dielectric material to provide an anode. In some embodiments, the method further comprises, etching the dielectric material. In some embodiments, the method further comprises, etching the layer of the dielectric material. In some embodiments, the dielectric material is silicon nitride. In some embodiments, the layer of the dielectric material is 5-100 nm, 100-200 nm, 200-500 nm, 500 nm-5 µm (or more) thick. In some embodiments, the dielectric material is 5 nm-10 nm, 5 nm-20 nm, 5 nm-30 nm, 5 nm-40 nm, 5 nm-50 nm, 5 nm-60 nm, 5 nm-70 nm, 5 nm-80 nm, 5 nm-90 nm, 5 nm-100 nm, 5 nm-200 nm, 5 nm-300 nm, 5 nm-400 nm, 5 nm-500 nm, 5 nm-1 µm, 5 nm-2 µm, 5 nm-3 µm, 5 nm-4 µm, 5 nm-5 µm, 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-200 nm, 10 nm-300 nm, 10 nm-400 nm, 10 nm-500 nm, 10 nm-1 µm, 10 nm-2 µm, 10 nm-3 µm, 10 nm-4 µm, 10 nm-5 µm, 20 nm-30 nm, 20 nm-40 nm, 20 nm-50 nm, 20 nm-60 nm, 20 nm-70 nm, 20 nm-80 nm, 20 nm-90 nm, 20 nm-100 nm, 20 nm-200 nm, 20 nm-300 nm, 20 nm-400 nm, 20 nm-500 nm, 20 nm-1 µm, 20 nm-2 µm, 20 nm-3 µm, 20 nm-4 µm, 20 nm-5 µm, 30 nm-40 nm, 30 nm-50 nm, 30 nm-60 nm, 30 nm-70 nm, 30 nm-80 nm, 30 nm-90 nm, 30 nm-100 nm, 30 nm-200 nm, 30 nm-300 nm, 30 nm-400 nm, 30 nm-500 nm, 30 nm-1 µm, 30 nm-2 µm, 30 nm-3 µm, 30 nm-4 µm, or 30 nm-5 µm. In some embodiments, the dielectric material thickness is 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-150 nm, 10 nm-200 nm, 10 nm-250 nm, 10 nm-300 nm, 10 nm-350 nm, 10 nm-400 nm, 10 nm-450 nm, 10 nm-500 nm, 10 nm-550 nm, 10 nm-600 nm, 10 nm-650 nm, 10 nm-700 nm, 10 nm-750 nm, 10 nm-800 nm, 10 nm-850 nm, 10 nm-900 nm, 10 nm-950 nm, 10 nm-1000 nm, 10 nm-1100 nm, 10 nm-1200 nm, 10 nm-1300 nm, 10 nm-1400 nm, 10 nm-1500 nm, 10 nm-1600 nm, 10 nm-1700 nm, 10 nm-1800 nm, 10 nm-1900 nm, or 10 nm-2000 nm. In some embodiments, the dielectric material thickness is 10 nm-2 µm. In some embodiments, the dielectric material thickness is 10 nm-1 µm. In some embodiments, the dielectric material thickness is 10 nm-500 nm. In some embodiments, the substrate is a silicon substrate. In some embodiments, the silicone substrate is a silicon wafer. In some embodiments, a layer of silicon dioxide is applied between the silicon substrate and the cathode metal. In some embodiments, the silicon dioxide is thermally grown. In some embodiments, the cathode metal is deposited by e-beam evaporation. In some embodiments, the dielectric material is deposited by PECVD (plasma enhanced chemical vapor deposition). In some embodiments, the silicon nitride is deposited by PECVD. In some embodiments, the anode is prepared by photo lithography, e-beam evaporation, and lift-off. In some embodiments, the method further comprises using a low-DC bias RIE process. In some embodiments, the cathode metal comprises Ti and/or Pt. In some embodiments, the anode metal comprises Ti and/or Au, or Ni. In some embodiments, the anode comprises indium-tin-oxide (ITO). In some embodiments, the cathode and anode are separated by a distance (e.g., a gap) of 10 nm-5 µm. In some embodiments, said anode and cathode are separated by a distance of 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-0.1 µm, 10 nm-0.2 µm, 10 nm-0.3 µm, 10 nm-0.4 µm, 10 nm-0.5 µm, 10 nm-0.6 µm, 10 nm-0.7 µm, 10 nm-0.8 µm, 10 nm-0.9 µm, 10 nm-1 µm, 10 nm-2 µm, 10 nm-3 µm, 10 nm-4 µm, 10-5 µm, 20 nm-30 nm, 20 nm-40 nm, 20 nm-50 nm, 20 nm-60 nm, 20 nm-70 nm, 20 nm-80 nm, 20 nm-90 nm, 20 nm-0.1 µm, 20 nm-0.2 µm, 20 nm-0.3 µm, 20 nm-0.4 µm, 20 nm-0.5 µm, 20 nm-0.6 µm, 20 nm-0.7 µm, 20 nm-0.8 µm, 20 nm-0.9 µm, 20 nm-1 µm, 20 nm-2 µm, 20 nm-3 µm, 20 nm-4 µm, 20 nm-5 µm, 30 nm-40 nm, 30 nm-50 nm, 30 nm-60 nm, 30 nm-70 nm, 30 nm-80 nm, 30 nm-90 nm, 30 nm-0.1 µm, 30 nm-0.2 µm, 30 nm-0.3 µm, 30 nm-0.4 µm, 30 nm-0.5 µm, 30 nm-0.6 µm, 30 nm-0.7 µm, 30 nm-0.8 µm, 30 nm-0.9 µm, 30 nm-1 µm, 30 nm-2 µm, 30 nm-3 µm, 30 nm-4 µm, or 30 nm-5 µm. In some embodiments, said anode and cathode are separated by a distance of 37 nm. In some embodiments, said anode and cathode are separated by a distance of 10 nm-20 nm, 10 nm-30 nm, 10 nm-40 nm, 10 nm-50 nm, 10 nm-60 nm, 10 nm-70 nm, 10 nm-80 nm, 10 nm-90 nm, 10 nm-100 nm, 10 nm-150 nm, 10 nm-200 nm, 10 nm-250 nm, 10 nm-300 nm, 10 nm-350 nm, 10 nm-400 nm, 10 nm-450 nm, 10 nm-500 nm, 10 nm-550 nm, 10 nm-600 nm, 10 nm-650 nm, 10 nm-700 nm, 10 nm-750 nm, 10 nm-800 nm, 10 nm-850 nm, 10 nm-900 nm, 10 nm-950 nm, 10 nm-1000 nm, 10 nm-1100 nm, 10 nm-1200 nm, 10 nm-1300 nm, 10 nm-1400 nm, 10 nm-1500 nm, 10 nm-1600 nm, 10 nm-1700 nm, 10 nm-1800 nm, 10 nm-1900 nm, or 10 nm-2000 nm. In some embodiments, said anode and cathode are separated by a distance of 10 nm-2 µm. In some embodiments, said anode and cathode are separated by a distance of 10 nm-1 µm. In some embodiments, said anode and cathode are separated by a distance of 10 nm-500 nm. In some embodiments, the nanoelectrode device is a vertical nanoelectrode. In some embodiments, the vertical nanoelectrode may have the structure as shown in FIG. 55A.

In various embodiments, we have demonstrated an approach to improve the electrochemical reaction efficiency in water electrolysis, by using electrochemical cells with distance between anode and cathode in nanometer-scale. With these nanogap electrochemical cells (NECs) of the invention, pure water (without any added electrolyte) can be electrolyzed efficiently to generate hydrogen and oxygen due to the large electric field in the entire electrode gap, contrary to the traditional thinking that pure water cannot be electrolyzed Various embodiments of the present invention are described in the ensuing examples. The examples are intended to be illustrative and in no way restrictive.

It should be understood that this invention is not limited to the particular methodologies, protocols, and reagents, etc., described herein and as such can vary therefrom. The terminology used herein is for the purpose of describing particular embodiments only, and is not intended to limit the scope of the present invention, which is defined solely by the claims.

EXAMPLES

The invention is further illustrated by the following examples which are intended to be purely exemplary of the invention, and which should not be construed as limiting the invention in any way. The following examples are illustrative only, and are not intended to limit, in any manner, any of the aspects described herein. The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means or reactants without the exercise of inventive capacity and without departing from the scope of the invention.

Example 1. High-Efficiency Water Electrolysis Based on Nanoelectrodes

As indicated above, we here reduce the distance between two electrodes below the Debye screening length of pure water (around 60 nm in air), to eliminate the need of electrolyte, and hence reduce the total Ohmic loss and achieve a much higher efficiency for hydrogen generation (FIG. 1). Moreover, we provide a portable hydrogen generation solution.

Figure 2D:
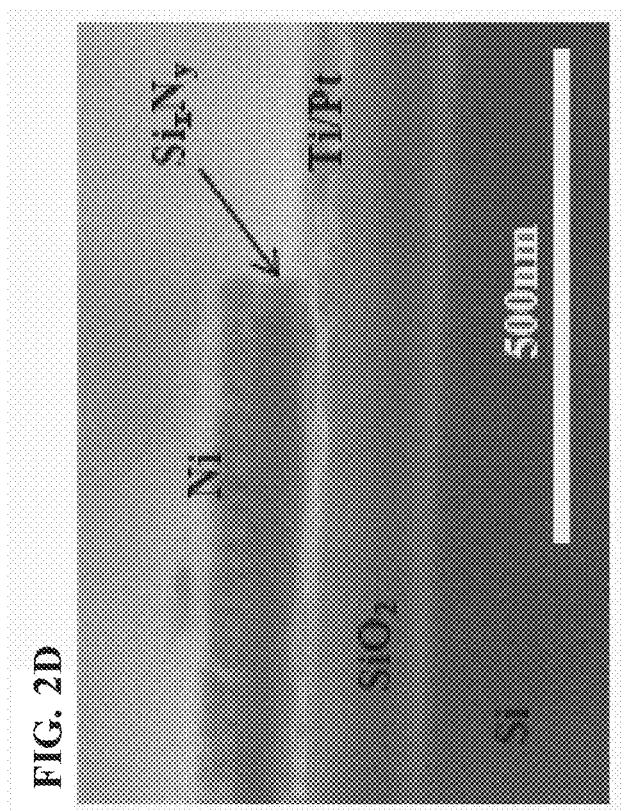
FIG. 2A-FIG. 2D depicts in accordance with various embodiments of the invention, a diagram of the fabrication process and the fabrication result of certain nanoelectrode devices.
Figure 2A:
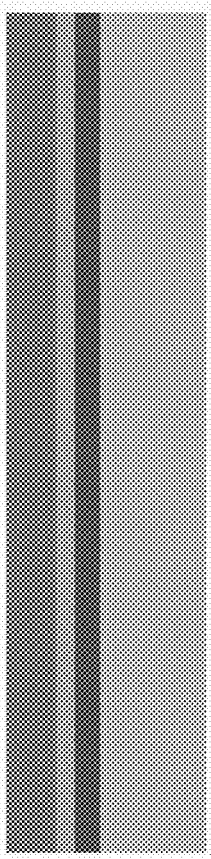
Figure 2B:
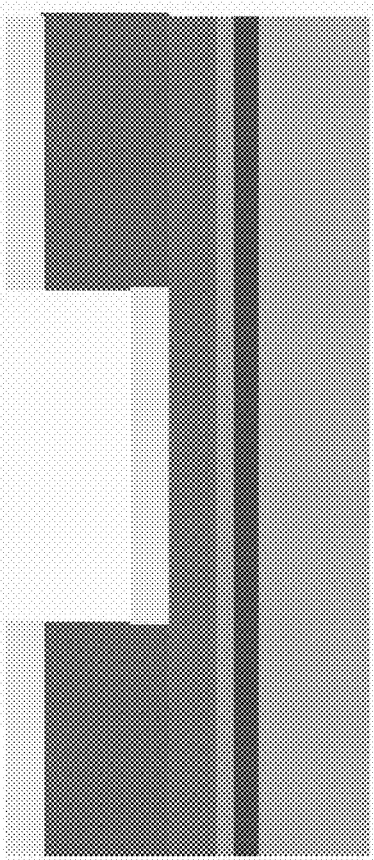
Figure 2C:
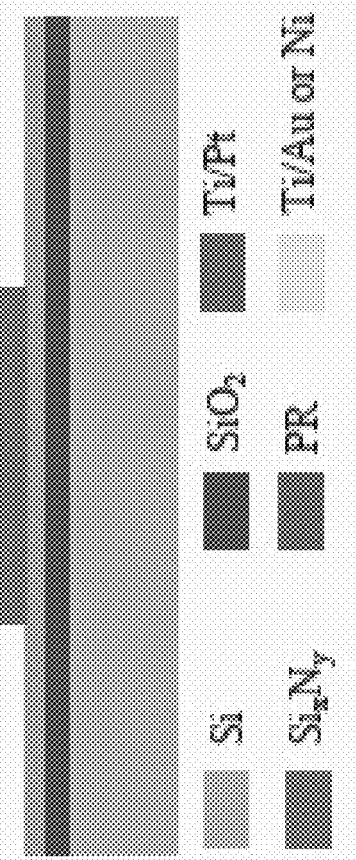

The fabrication process is shown in FIG. 2A-FIG. 2D. First, cathode metal (Ti/Pt) was deposited on thermally grown silicon dioxide by e-beam evaporation. Then silicon nitride was deposited by PECVD (FIG. 2A), with thickness from 50 nm to 500 nm. The anode (Ti/Au or Ni) was fabricated using photolithography, e-beam evaporation and lift-off (FIG. 2B). Eventually the silicon nitride layer was etched with anode metal as etching mask (FIG. 2C), and by using low-DC bias ME process, which could avoid short-circuit between cathode and anode metal layers due to the sputtering and deposition of metal on the sidewall of the silicon nitride spacer. The fabrication result is shown in FIG. 2D.

Figure 3:
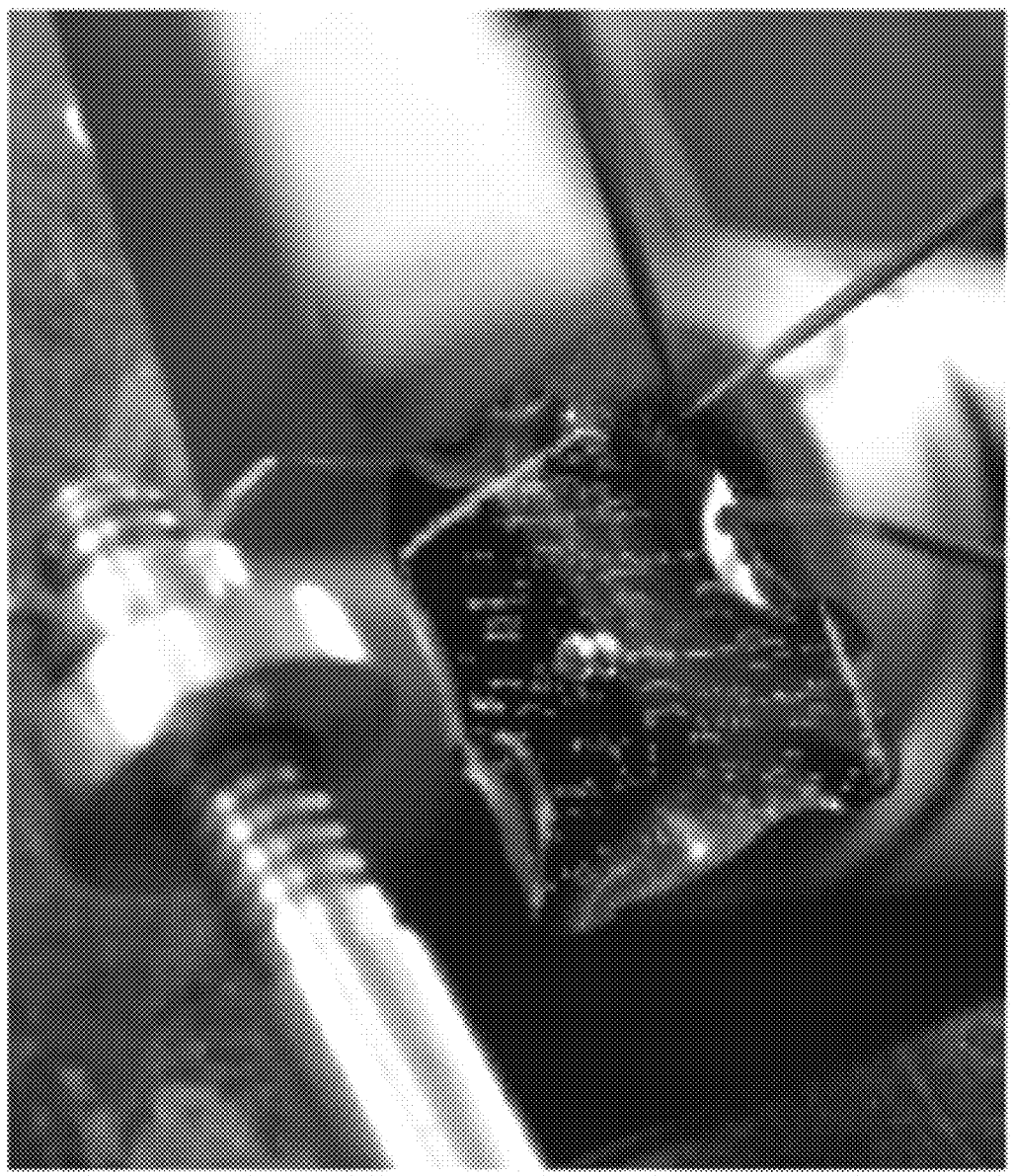
FIG. 3 depicts in accordance with various embodiments of the invention, bubble generation during water electrolysis using an embodiment of the inventive system.
Figure 4A:
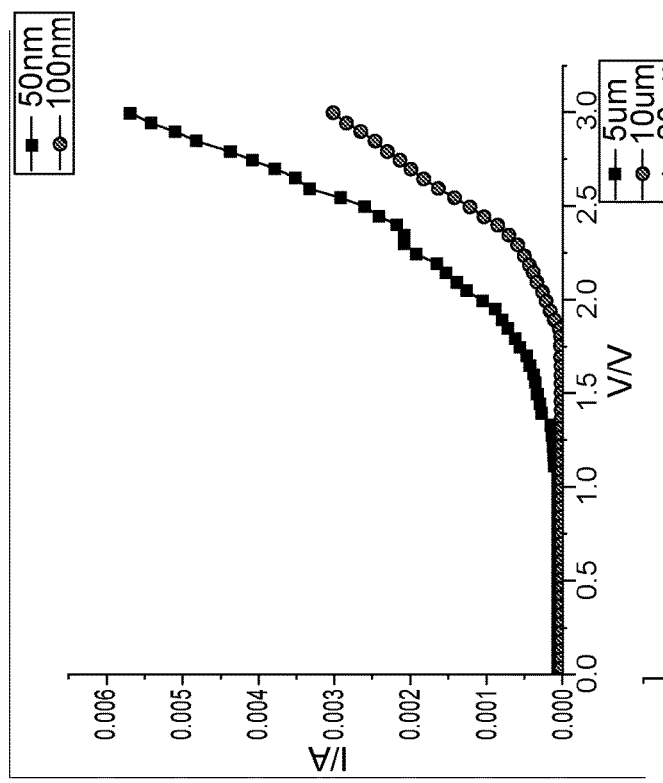
FIG. 4A-FIG. 4B depicts in accordance with various embodiments of the invention, I-V curves measurements for water electrolysis.
Figure 4B:
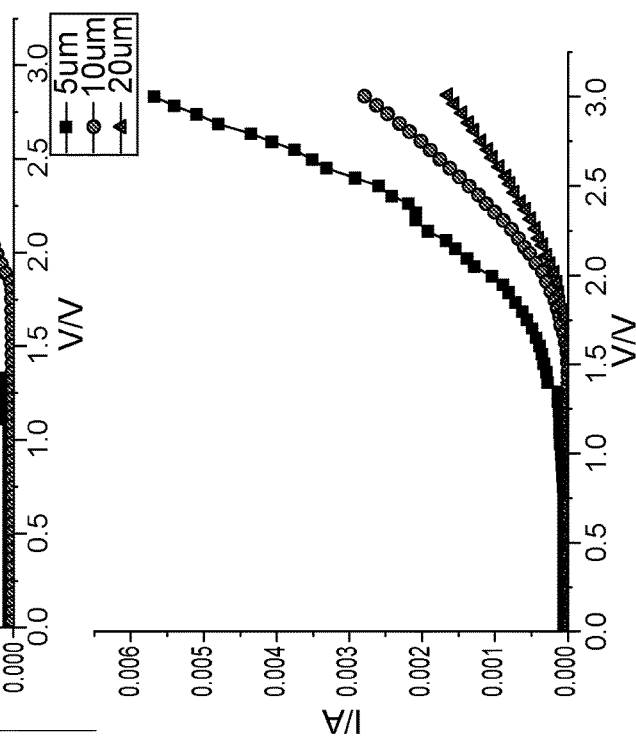
Figure 5:
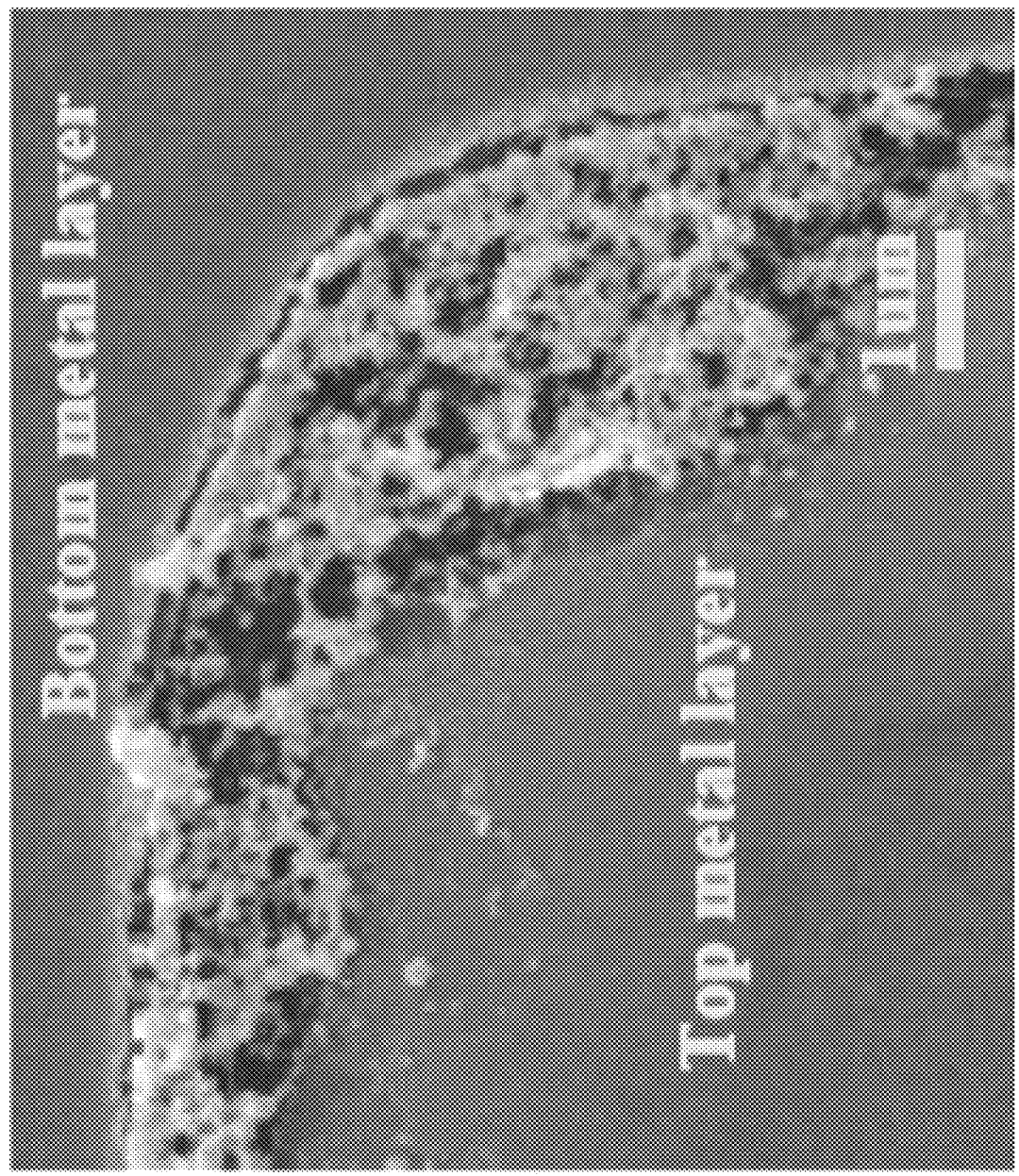
FIG. 5 depicts in accordance with various embodiments of the invention, corrosion of anode metal during water electrolysis.
Figure 6A:
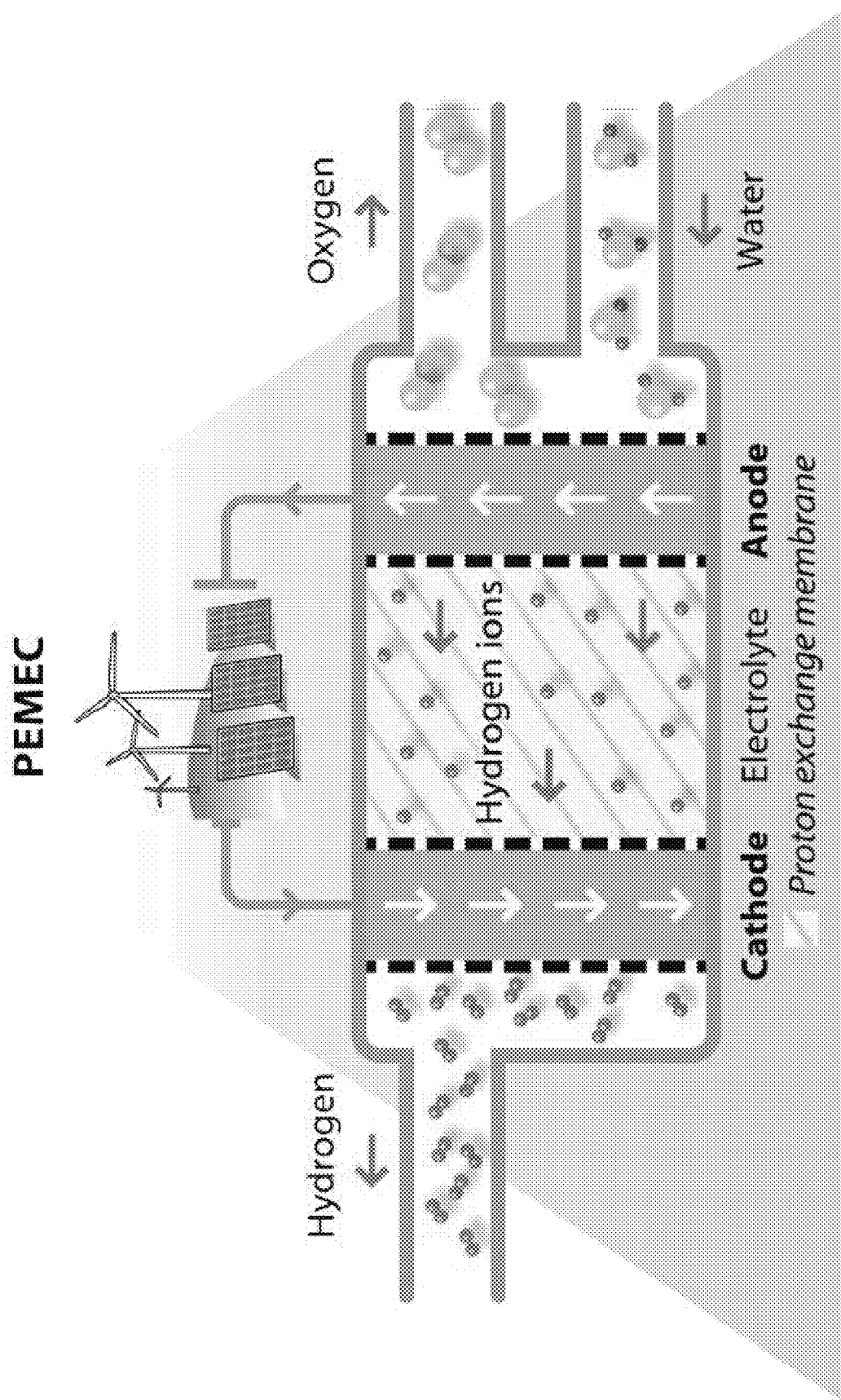
FIG. 6A depicts in accordance with various embodiments of the invention, water electrolysis and the use of a proton exchange membrane. Characteristic features of this type of technology include: (1) production of high-purity hydrogen, (2) not done at large scale size, and (3) high capital cost.
Figure 6B:
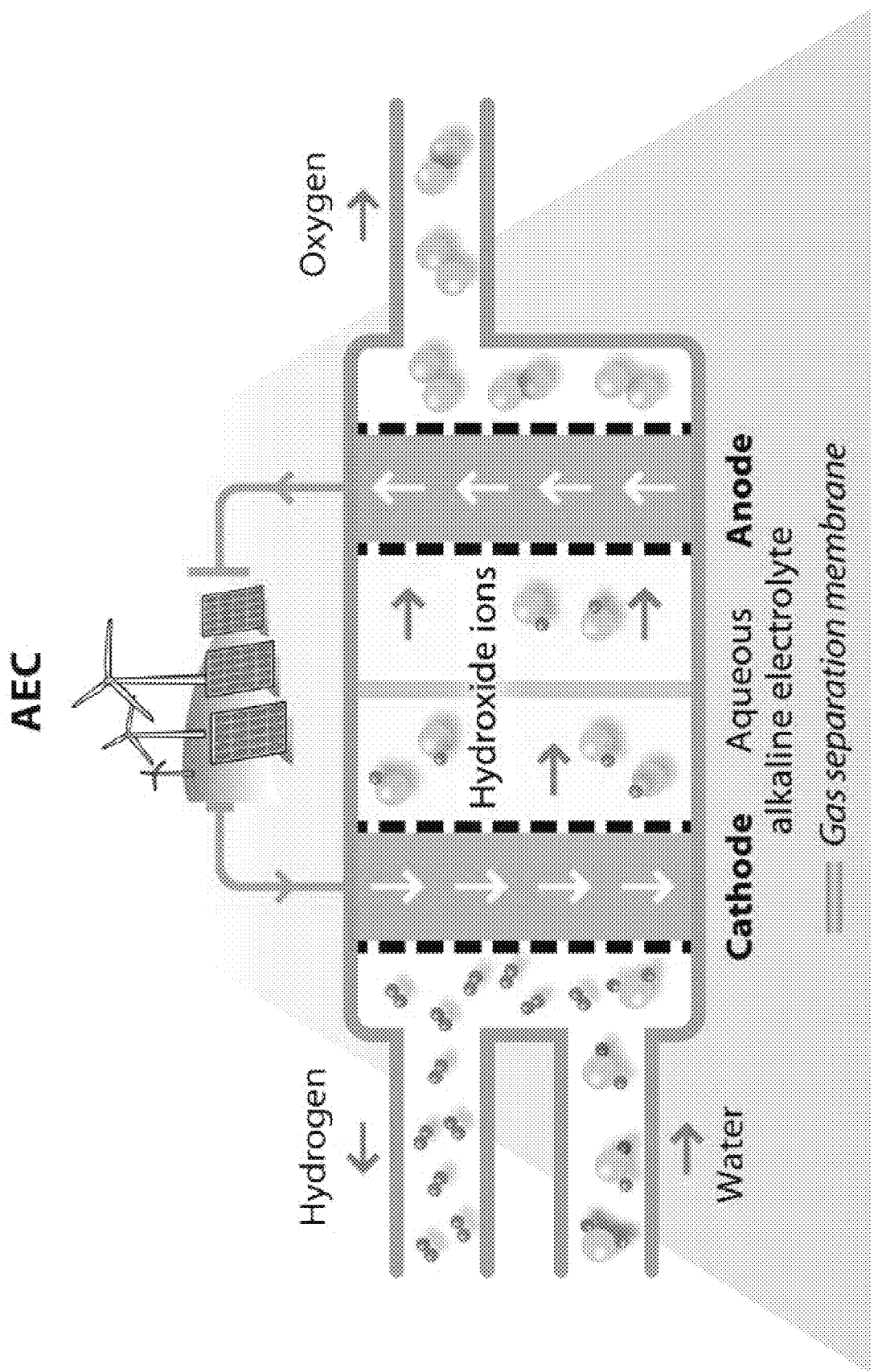
FIG. 6B depicts in accordance with various embodiments of the invention, water electrolysis and the use of a gas separation membrane. Characteristic features of this type of technology include (1) it is a mature technology, (2) relatively limited response, and (3) low-purity hydrogen is produced.
Figure 6C:
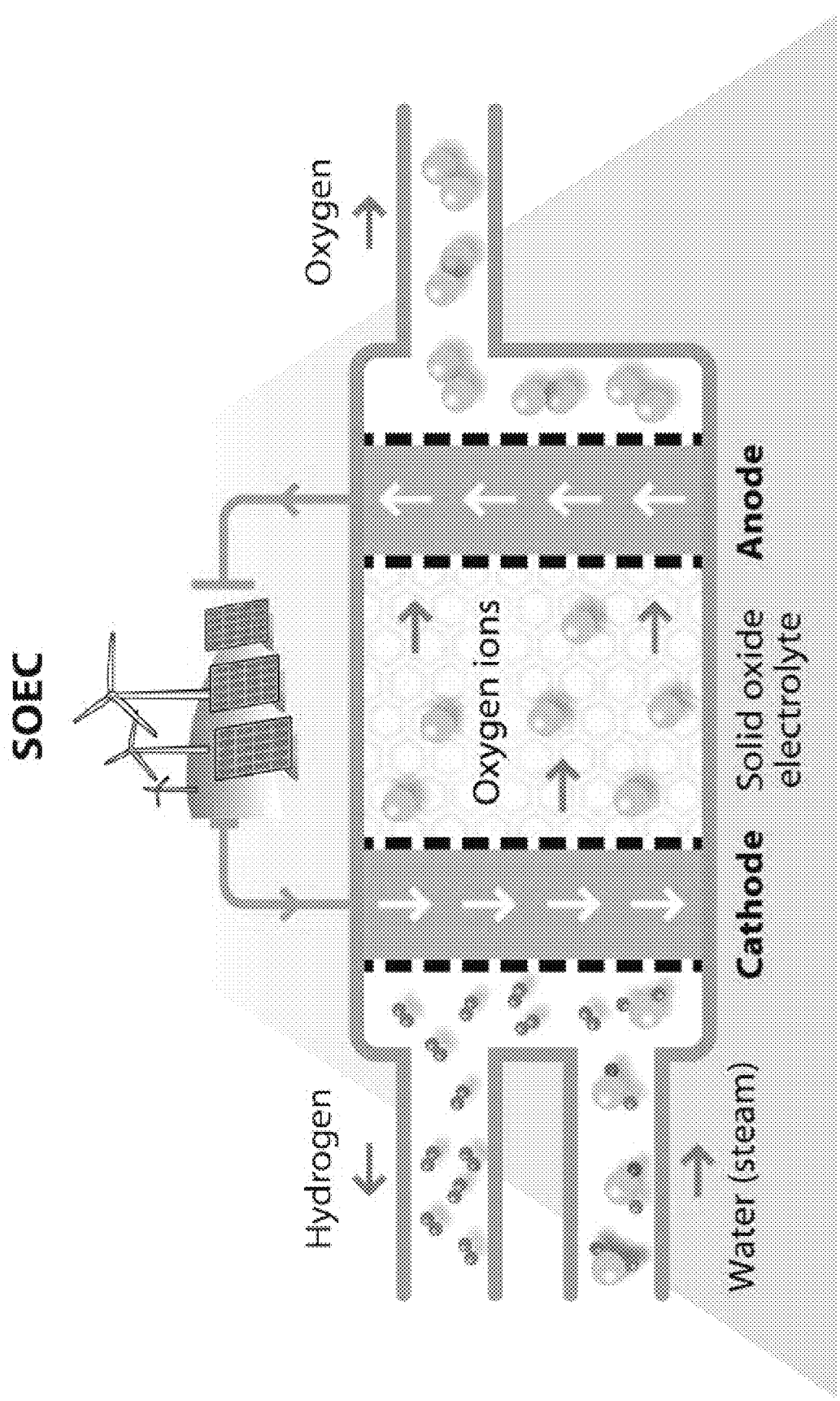
FIG. 6C depicts in accordance with various embodiments of the invention, water electrolysis and the use of a solid oxide electrolyte. Characteristic features of this type of technology include: (1) high temperature, (2) high efficiency promising, and (3) not commercialized yet.
Figure 7:
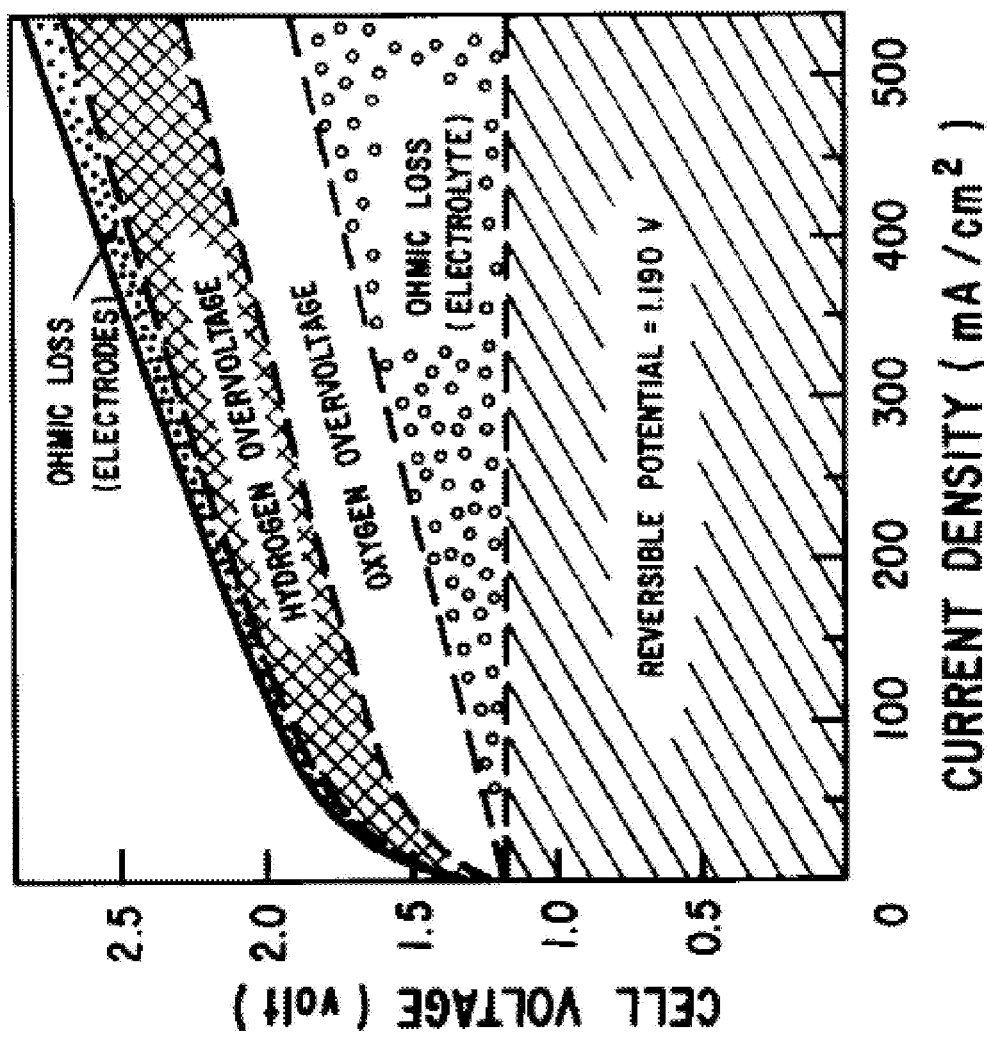
FIG. 7 depicts in accordance with various embodiments of the invention, common water electrolysis has much lower efficiency because of Ohmic loss from the electrolyte ionic current connecting the two half reactions at two electrodes, especially when current density is increasing.
Figure 8:
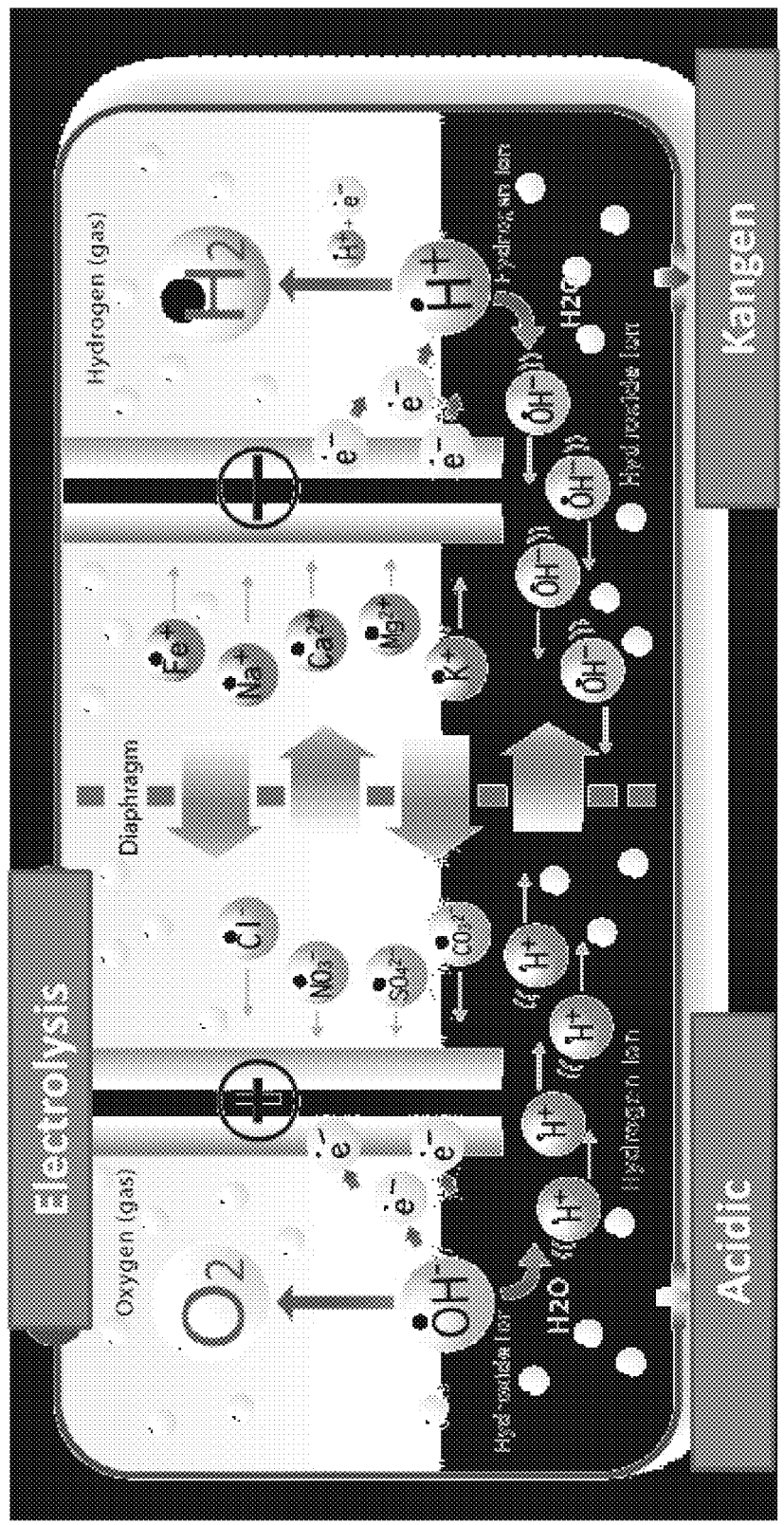
FIG. 8 depicts in accordance with various embodiments of the invention, a system for hydrogen generation. The distance between two electrodes was reduced below the Debye screening length of pure water (around 60 nm in air), to eliminate the need of electrolyte, and hence the total Ohmic loss was reduced and a much higher efficiency for hydrogen generation was achieved. Moreover, this is a portable hydrogen generation solution.
Figure 9:
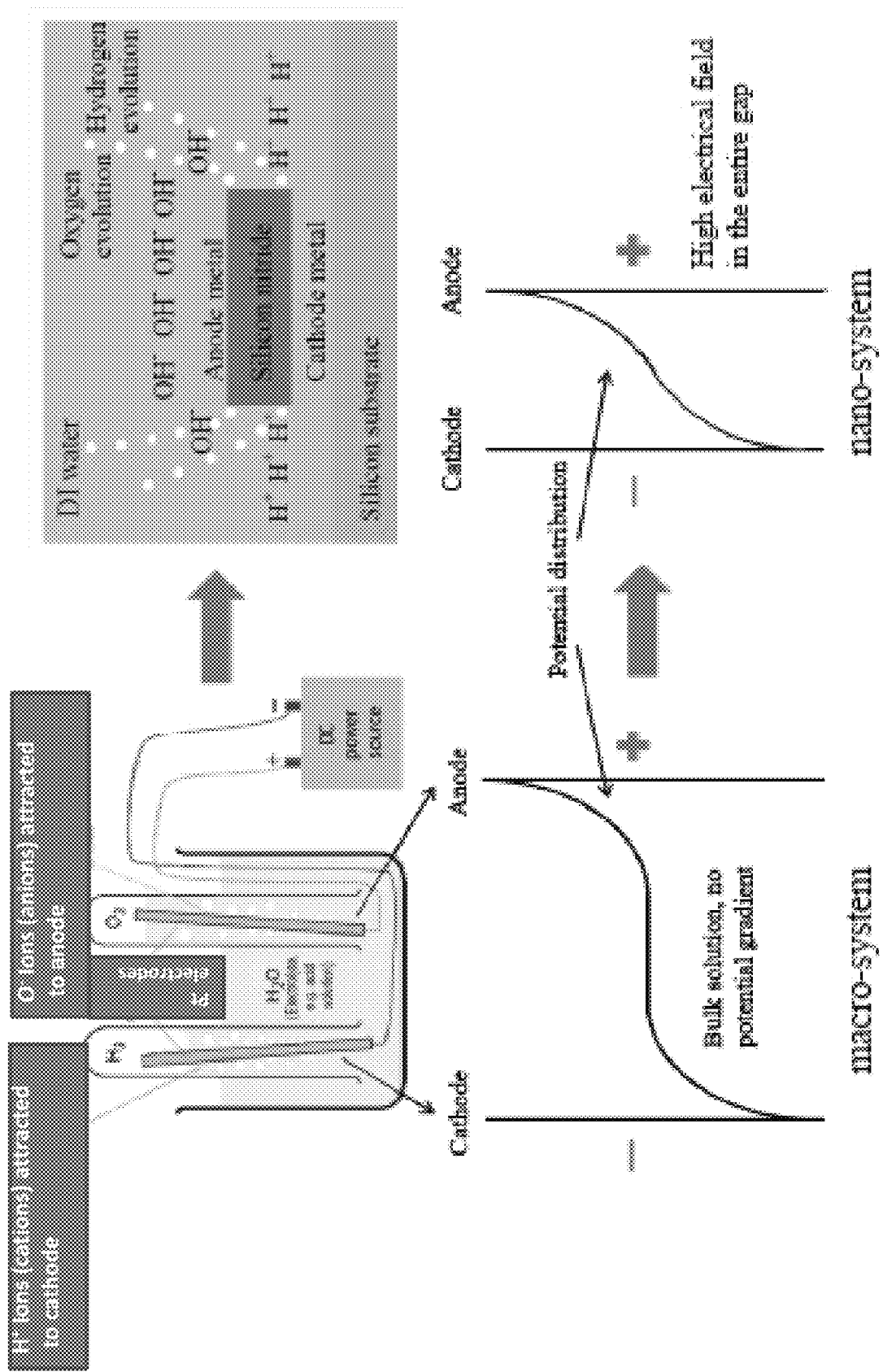
FIG. 9 depicts in accordance with various embodiments of the invention, a vertical nanoelectrode scheme, and the effect of decreasing the distance between two electrodes, in order to reduce the total Ohmic loss.
Figure 12A:
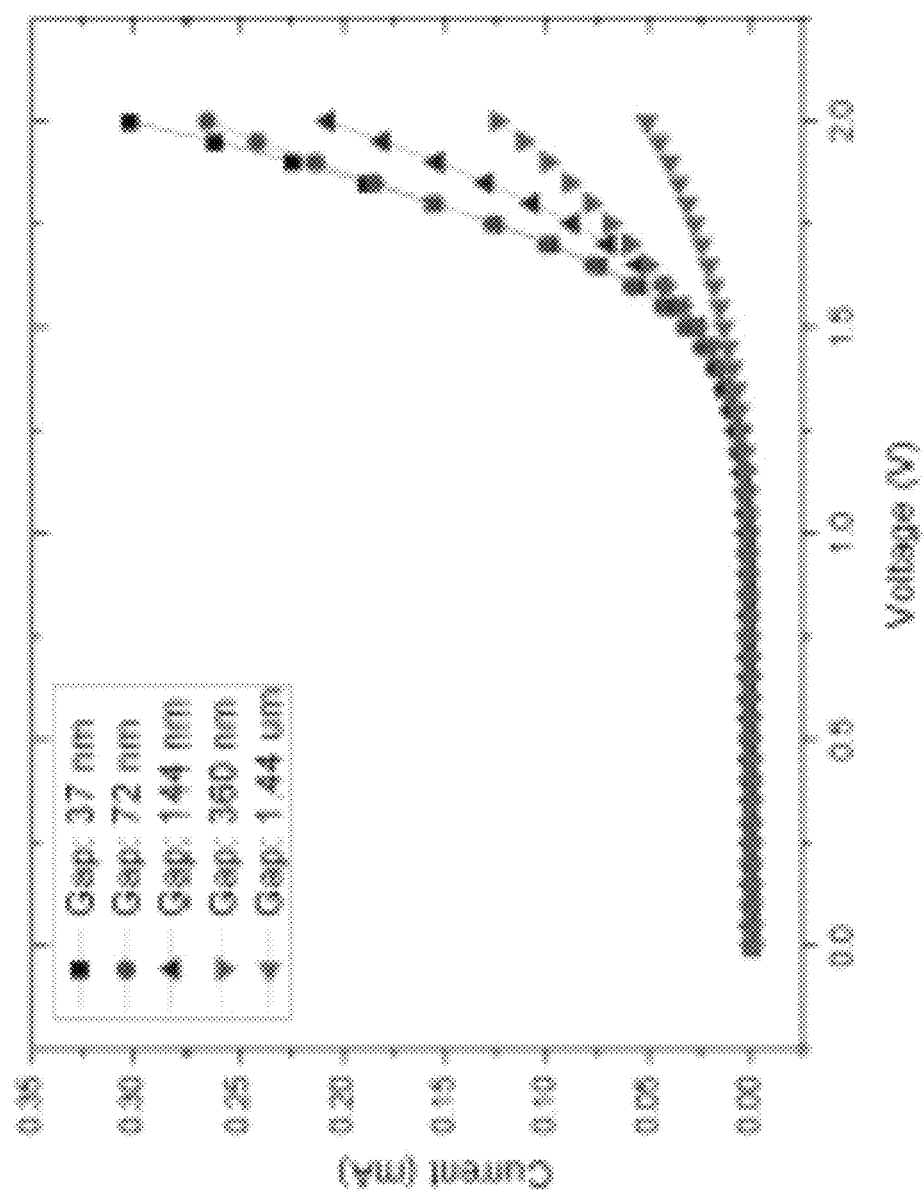
FIG. 12A-FIG. 12C depict in accordance with various embodiments of the invention, I/V-curves measurement experiments by using only DI water at room temperature, no electrolytes and heating set-up were used.
Figure 12B:
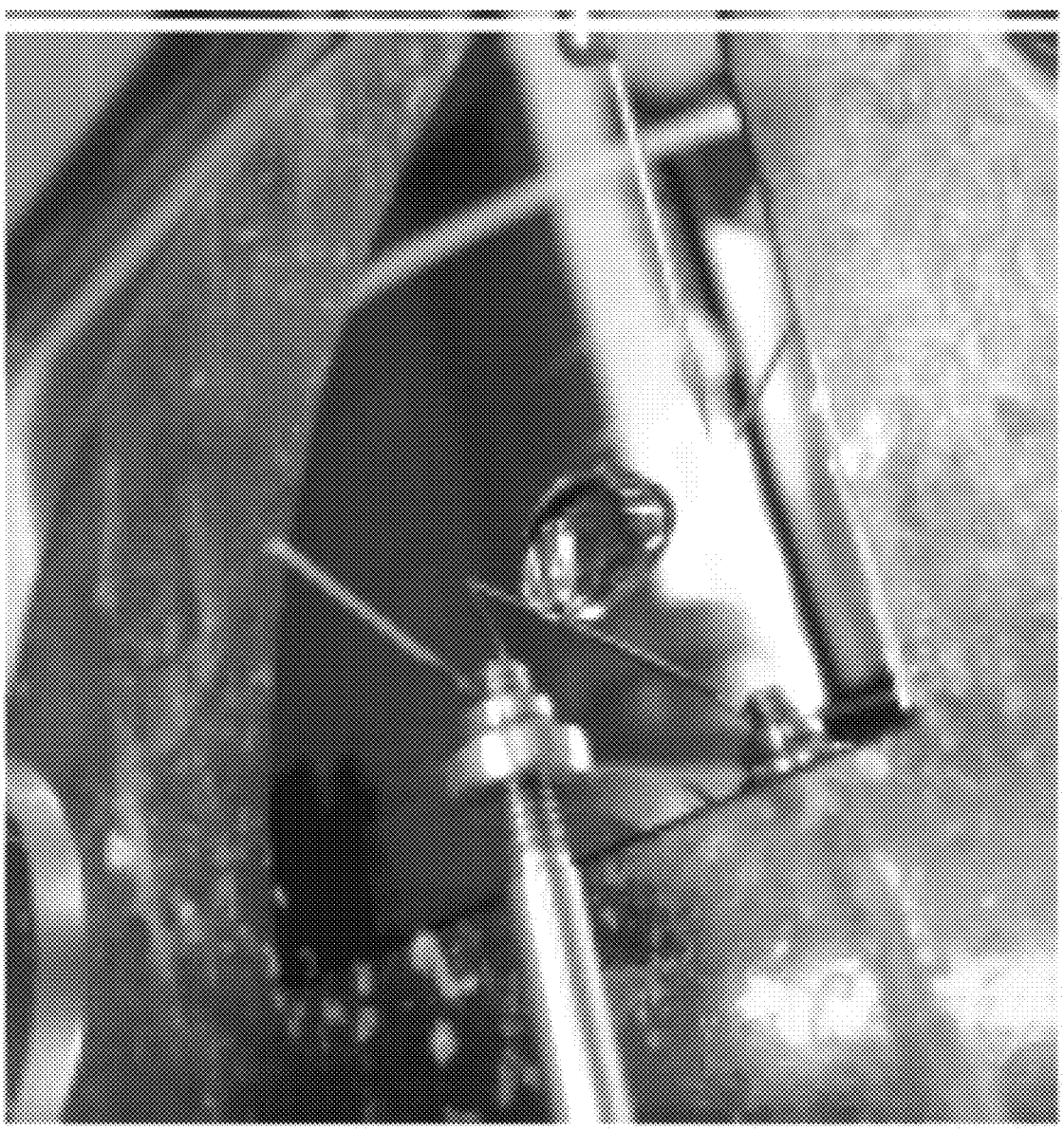
Figure 12C:
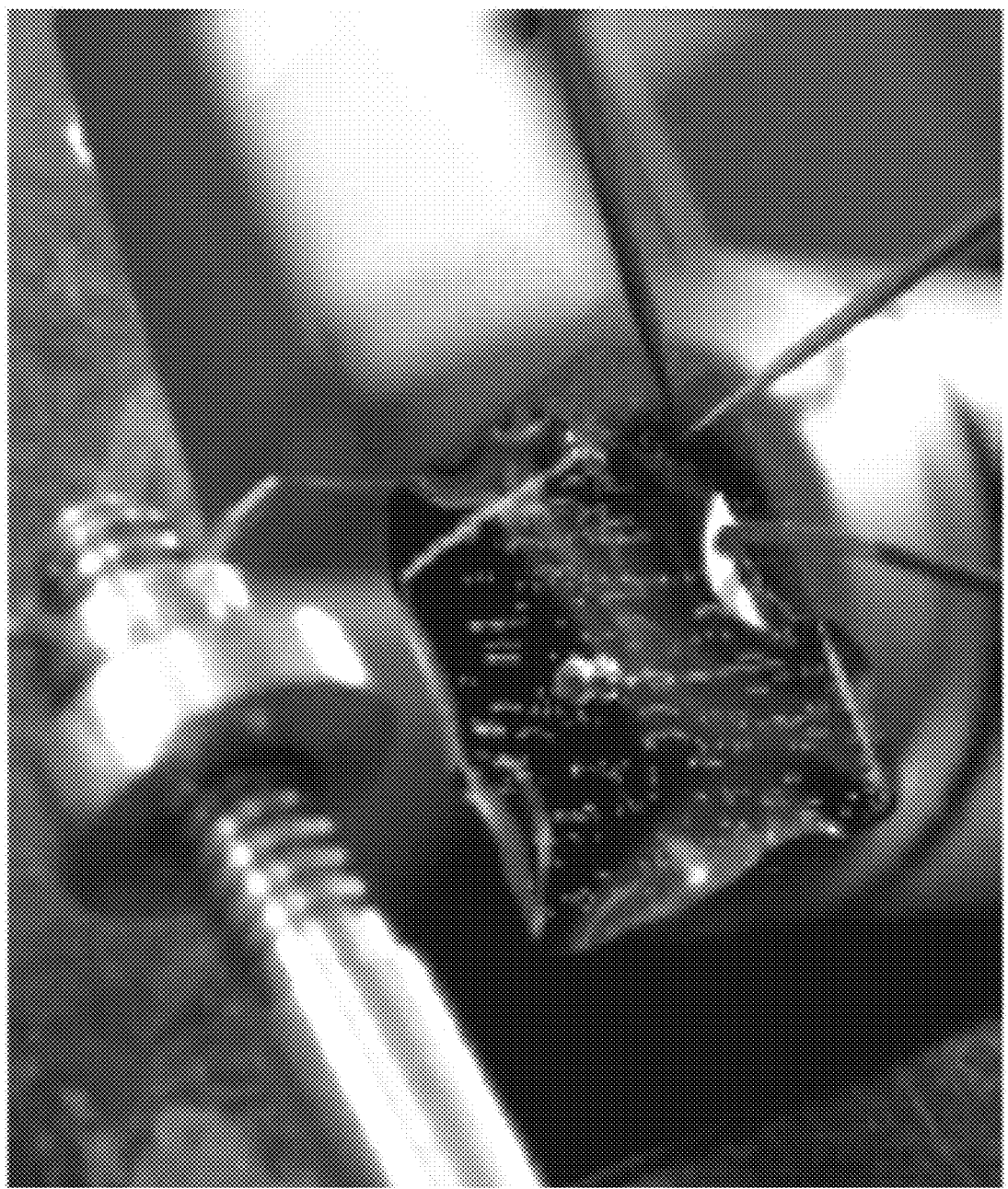
Figure 13B:
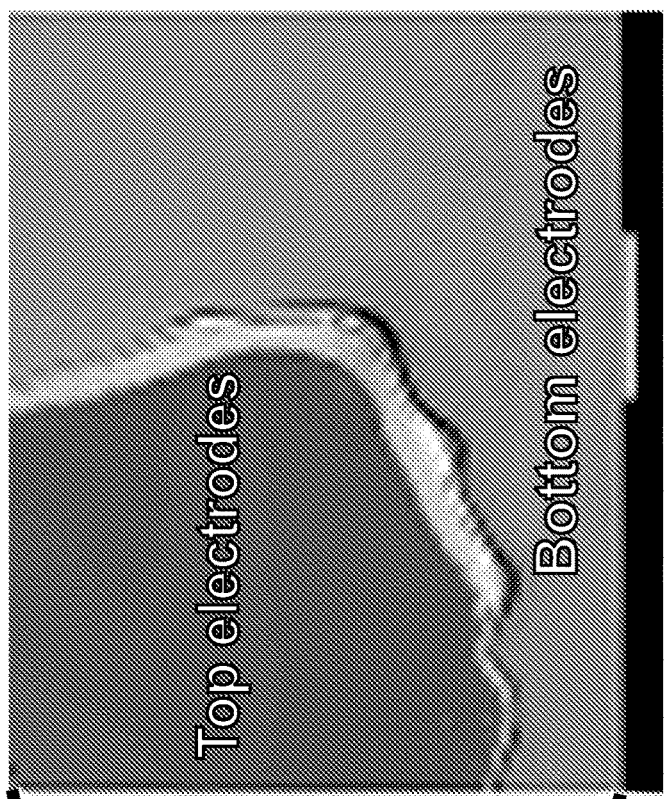
FIG. 13A-FIG. 13C depict in accordance with various embodiments of the invention, anode (top electrode) was damaged after several I/V curves tests, shown obviously in (FIG. 13A) and (FIG. 13B). According to Pourbaix Diagram of gold (FIG. 13C), it will be oxidized under large positive potential in acidic environment. Reliability can be improved by replacing the metal with indium tin oxide (ITO) or coating one ultrathin layer of dielectric for anode protection.
Figure 13A:
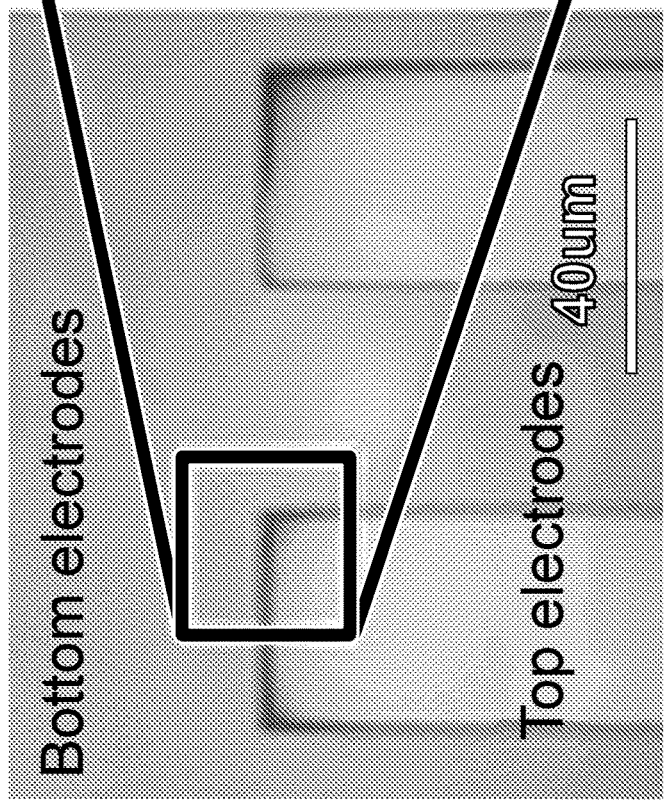
Figure 13C:
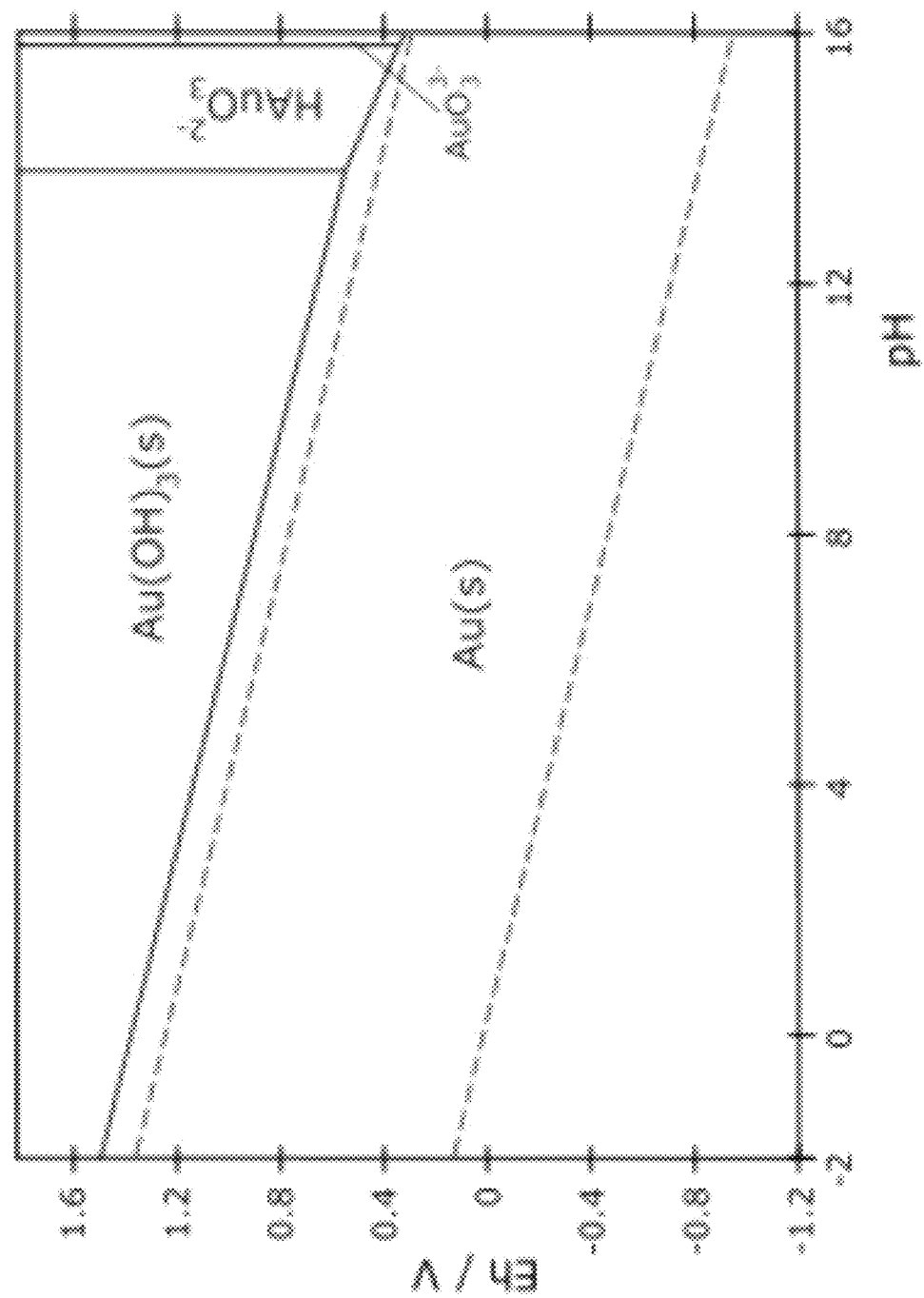
Figure 14E:
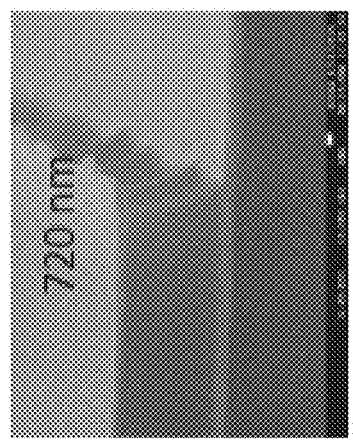
FIG. 14A-FIG. 14F depicts in accordance with various embodiments of the invention, nanogapped-electrodes systems with different gap distances between two electrodes.
Figure 14F:
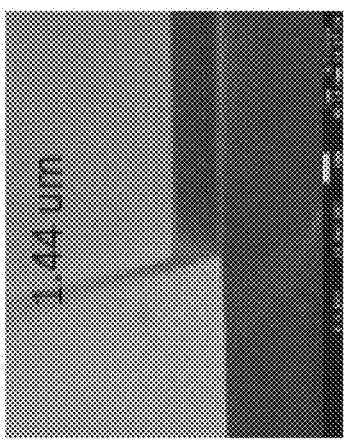
Figure 14C:
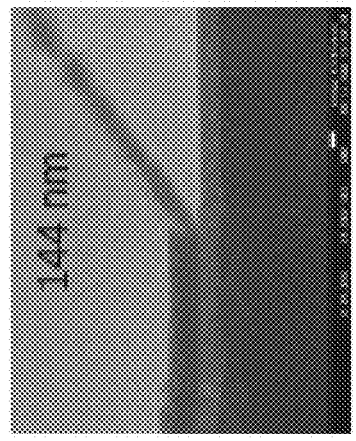
Figure 14D:
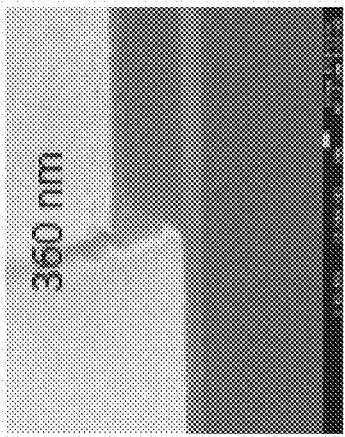
Figure 14A:
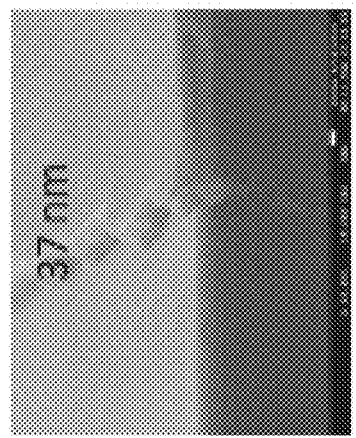
Figure 14B:
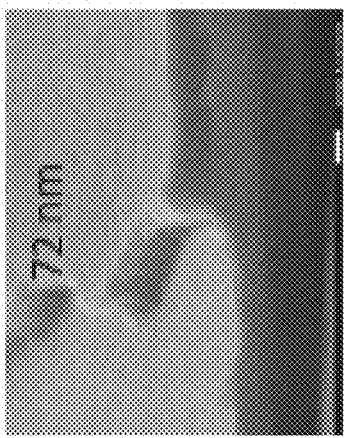
Figure 15B:
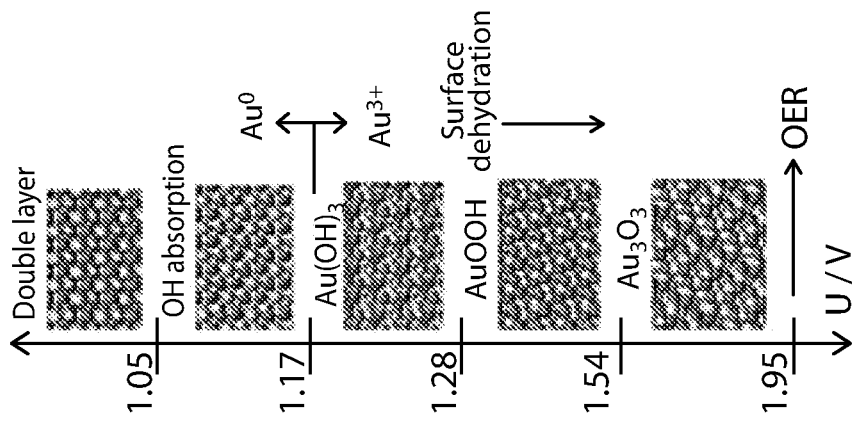
FIG. 15A-FIG. 15B depicts in accordance with various embodiments of the invention, a graph of I/V measurement for different gaps. A double layer forming around 1V. Independent on gap distance. Or Au oxidation around 1V.
Figure 15A:
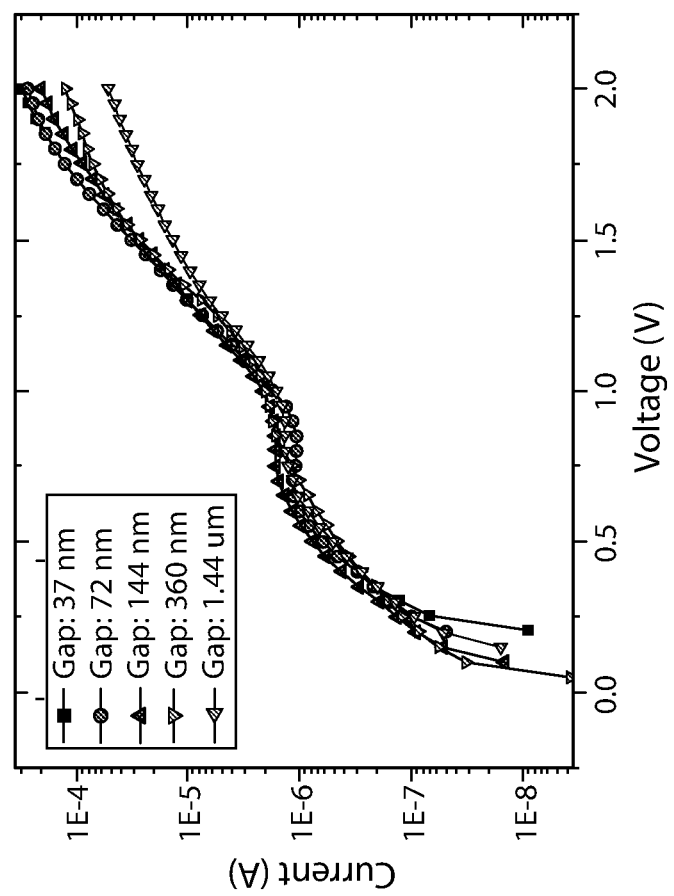
Figure 16:
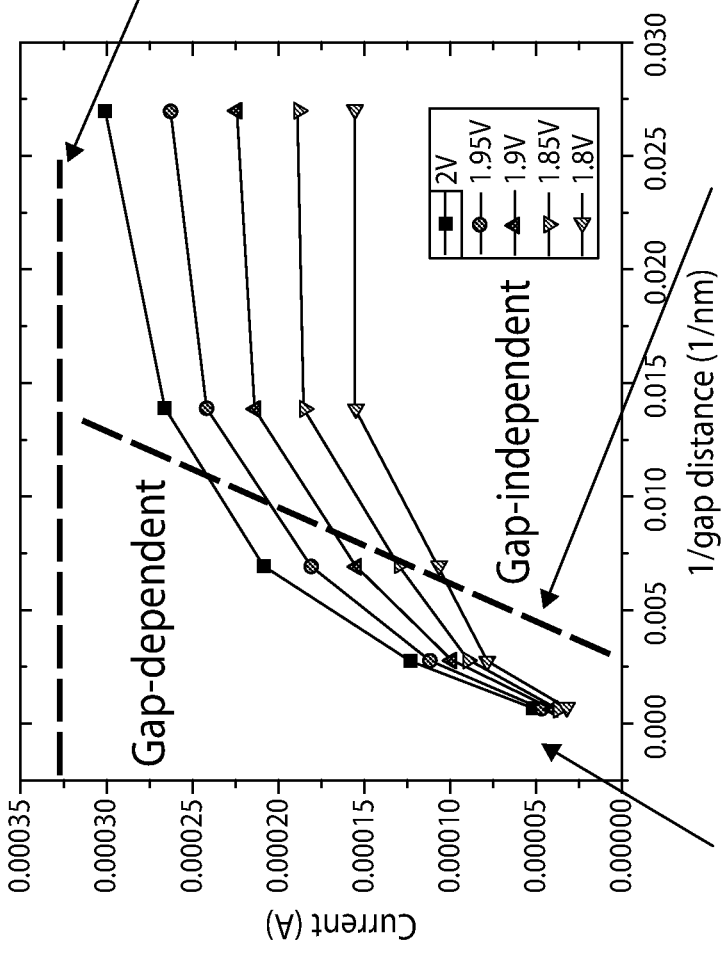
FIG. 16 depicts in accordance with various embodiments of the invention, a graph of current (A) vs. 1/gap distance (1/nm).
Figure 17:
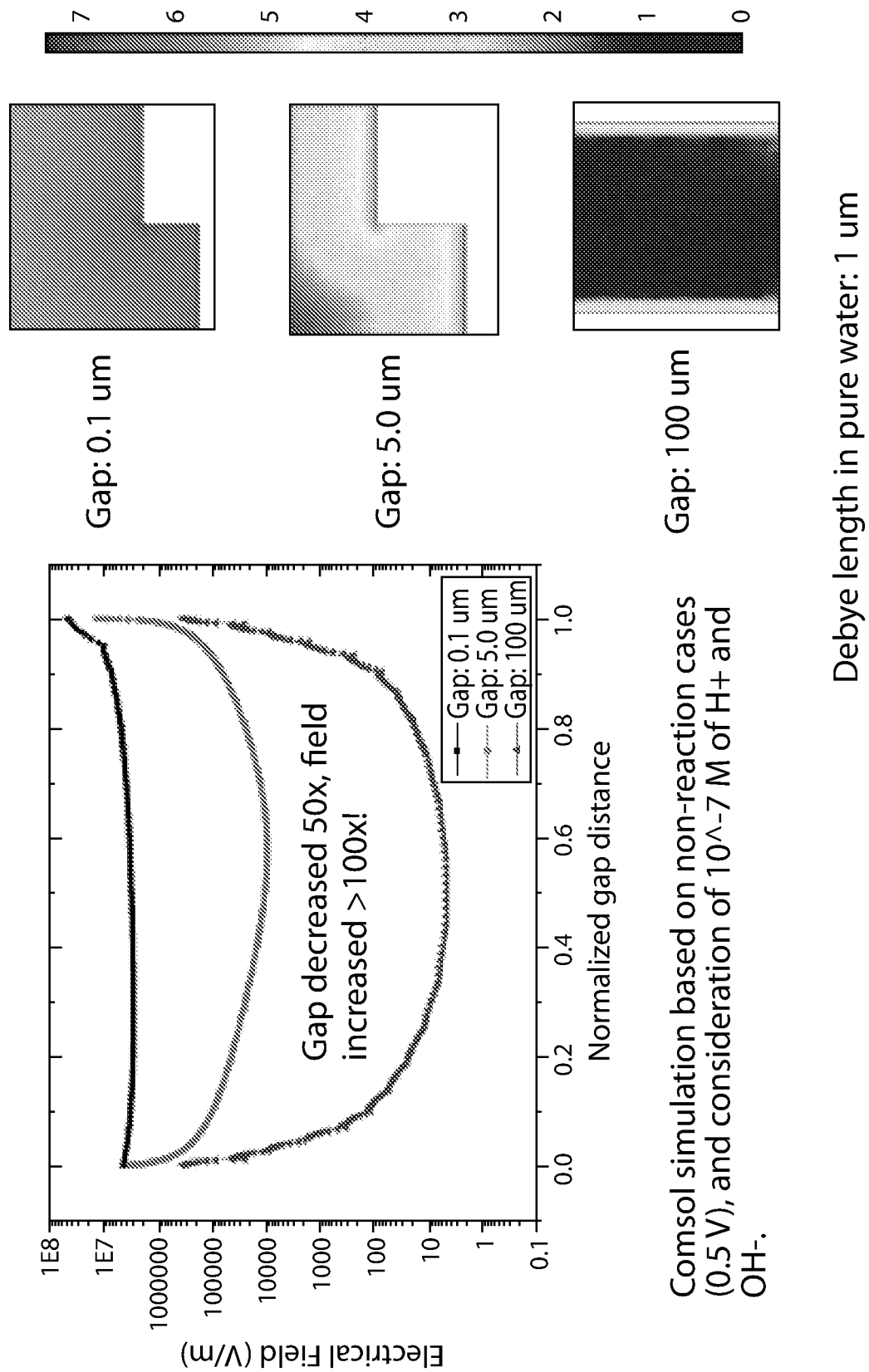
FIG. 17 depicts in accordance with various embodiments of the invention, a graph of electric field (V/m) vs. normalized gap distance.
Figure 18:
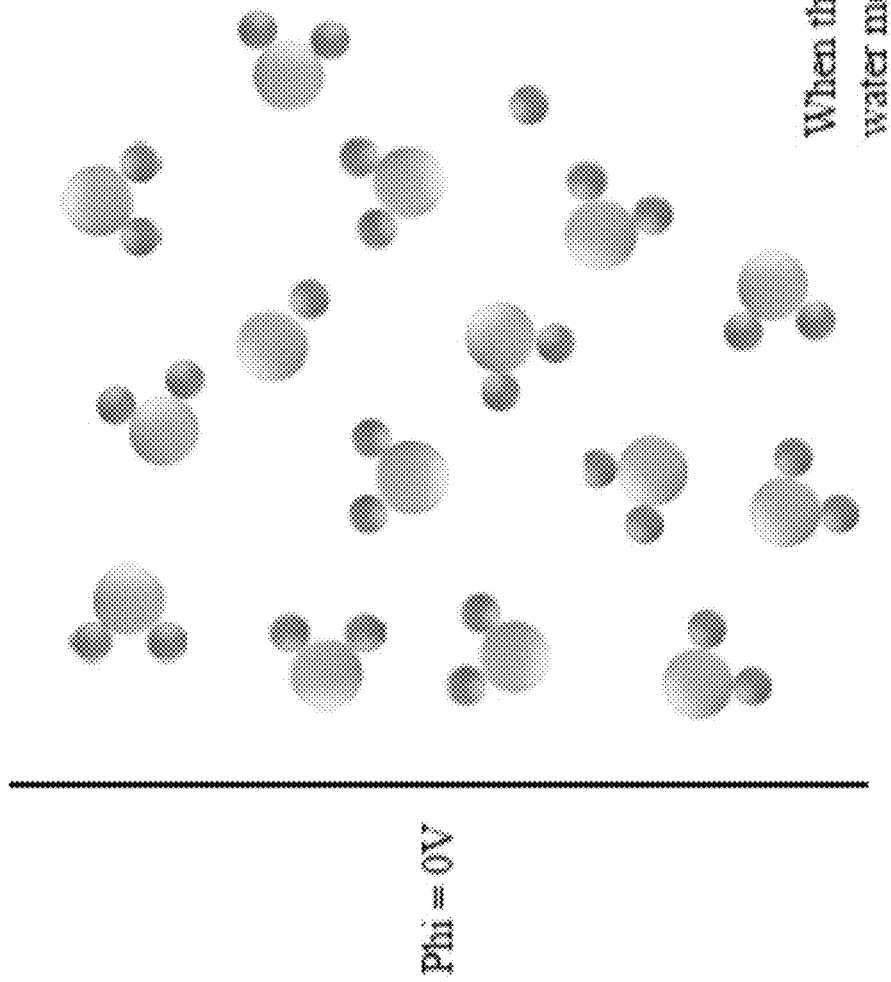
FIG. 18 depicts in accordance with various embodiments of the invention, when there is no external potential added, water molecule, $H^+$, and $OH^-$ are randomly distributed.
Figure 19:
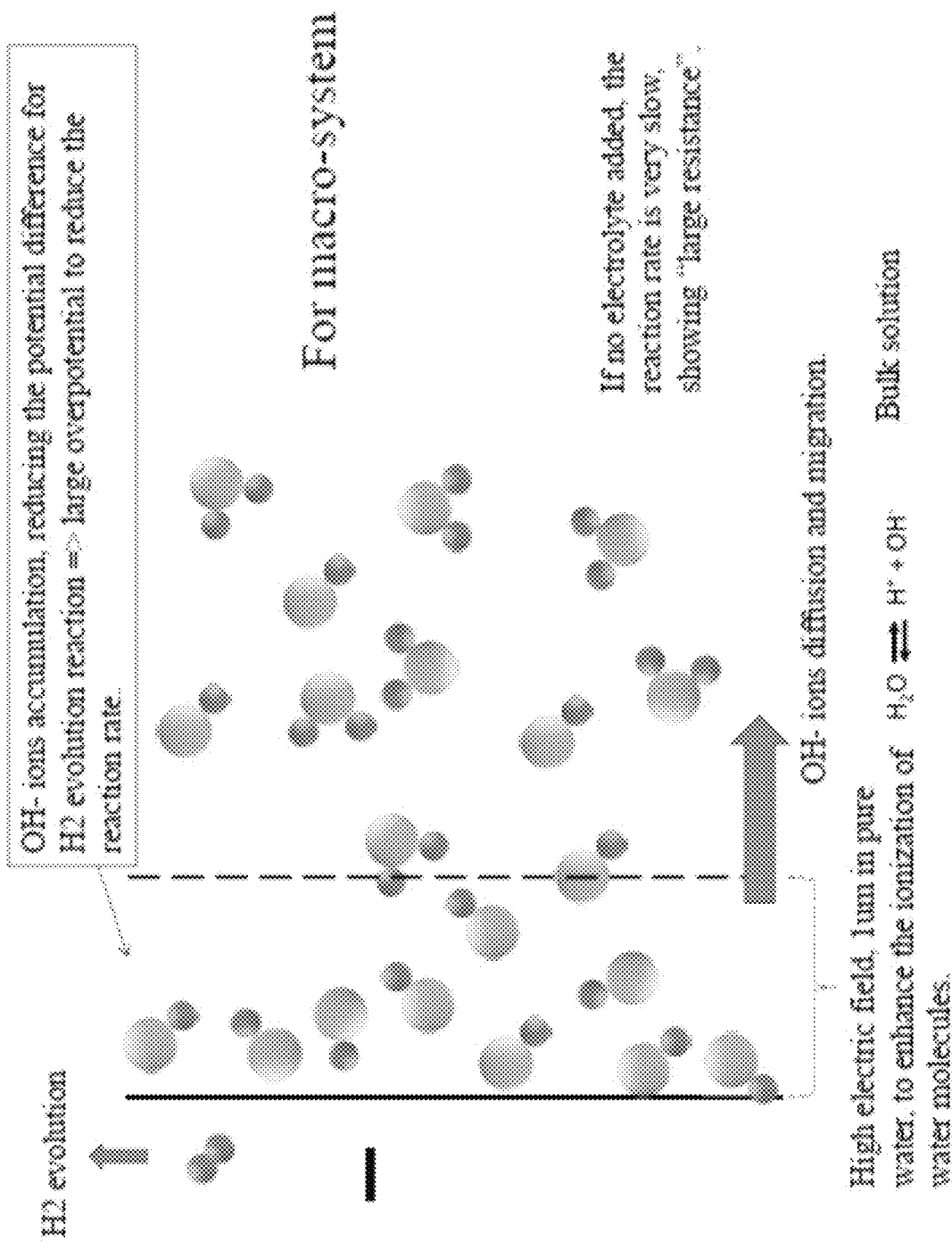
FIG. 19 depicts in accordance with various embodiments of the invention, if no electrolyte is added, the reaction rate is very slow, showing "large resistance."
Figure 20:
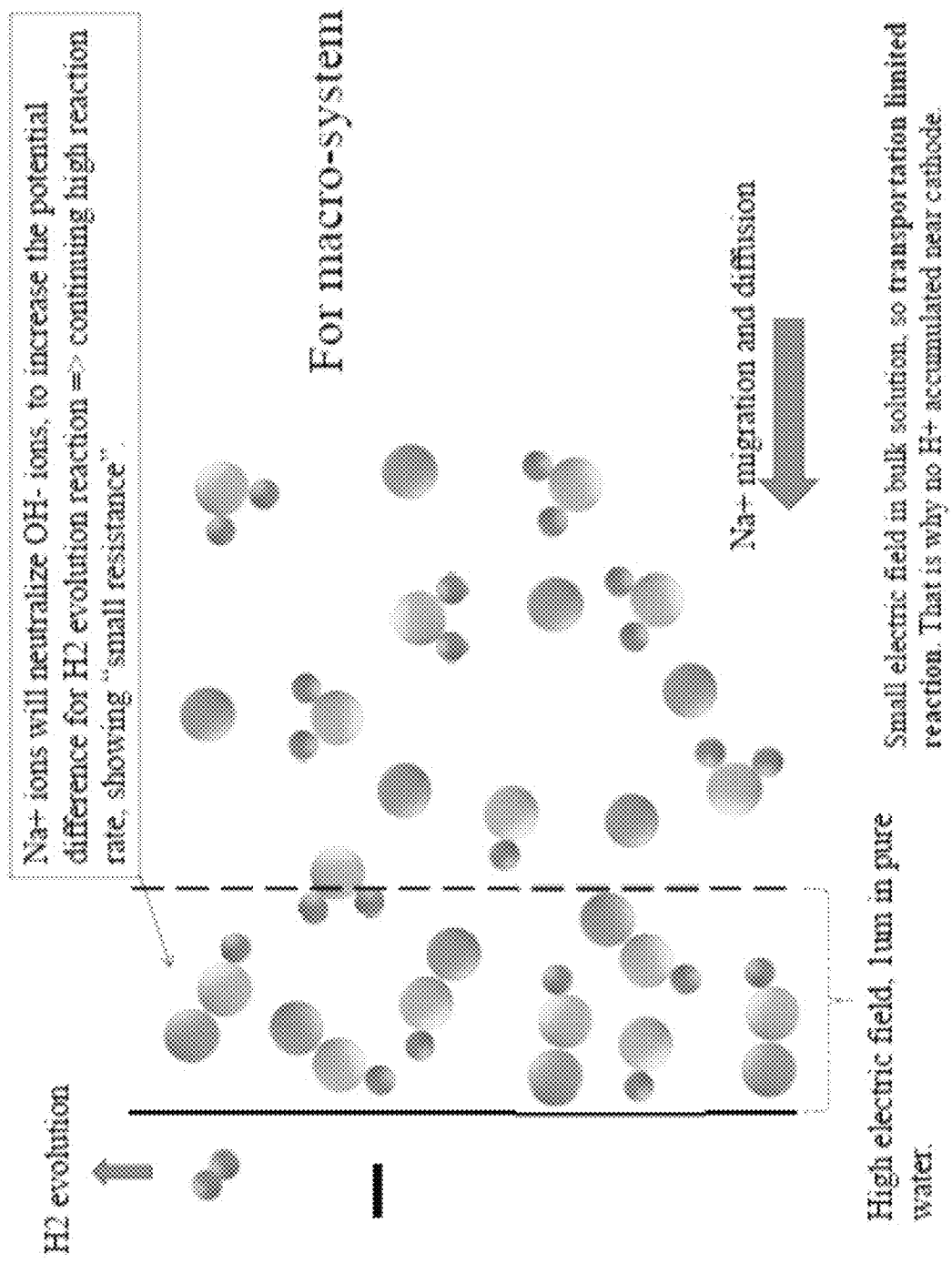
FIG. 20 depicts in accordance with various embodiments of the invention, for a macro-system there is a small electric field in bulk solution, so transportation limited reaction. That is why no $H^+$ accumulates near cathode.
Figure 21:
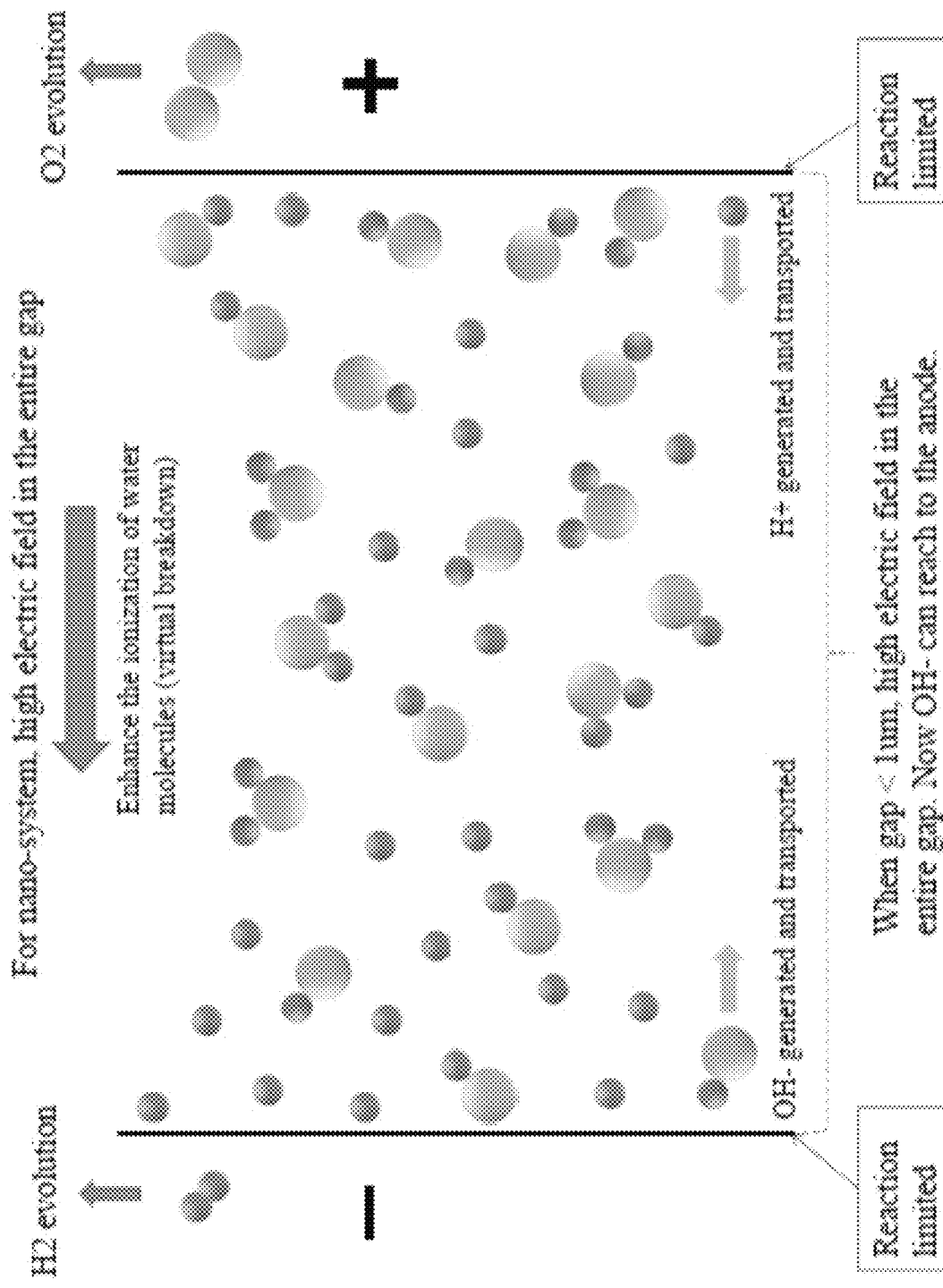
FIG. 21 depicts in accordance with various embodiments of the invention, the nano-system has a high electric field in the entire gap.
Figure 22:
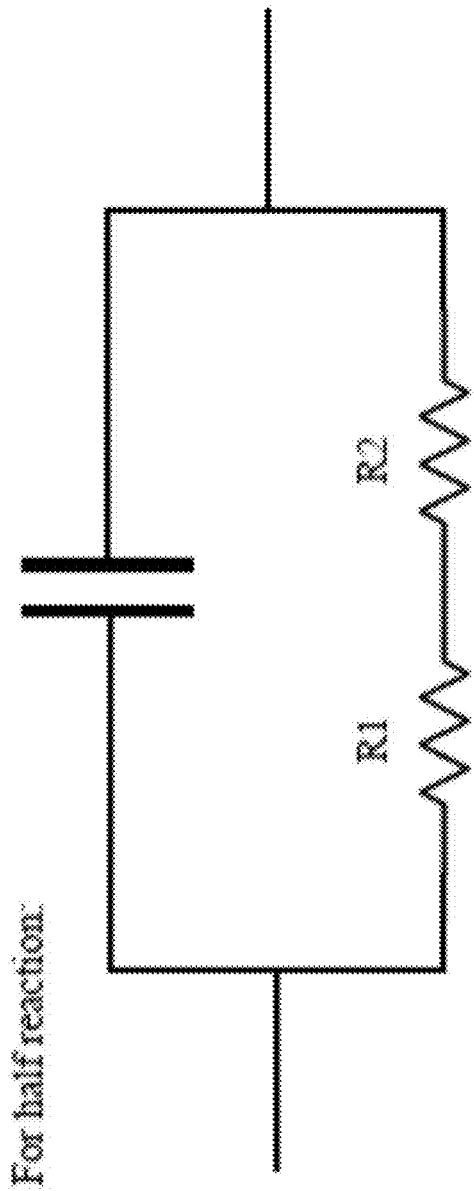
FIG. 22 depicts in accordance with various embodiments of the invention, theory and model analysis using a half reaction.
Figure 23A:
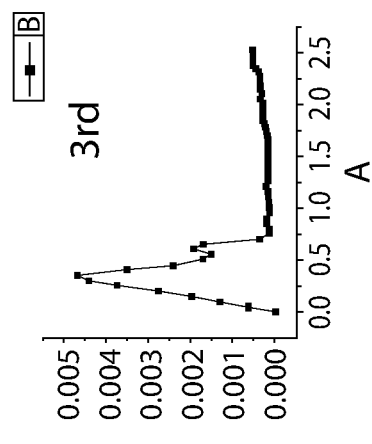
FIG. 23A-FIG. 23E depicts in accordance with various embodiments of the invention, graphs showing that thinner SiN will be more likely to get short-circuited at the beginning, due to sputtered nano metal pieces at the beginning.
Figure 23B:
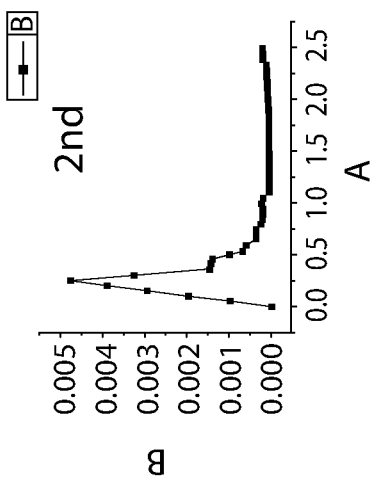
Figure 23C:
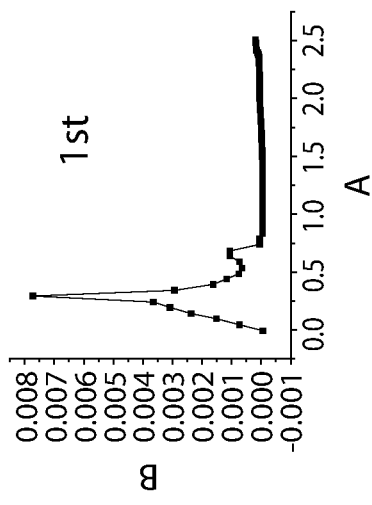
Figure 23D:
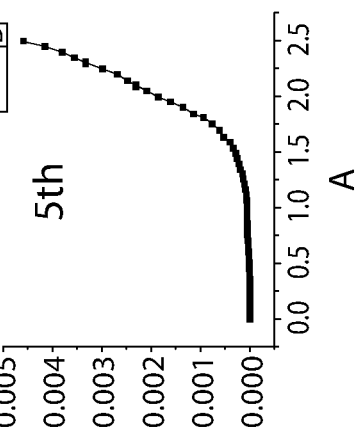
Figure 23E:
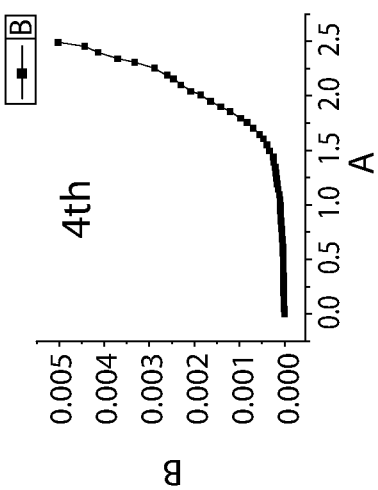
Figure 24A:
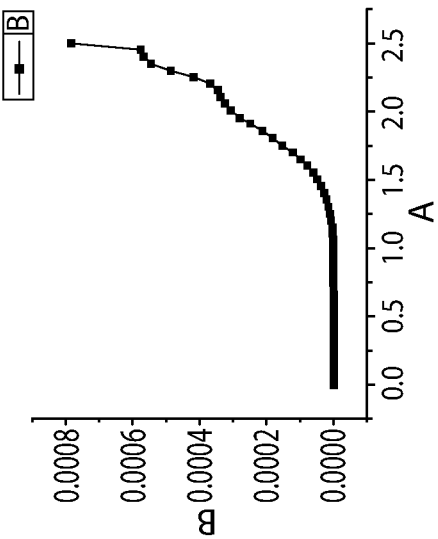
FIG. 24A-FIG. 24D depicts in accordance with various embodiments of the invention, graphs showing sometimes there are plateaus around 2V in the first several tests, so that there are two periods.
Figure 24B:
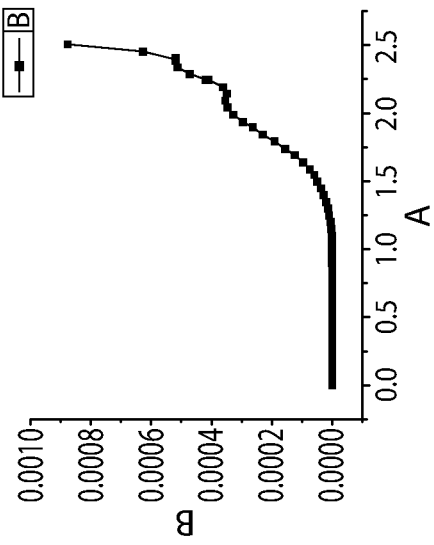
Figure 24C:
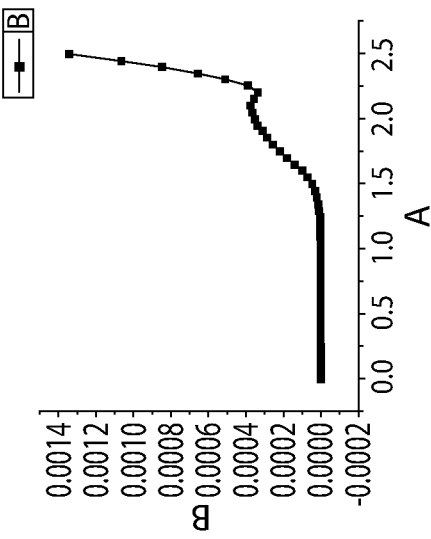
Figure 24D:
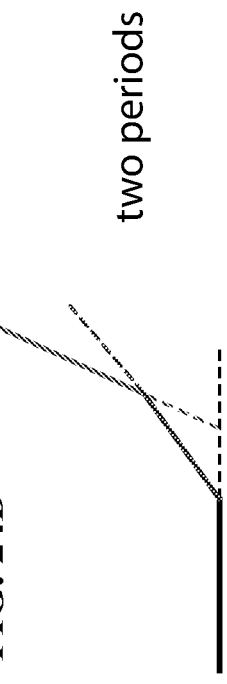
Figure 25B:
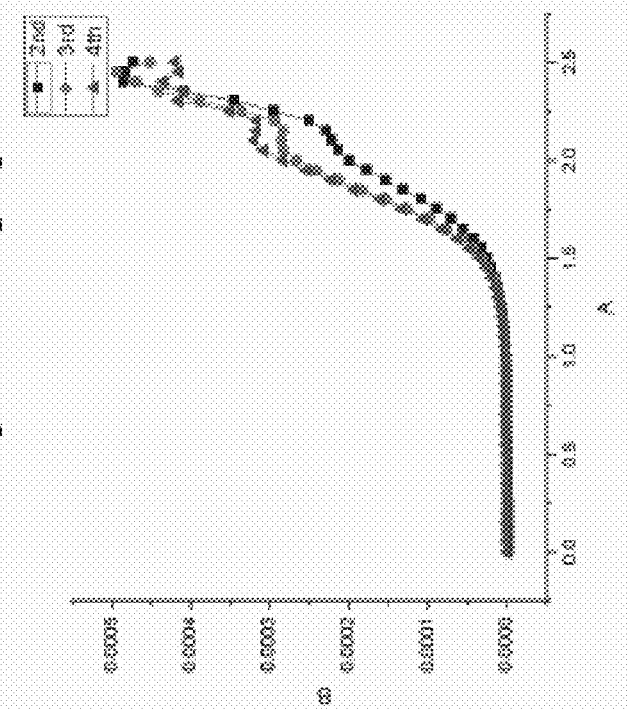
FIG. 25A-FIG. 25B depicts in accordance with various embodiments of the invention, graphs showing sometimes the plateaus are kept the same (quite repeatable), while sometimes the current at the plateau increased.
Figure 25A:
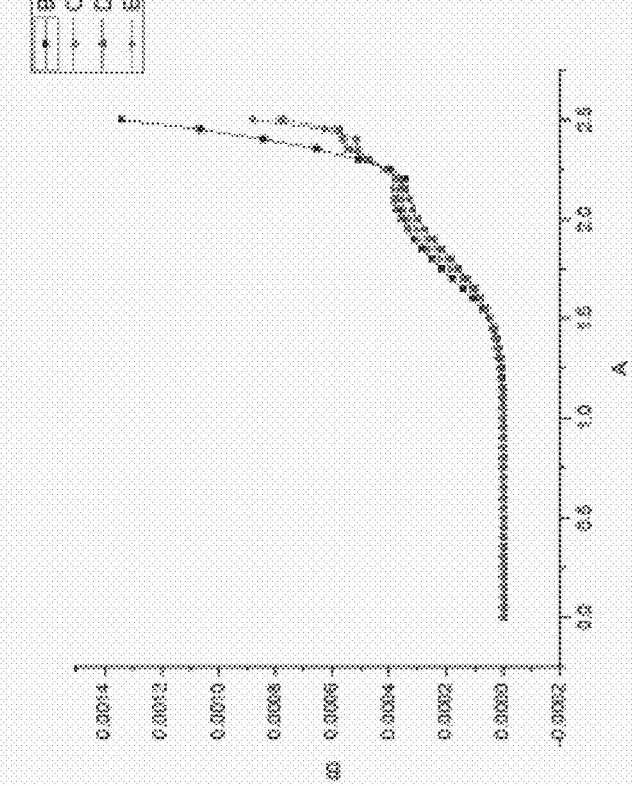
Figure 26B:
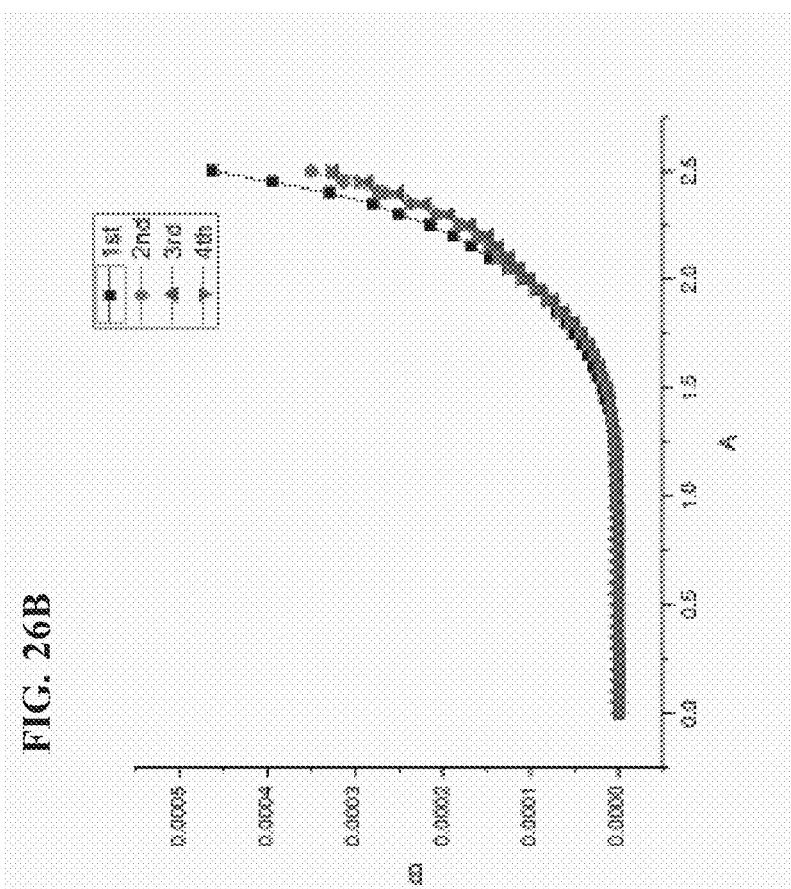
FIG. 26A-FIG. 26B depicts in accordance with various embodiments of the invention, most of the time Imax will decrease. This is due to Au surface oxidation.
Figure 26A:
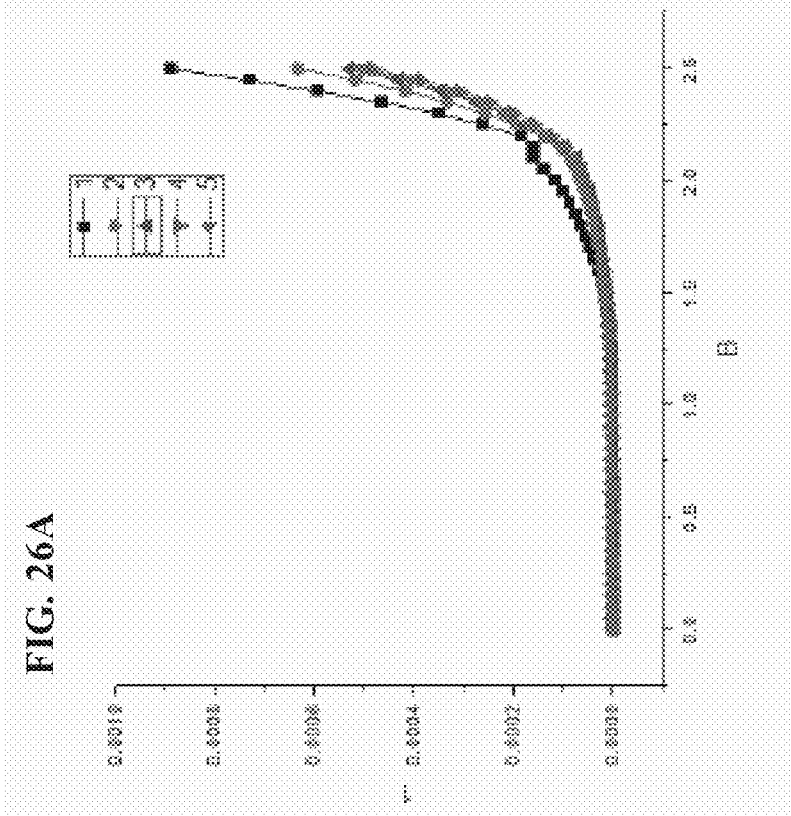
Figure 28B:
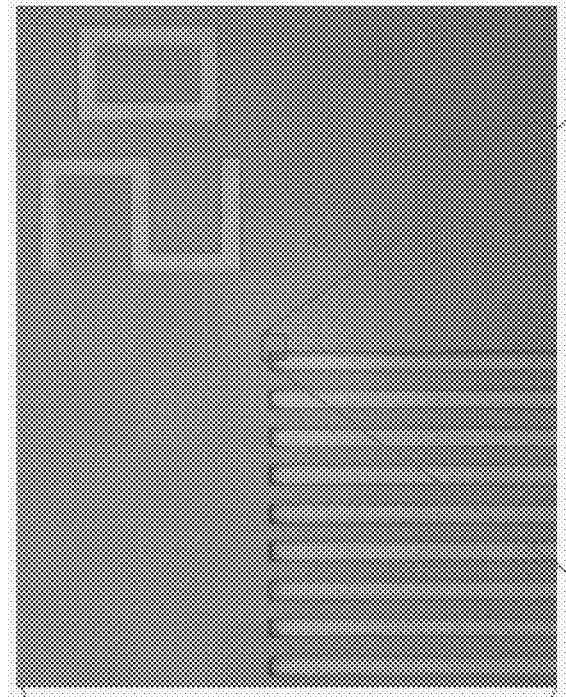
FIG. 28A-FIG. 28C depicts in accordance with various embodiments of the invention, anode damage. Au electrochemically oxidized after several tests.
Figure 28A:
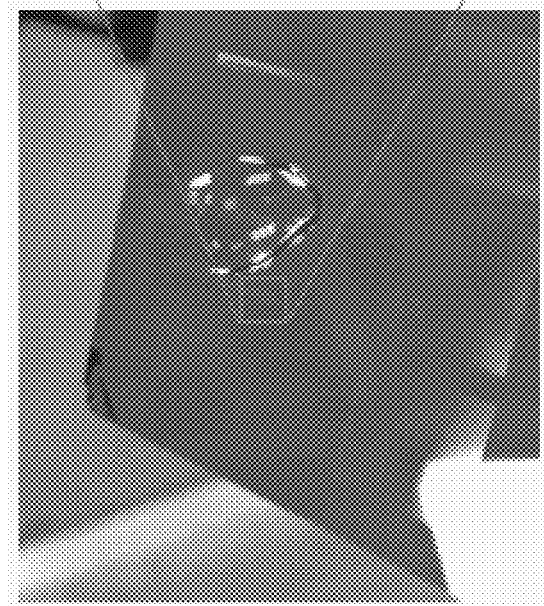
Figure 28C:
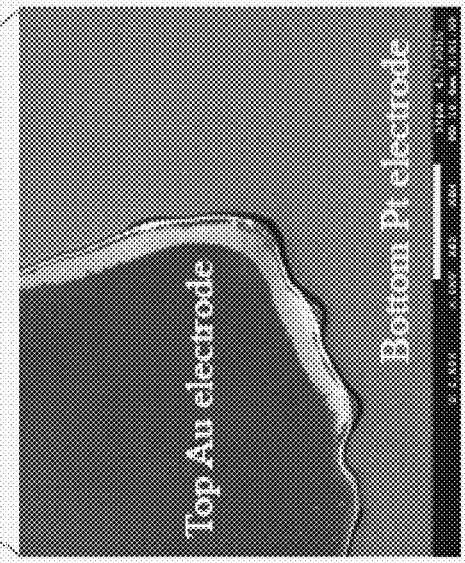

Bubbles were generated during water electrolysis based on our devices (FIG. 3). FIG. 4A shows the results of I-V curves measurement from the samples with the same pattern but different thickness of silicon nitride (i.e. different distances between electrodes). We found that when silicon nitride is thicker the threshold voltage is larger. This means the method to decrease the distance between two electrodes could reduce the external power as expected. When the distance between two electrodes is 50 nm the threshold voltage is 1.55V, which is almost the same as the theoretical limit of 1.47 V. FIG. 4B shows the results from the samples with the same thickness of silicon nitride but different grating pitches of the pattern. It indicates that the current increases linearly as the total number of edges of the gratings increases. However, in experiments we found that both Ni and Ti/Au as anodes would be corroded (FIG. 5) during water splitting, which will lead to short-circuit between electrodes. We determined that reliability can be improved by replacing the metal by indium tin oxide (ITO) or coating one ultrathin layer of dielectric for anode protection.

Example 2. Low DC-Bias Silicon Nitride Anisotropic Etching

Silicon nitride is one of the most important materials in micro/nanofabrication and applications, including diffusion barriers, etching mask material, electric insulators, etc. It has not only very excellent chemical inertia but also very high electrical resistivity. Particularly, metalinsulatormetal (MIM) sandwiched-like structures with silicon nitride as a dielectric layer have drawn a great deal of attention because of their numerous applications in MEMS switches, optical devices (e.g., metamaterials), biochemical sensing, and nanoelectronics.

However, it is hard to pattern silicon nitride by common reactive ion etch (ME) without causing short-circuit between the two metal layers in MIM sandwiched-like structures due to metal sputtered out and redeposited onto the sidewall.

Figure 29:
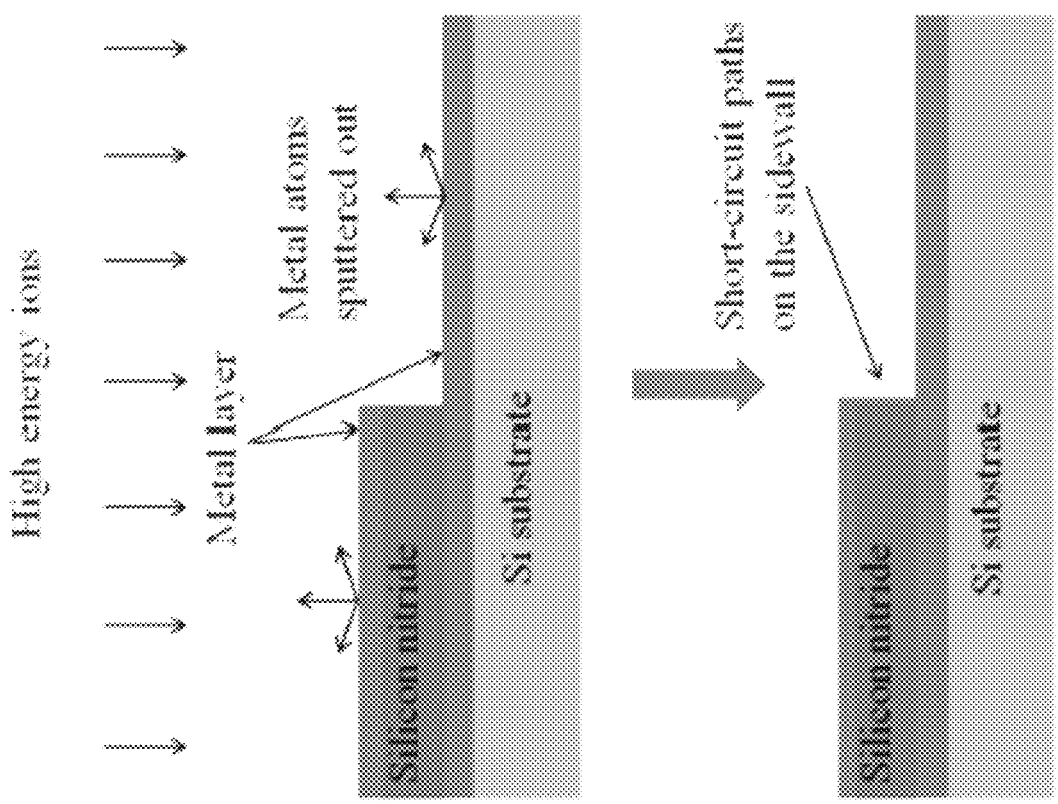
FIG. 29 depicts in accordance with various embodiments of the invention, metal atoms sputtered out and redeposited at high DC-bias etching, leading to short-circuit between two metal layers.
Figure 30A:
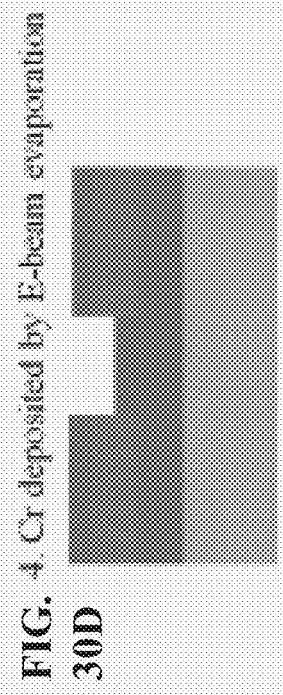
FIG. 30A-FIG. 30F depicts in accordance with various embodiments of the invention, a schematic diagram of sample fabrication processes for etching recipe test.
Figure 30B:
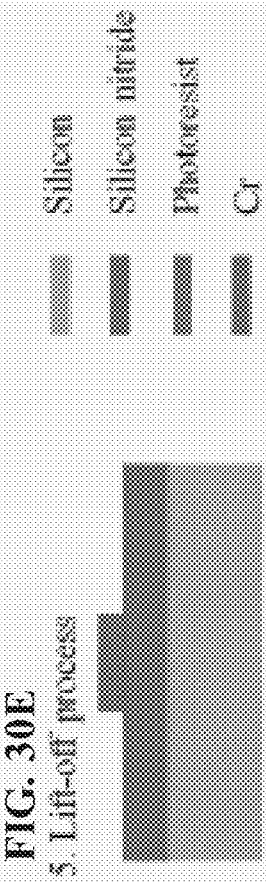
Figure 30C:
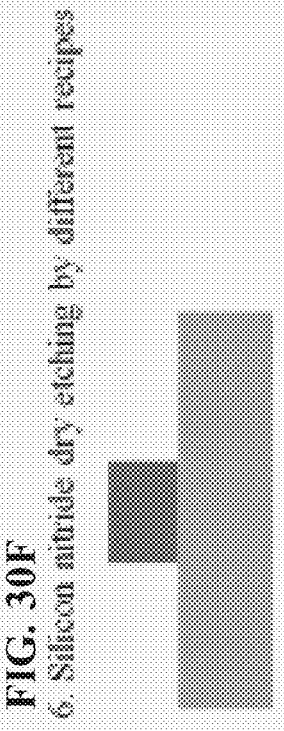
Figure 30D:
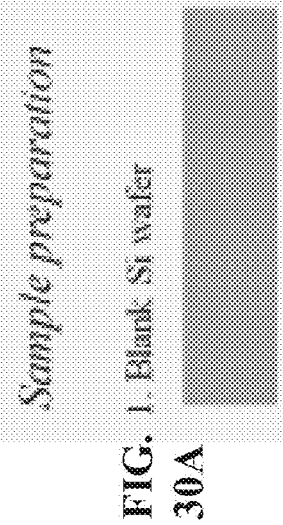
Figure 30E:
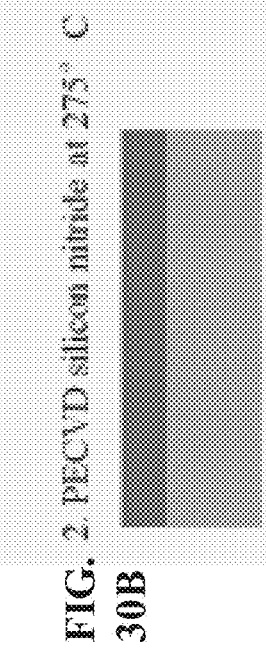
Figure 30F:
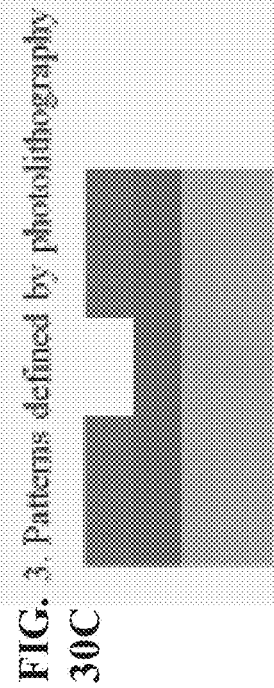

Commonly used RIE methods usually take advantages of high DC-bias (self-bias) voltage to achieve perfect anisotropic etching profile. However, as shown in FIG. 29, high energy ions will bombard the top and bottom metal layers during etching process when DC-bias is high, resulting in metal atoms sputtered out everywhere and then redeposited back onto the substrate. In some cases, especially when the silicon nitride layer is very thin, those metal atoms will be unfortunately redeposited onto the sidewall of silicon nitride and form an electrical current path, in other words, short-circuit between two metal layers. Chromium is one of the most widely used materials as metal etching mask. However, theoretical analysis indicates that the sputtering yield of chromium will be up to 0.3 atoms/ion under bombardment of only 100 eV Argon$^+$ ions. Moreover, most other metals have even higher sputtering yield. That is to say, it is very easy to sputter the metal atoms out to get short-circuit during common ME process. Wet etching of silicon nitride by hot phosphoric acid would not have such problems; however, it is isotropic and could not be utilized in some cases when vertical sidewalls are desired.

Although researchers have come up with many approaches to try to reduce the sputtering/redeposition during etching processes, such as modified gas combination, geometry and material optimization, and pressure modulation, there is no report yet applicable for particular etching methods for MIM sandwiched-like structures, especially when dielectric layer is very thin and low DC-bias is necessary. Here, we studied four factors that can affect the DC-bias and etching profile significantly: capacitively coupled RF power, inductively coupled plasma (ICP) power, the pressure in the etching chamber, and the combination of etching gases. Finally, we developed an excellent etching recipe for silicon nitride with only $SF_6$ and $C_4F_8$ as etching gases. The DC-bias was lowered to only 34 V, and the sidewall is nearly vertical, with etching rate of 40 nm/min.

Further our study also showed that this recipe could avoid shortcircuit between two metal layers effectively.

Sample Preparation

Figure 31:
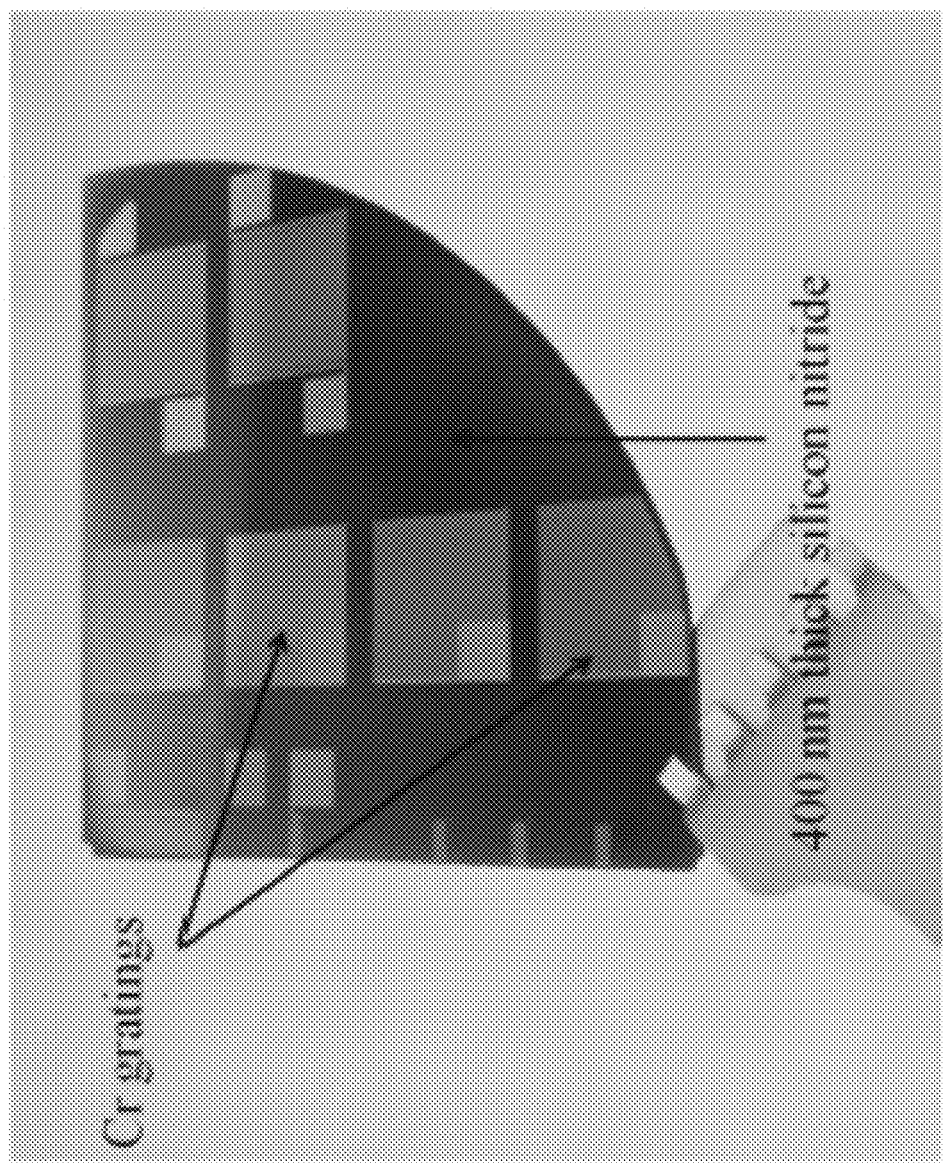
FIG. 31 depicts in accordance with various embodiments of the invention, a piece of sample prepared for etching recipe test, with 400 nm silicon nitride and Cr grating patterns on it.

The samples used to test silicon nitride etching recipes were fabricated by common semiconductor processes. As shown in FIG. 30A-FIG. 30F, first, 400 nm silicon nitride (SiNx) was deposited onto silicon wafers by plasma-enhanced chemical vapor deposition at 275 C. Then, photolithography, e-beam evaporation, and lift-off processes were used to define 30 nm thick chromium gratings on top of the deposited SiNx film, which were used as etching mask to test etching profiles. FIG. 31 shows a piece of sample prepared for etching recipe test.

Etching Test and Analysis

In general, both physical etching and chemical etching are exploited during dry etching processes, to keep balance between vertical profile and high selectivity. In experiments, we used only $SF_6$ and $C_4F_8$ (and sometimes $O_2$) as etching gases. $SF_6$ was mainly used to generate F and $SF_x$ free radicals to etch $SiN_x$, while $C_4F_8$ was the source of carbon-based passivation layer to protect the sidewall from etching (sometimes, $O_2$ was used to adjust the C/F ratio slightly). In order to reduce the physical bombardment etching, and hence the sputtering of metal layer, we did not use argon as etching gas.

Two key points of etching recipes were investigated: first is the DC-bias, which should be low enough to reduce the sputtering yield; second is the etching profile, which should have vertical sidewalls as desired. There is a trade-off between those two, because it is difficult to generate vertical sidewalls with low DC-bias, in which physical bombardment is very weak; therefore, isotropic chemical etching is dominant.

One thing needs to be clarified: due to the collisions and scatterings of the ions from gas molecules (and ions) in the chamber, the kinetic energy of the bombardment ions is not necessarily the same as the DC-bias times the charge. But the kinetic energy is not directly measurable in contrary to the DC-bias, and DC-bias and the bombardment energy are closely correlated, so we studied the DC-bias instead. By carefully controlling the parameters of etching recipes, passivation and etching will be in dynamic equilibrium at the sidewalls, and therefore, vertical sidewalls can be achieved even when DC-bias is very low.

Four factors were studied: capacitively coupled RF power, ICP power, pressure in the etching chamber, and combination of etching gases. Each of them will affect the DC-bias and the etching profile significantly; even sometimes, the effects are coupled and not simply monotonous. Here, we tried different etching recipes with the same etching time of 5 min, and observed the DC-bias variation and the final etching profiles. The original silicon nitride layer was 400 nm, and the RIE etcher was Oxford Plasmalab system 100.

Capacitively Coupled RF Power

Figure 32:
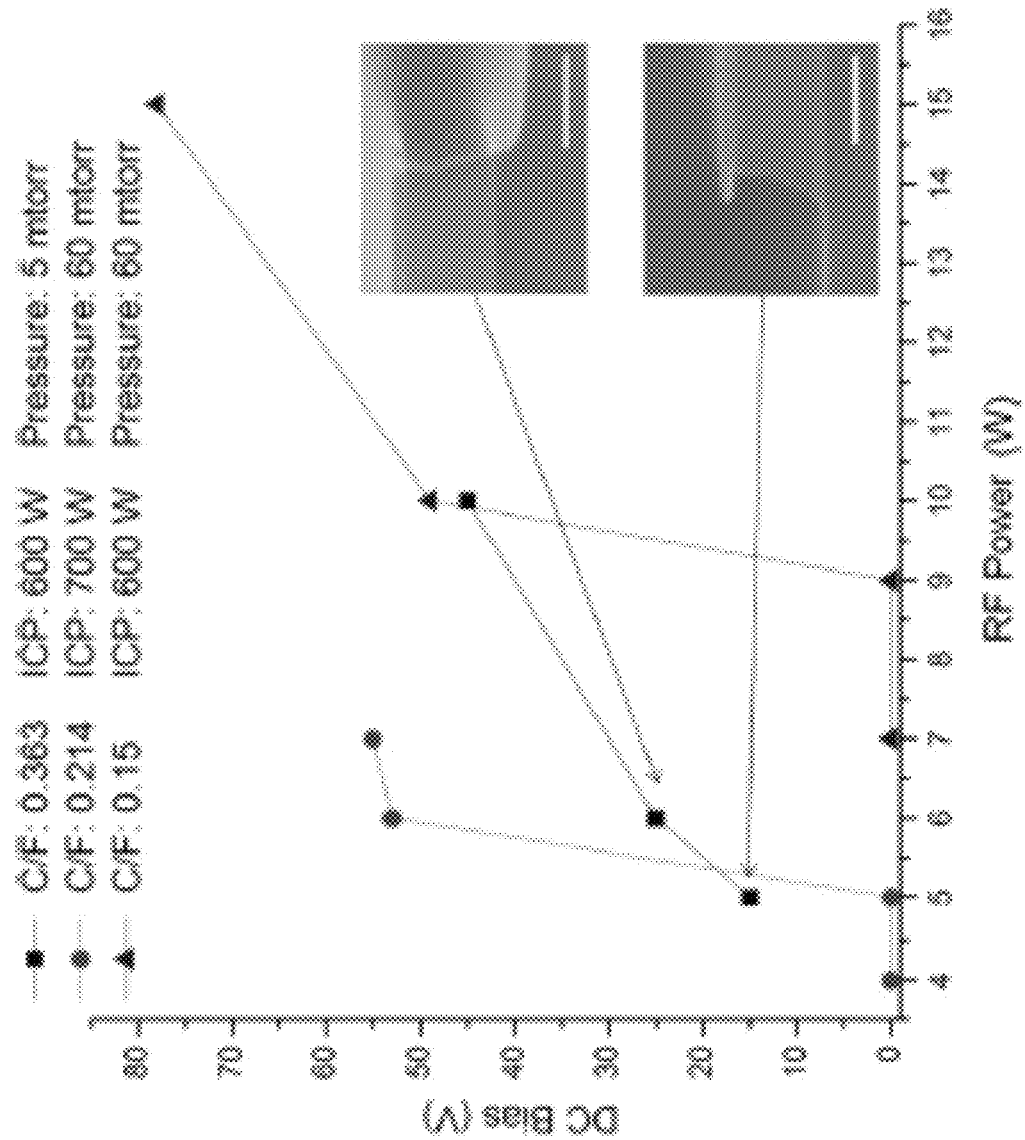
FIG. 32 depicts in accordance with various embodiments of the invention, relationship between DC-bias and capacitively coupled RF power. The scale bar is 400 nm.

FIG. 32 shows the relationship between DC-bias and capacitively coupled RF power (or "RF power" abbreviated herein). When RF power increases, DC-bias increases monotonically. However, there is a striking RF power below which the DC-bias keeps at zero. At this striking threshold, DC-bias is not stable and could be either very high or zero. However, once the DC-bias has been activated, it is maintained easily. When the pressure is low enough, it is easier for striking because the mean-free-path gets larger so electrons can accumulate enough energy to excite the gas molecules. And also, when ICP power is higher, the striking RF power needed is smaller because ICP power increases the plasma density.

Moreover, we discovered that it is difficult to find low DC-bias recipe at high pressure. Experiments showed that the minimum DC-bias with struck plasma at high pressure is very large. FIG. 32 shows two SEM images at relatively low DC-bias (15 and 25 V, respectively). The one with lower RF power had lower DC-bias, and correspondingly achieved lower etching rate and more isotropic etching profile due to lower ion energy to remove the passivation layer and enhance the chemical etching rate at the bottom.

ICP Power

Figure 33:
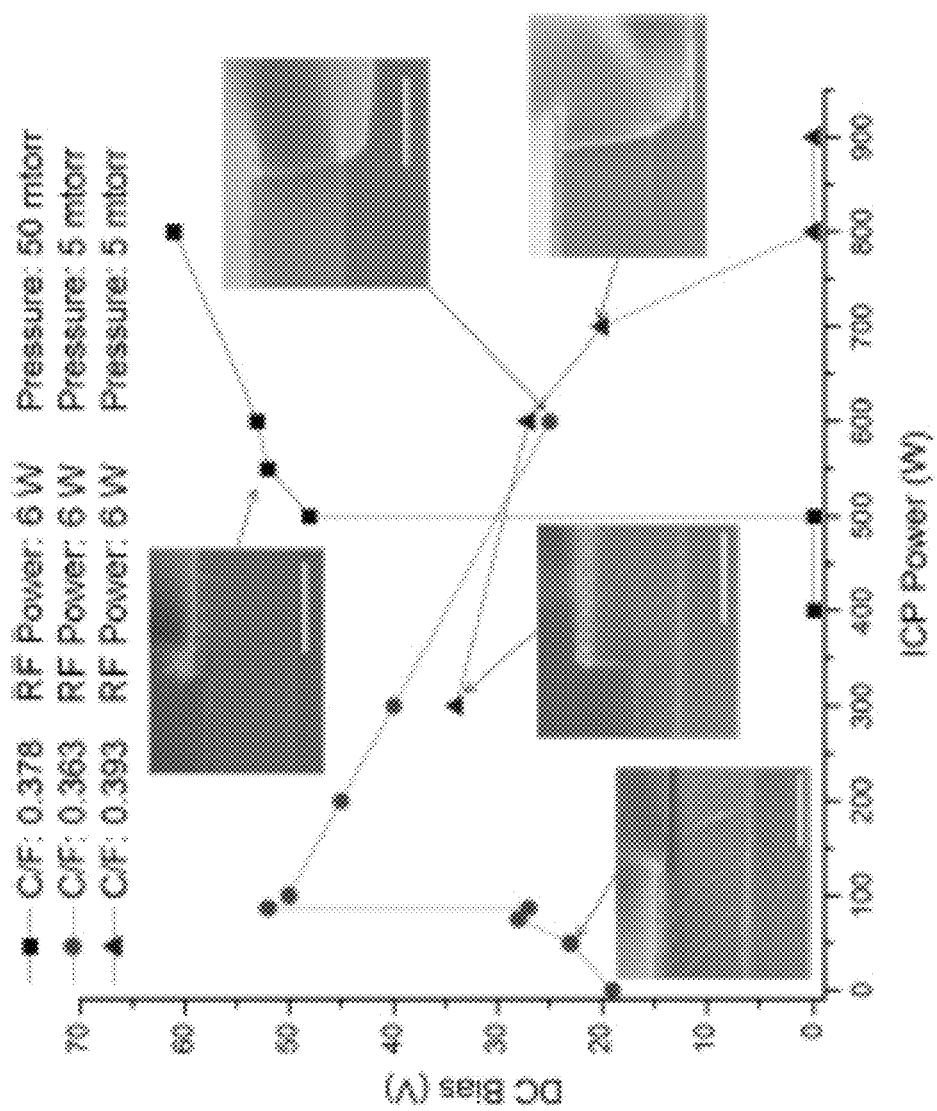
FIG. 33 depicts in accordance with various embodiments of the invention, relationship between DC-bias and ICP power. The scale bar is 400 nm.

The relationship between DC-bias and ICP power is shown in FIG. 33. The circle line shows that DC-bias first turns on suddenly (the plasma strikes) and then decreases slowly along with ICP power increasing. The turn-on points are when the ionization rate is sufficient to compensate the electron loss (the triangle line only shows the data after its turn-on point and the square line only shows the data before its turn-on point). The turn-on points increase if the pressure increases, because mean-free-path gets shorter so more power are necessary to generate sufficient ionization rate. After the turn-on points, increasing ICP power results in larger plasma density, so the ion flow current toward the substrate increases. At fixed RF power, the product of ion flow current and bias voltage between two capacitive plates is conserved, therefore larger ICP power will lead to lower DC-bias.

Two SEM images from the circle line and the square line in FIG. 33 show nonetching results when the values of the ICP power are smaller than the turning points. The etching rate is almost zero even at high DC-bias because the plasma density is insufficient to generate enough radicals and to etch efficiently. Comparison within three SEM images from the triangle line indicates that ICP power affects the etching rate significantly: larger ICP power leads to faster etching. However, larger ICP power may not be a good choice even it will decrease the DC-bias, because lateral etching will also become faster so that the profile will become even more isotropic.

Pressure

Figure 34:
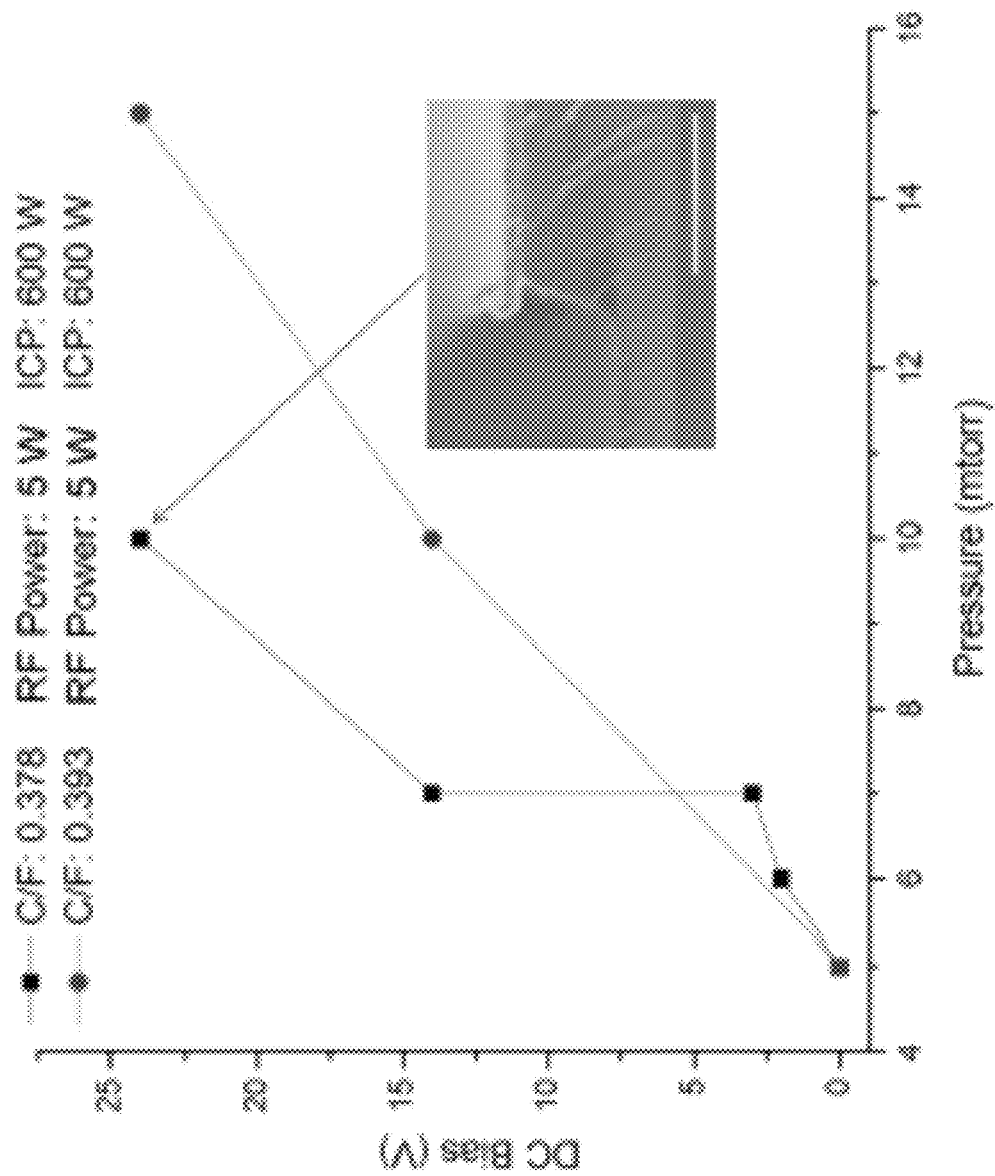
FIG. 34 depicts in accordance with various embodiments of the invention, relationship between DC-bias and the pressure in the chamber. The scale bar is 400 nm.

The relationship between DC-bias and the pressure in the chamber is shown in FIG. 34. At low pressure, DC-bias increases as the pressure increases, which may result from increasing amount of charged particles (ions and electrons). However, we also discovered that at high pressure, DC-bias decreases as the pressure increases due to shorter mean-freepath. We also found that at very high pressure, the etching rate is much slower, which results from insufficient kinetic energy of the ions at high pressure with the fixed RF power and ICP power. When the pressure is too high (e.g., 50 mTorr), in fact, the plasma is difficult to be struck and the DC-bias keeps zero when RF power is relatively low. People have discovered that, low pressure can avoid etching product substrate redeposition and also may reduce the negative taper angle for trench etching. Therefore, here low pressure is our primary selection for low DC-bias etching.

Etching Gas Combinations

Figure 35:
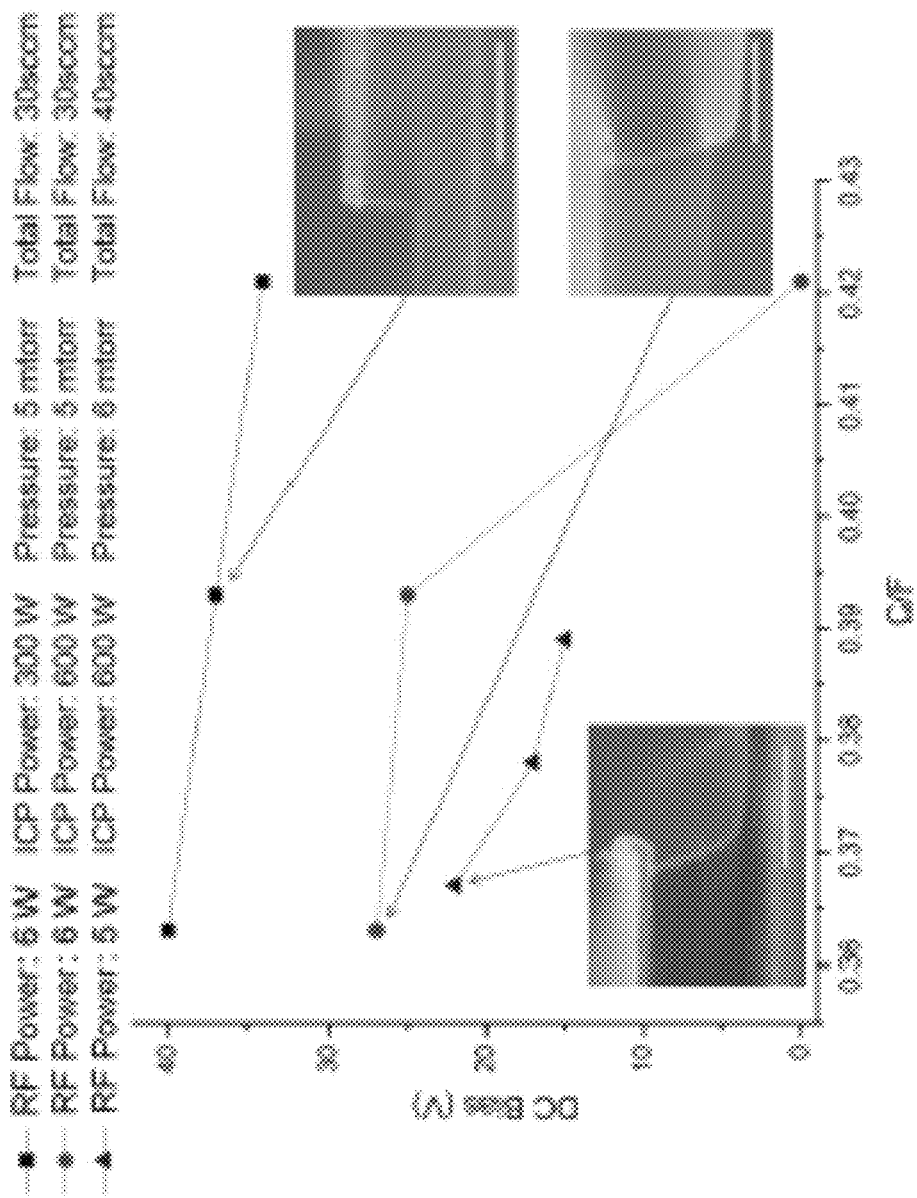
FIG. 35 depicts in accordance with various embodiments of the invention, relationship between DC-bias and etching gas combinations. The scale bar is 400 nm.

When the total flow rate is constant and the pressure is low, DC-bias decreases as C-to-F ratio increases, as shown in FIG. 35. That may be because carbon atoms are easier to be ionized than fluorine atoms; therefore, the gas in the chamber is more conductive with increasing C-to-F ratio. Another reason may be the electronic attachment of fluorine plasma, in which F ions tend to catch electrons to form $F^-$ ions. This leads to less free electron density between the capacitive plates then higher DC-bias voltage. While at high pressure, the DC-bias can either increase or decrease along with the increasing C-to-F ratio, depending on different recipes. The C-to-F ratio only plays a big role on the etching profile, coupled with the effect by DC-bias.

Beaklike Structures

Figure 36:
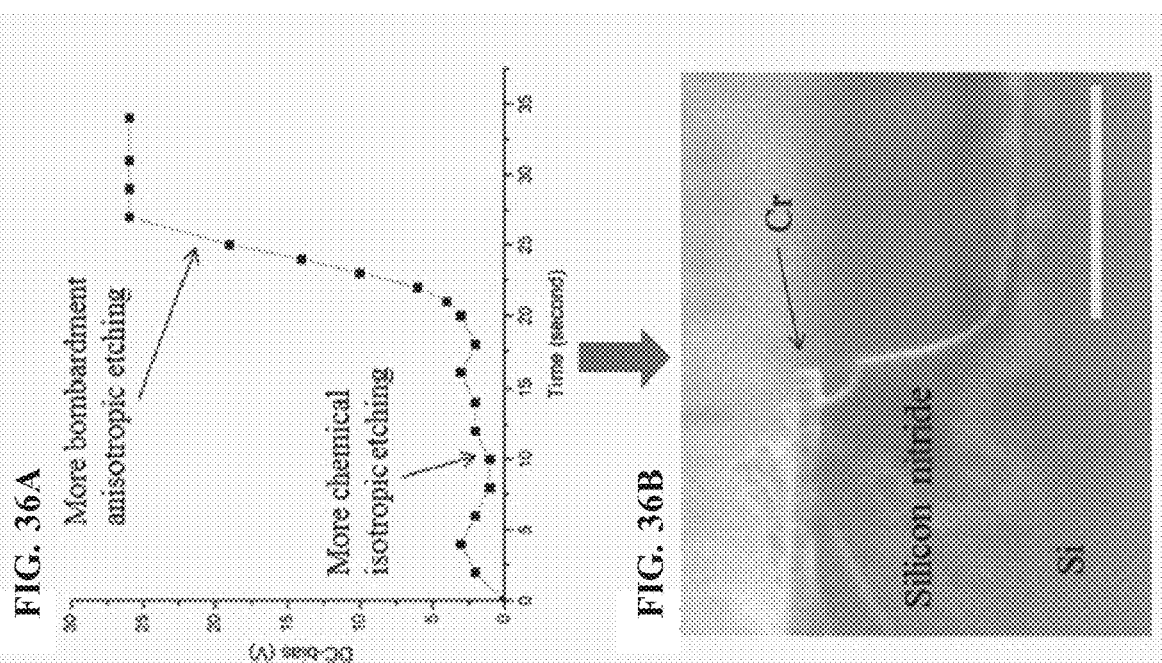
FIG. 36A-FIG. 36B depict in accordance with various embodiments of the invention, (FIG. 36A) typical DC-bias matching period vs time.

In experiments, we discovered interesting beaklike structures formed at the top edge of silicon nitride at certain conditions, as shown in FIG. 36B. This is because the RF matching network tuning period sometimes can last up to several tens of seconds. During that time, the etching is mainly isotropic chemical etching because the reflected power is very high so the DC-bias is very low. When the tuning network gets matched, the DC-bias increases very fast to its stable value, after which there is more physical bombardment due to large DC-bias, and the etching profile goes back to normal. FIG. 36A shows a typical DC-bias matching period versus time.

The beaklike structures only occur when it takes a long time to tune the RF matching network. These initial striking periods are related to the etching recipes, and generally higher RF power, lower pressure, and higher final stable DC bias give shorter initial striking periods. We also discovered that more conductive substrates will reduce the initial striking periods significantly.

High-Performing Etching Recipe

Figure 37:
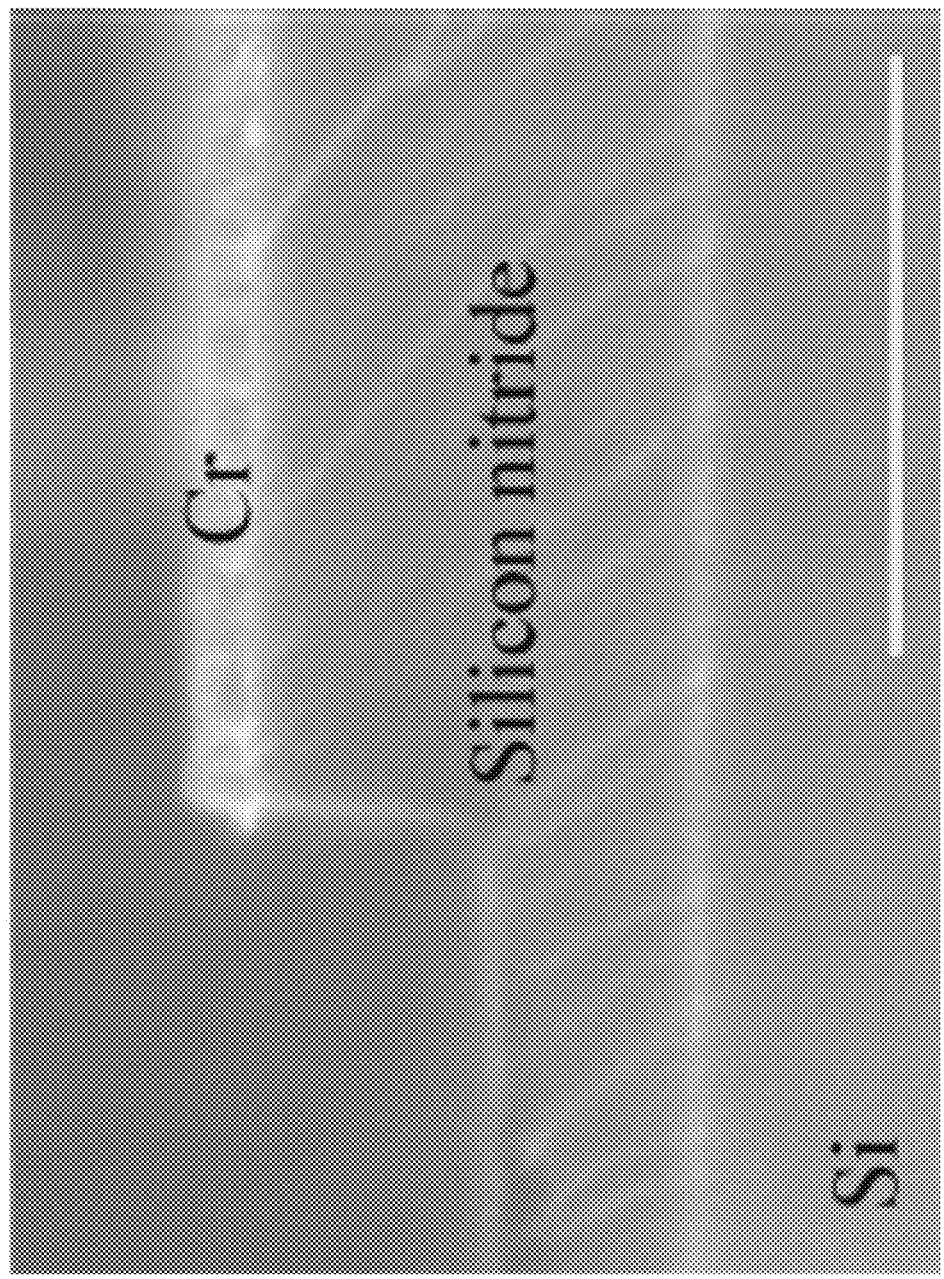
FIG. 37 depicts in accordance with various embodiments of the invention, low DC-bias silicon nitride anisotropic etching based on an inventive recipe. The scale bar is 500 nm.

By meticulously controlling the parameters of etching recipes, we eventually found a recipe with DC-bias of only 34V and nearly 90° sidewall, as shown in FIG. 37, and the etching rate is 40 nm/min, which is fast enough for etching thin silicon nitride film in nanometer scale. The parameters are shown in Table 1 (FIG. 39). Moreover, further study shows that the selectivity between silicon nitride and chromium based on our optimal recipe is larger than 100:1.

More significantly, our experiments show that this recipe can be used to fabricate MIM sandwiched-like structures without causing short circuit between top and bottom metal layers. The cross section of one of the testing samples is shown in FIG. 38B, which has two 30 nm thick chromium layers and one 50 nm thick silicon nitride layer in between. The samples were tested under a common silicon nitride dry etching recipe with DC-bias of around 300V and our optimal recipe with DC-bias of only 34V for comparison. By measuring the resistances between each top Cr pad electrode and the bottom Cr layer electrode (FIG. 38A), we approved that our recipe can avoid short-circuit nearly 100% between two metal layers (resistances out of the range of our multimeter) while the common recipe always leads to short-circuit (smaller than 100×) between almost all the pad electrodes and the bottom metal layer.

Summary

In this paper, we provide a high-performing recipe for silicon nitride etching, with DC-bias of only 34 V, which prevents short circuits in fabricated MIM structures, and nearly 90° etching sidewalls. The four main factors, capacitively coupled RF power, ICP power, the pressure in the etching chamber, and the combination of etching gases, have been studied to achieve low DC-bias and desired etching profiles. We discovered that the beaklike structures formed on the top edge of silicon nitride layer due to initial striking periods at certain etching conditions, which could be promising functional structures for some applications. The relationships between the four factors and etching results we discussed here can applied not only on silicon nitride, but also many other materials.

Example 3a (Part 1)

Due to the low conductivity of pure water, using an electrolyte is common for achieving efficient water electrolysis. In the present invention, we provide, in various embodiments a system for the electrolysis of pure water (without any added electrolyte) using deep-sub-Debye-length nanogap electrochemical cells. At such nanometer scale, the field-driven pure water splitting exhibits a completely different mechanism from the macrosystem. We have named this process "virtual breakdown mechanism" that results in a series of fundamental changes and more than $10^5$-fold enhancement of the equivalent conductivity of pure water. This fundamental discovery has been theoretically discussed in this paper and experimentally demonstrated in a group of electrochemical cells with nanogaps between two electrodes down to 37 nm. Based on our nanogap electrochemical cells, the electrolysis current from pure water is comparable to or even larger than the current from 1 mol/L sodium hydroxide solution, indicating the high-efficiency of pure water splitting as a potential for on-demand hydrogen production.

We have demonstrated a new approach to improve the electrochemical reaction efficiency, by using electrochemical cells with distance between anode and cathode in nanometer-scale. With these nanogap electrochemical cells (NECs), pure water (without any added electrolyte) can be electrochemically split into hydrogen and oxygen efficiently, in contrary to the traditional thinking that pure water cannot be electrolyzed. Our experiments have demonstrated that the equivalent conductivity of pure water has been enhanced more than $10^5$-fold, and the performance of NECs with pure water can be comparable to or even better than with 1 mol/L sodium hydroxide solution, which results from a completely different microscopic mechanism of field-driven ions transport to enhance water ionization and even virtual breakdown. Compared to current industrial water electrolysis operated at 70-90° C. [2, 3] with strong alkaline electrolyte, our NEC design with pure water can eliminate difficulties of working with strong alkaline electrolyte and also avoid the need for high temperatures, showing a great potential for high energy-efficiency on-demand hydrogen production for both mass manufacturing and portable devices.

Figure 40A:
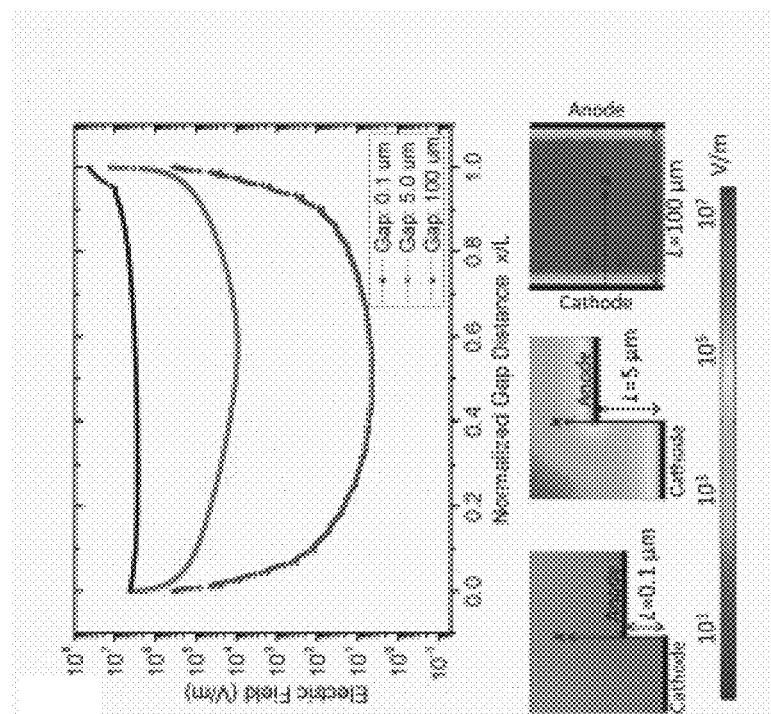
FIG. 40A-FIG. 40B depict in accordance with various embodiments of the invention, high electric field distributed in the entire gap between anode and cathode in NECs.
Figure 40B:
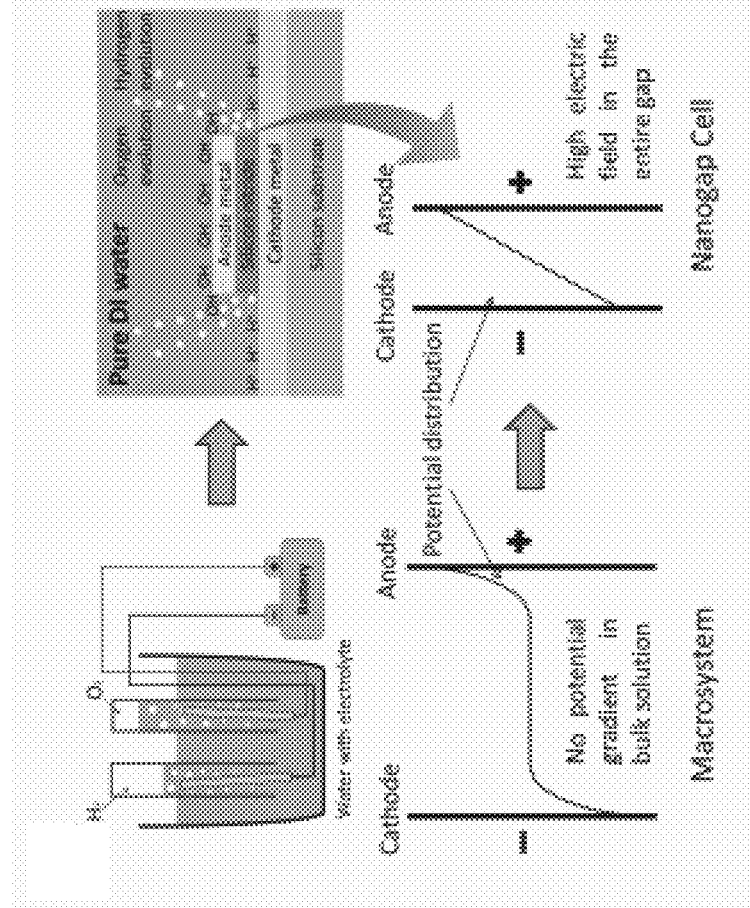

For simplicity, consider the solution resistance between anode and cathode for water splitting, as given by $$R = \rho \frac{l}{S} \quad (1)$$

where $\rho$ is the resistivity, l is the resistor length (electrode distance) and S is the cross-section area of the resistor. We found that as the electrode distance shrinks to much smaller than Debye-length $\lambda d$ (around 1 μm for pure water), not only the value of l decreases, the equivalent resistivity $\rho$ decreases greatly as well, which in fact contributes more to the decrease of resistance R. This is attributed to the huge electric field between two electrodes within such deep-sub-Debye-length region (FIG. 40A-FIG. 40B). For water electrolysis with strong electrolyte in macrosystem, the electric field is screened by the double layer, leading to nearly zero electric field in bulk solution (FIG. 40A). However, when the electrode gap distance is smaller than the Debye-length, large electric field can be uniformly distributed in the entire gap due to overlapping of the double layers at the two electrodes. In our metal-dielectric-metal sandwiched-like NECs, the gap distance is tuned by adjusting the silicon nitride thickness and can be easily achieved to deep-sub-Debye-length in pure water. FIG. 40B shows the simulation results of electric field distribution between two electrodes with different gap distances. Close to the electrode regions both the nanogap cell and the macrosystem present a high electric field due to the double layer; however, in bulk solution the electric field in 100 μm macrosystem is only 10 V/m while in 0.1 μm gap the field can obtain $10^7$ V/m. Such a high electric field in the entire gap of nanogap cells can result in significant ion enrichment and ion migration [18, 19], and even further water ionization and virtual breakdown.

Theoretical Analysis

Figures 41A, 41B, 41C:
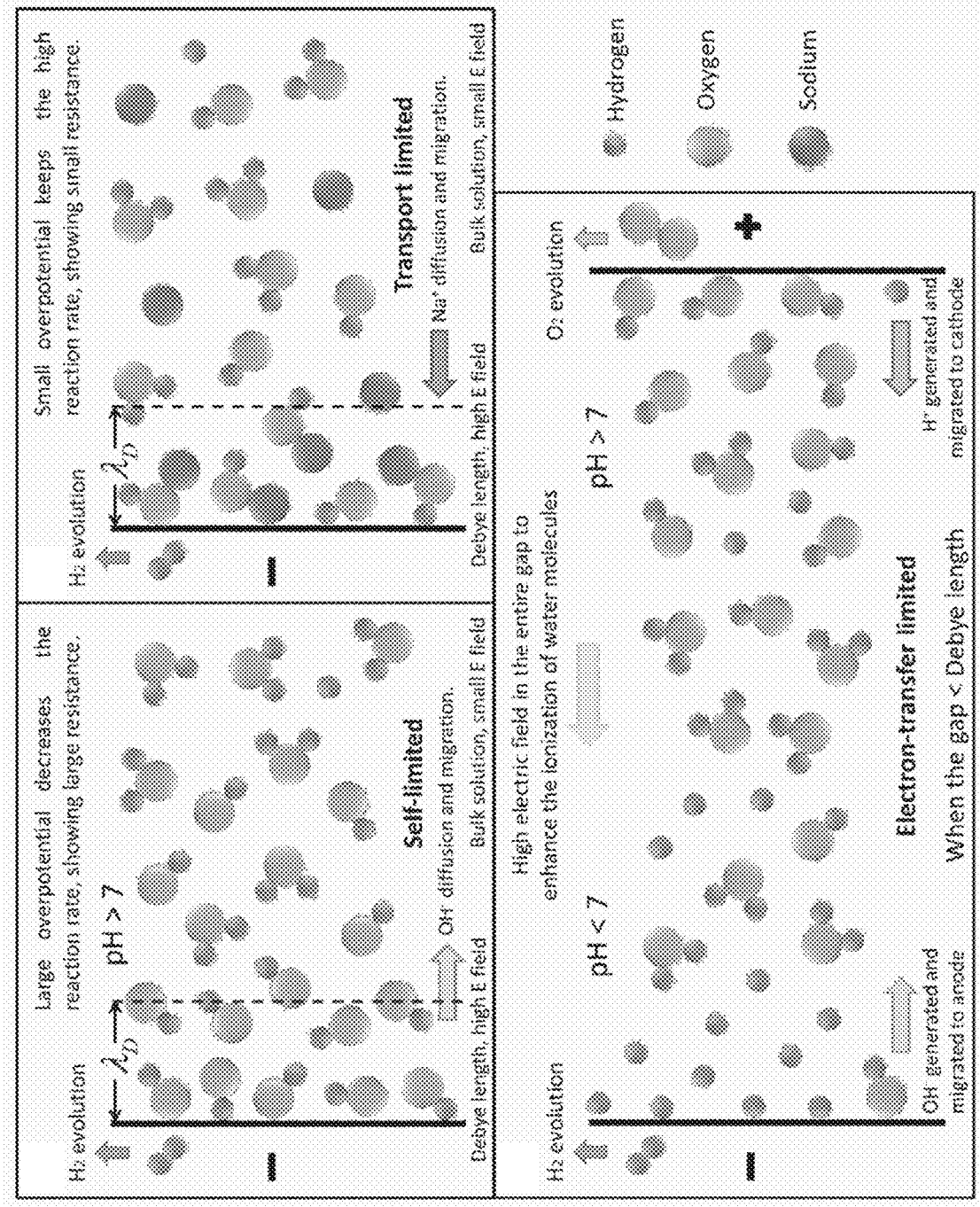
FIG. 41A-FIG. 41C depict in accordance with various embodiments of the invention, schematic diagram of water splitting reactions in 3 different systems.

FIG. 41A explains why pure water cannot be split efficiently in macrosystem, in which we take cathode and $H3O^+$ ions as an example. Initially near the cathode surface water molecules can be dissociated into $H3O^+$ and $OH^-$ ions. $H3O^+$ ions obtain electrons from cathode leading to hydrogen evolution, while the newly-generated $OH^-$ ions can be transported very slowly through the bulk solution by slow diffusion or hopping process facilitated by a weak electric field in bulk solution. Moreover, the intrinsic concentration of $H3O^+$ ions in bulk solution of pure water is too low to neutralize the $OH^-$ ions produced near the cathode. These lead to local $OH^-$ ions accumulation (so that the solution near cathode turns alkaline) especially at the cathode surface, causing the potential at the Helmholtz plane of the cathode to decrease (because of negatively-charged $OH^-$ ions). Such a potential decrease reduces the potential difference between the cathode and Helmholtz plane, further reducing the reaction rate of hydrogen evolution and thus water splitting. In other words, the reaction becomes very slow or even self-limited, showing a large equivalent resistance between cathode and anode. These phenomena also explain the rise in cathode overpotential, since a more negative cathode potential is necessary to allow the reaction to continue. The fundamental reason is the lack of rapid ions transport inside bulk solution.

When a high-concentration of sodium hydroxide is present in the electrolyte (FIG. 41B), plenty of $Na^+$ ions from bulk solution can move to partially compensate for the charge from the newly-generated $OH^-$ ions near the cathode, restoring the potential difference between the cathode and Helmholtz plane, to reduce the overpotential requirement and sustain the reaction current. A similar process occurs at the anode. In this way, water electrolysis with strong electrolyte shows a small resistance between two electrodes. However, notice that even though the ions transport inside bulk electrolyte solution is large enough for the continued reaction, at cathode the sodium ions transport is still limited mainly by diffusion (because of weak electric field in bulk solution)[18, 20], which is often slower than $OH^-$ ions generation (i.e., reaction electron-transfer). Under steady-state conditions, net $OH^-$ ions accumulation still occurs at cathode and the potential effect on Helmholtz plane still exists.

In pure water, when the counter-electrode is placed within the Debye-length (FIG. 41C), the double layers of cathode and anode are overlapping with each other. Still at cathode, newly-generated OH⁻ ions can be migrated rapidly from cathode towards anode due to large electric field in the entire gap. When the gap distance is small enough, initially the transport rate can be even higher than the electron-transfer rate. Once OH⁻ ions are generated, they are immediately drawn from cathode to anode, resulting in the OH⁻ ions waiting for electron-transfer at the anode, rather than accumulated at the cathode. The whole reaction would continue even in pure water, but now is limited by electron-transfer. In this case, net OH⁻ ions accumulate near the anode and net $H_3O^+$ ions accumulate near the cathode, leading to completely opposite pH-value distribution compared to macro-system (which maybe be good for protecting the anode against corrosion). Moreover, net OH⁻ ion enrichment near the anode not only enhances the local reaction ions concentration but also increases the potential difference between anode and anode Helmholtz plane (which in fact decreases the overpotential requirement, as in the Frumkin effect[21]). According to Butler-Volmer equation [22], $$j = Fk^0 \left[ C_O e^{-\alpha F(E-E^{0'})/RT} - C_R e^{(1-\alpha)F(E-E^{0'})/RT} \right] \quad (2)$$

such OH⁻ ions accumulation can significantly increase the electrolysis current, namely water splitting throughput.

Figure 46:
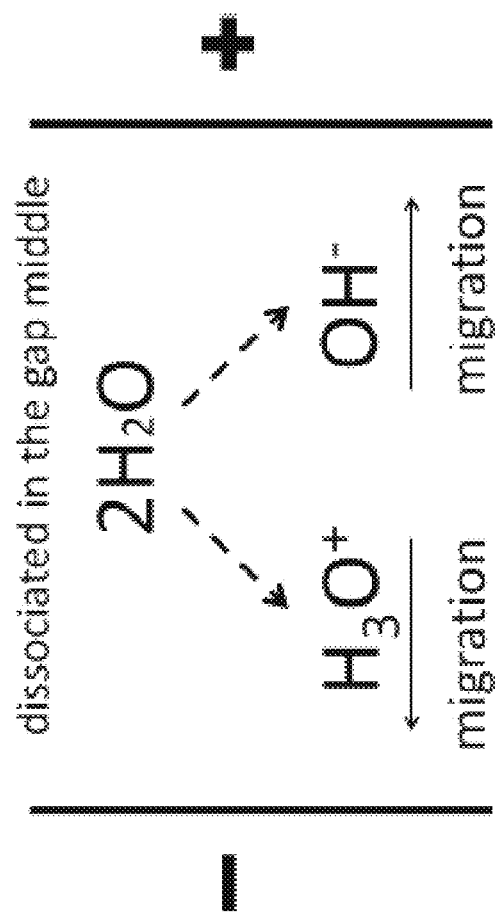
FIG. 46 depicts in accordance with various embodiments of the invention, the equivalent effect that water molecules dissociated in the middle of the gap.

Under steady state, the field-driven effect is equivalent to the scenario that water molecules are split into $H3O^+$ and OH⁻ ions in the middle of the gap (FIG. 46), allowing $H3O^+$ ions to drift towards the cathode and OH⁻ ions to drift towards the anode, respectively. In other words, such huge electric field not only increases the transport rate, but also enhances the water molecules ionization (for RC-circuit model, FIG. 47). From a microscopic perspective, the conductivity of water has been enhanced "equivalently". From the equation of conductivity, $$\sigma = nq\mu \quad (3)$$

where q is the ion charge, μ is the ion mobility and n is the ion concentration. Here the ion charge s have not changed. The increased ion concentration only partially contributes to the conductivity. The fundamental change is that two half-reactions are coupled together, and the electric field distribution within the NEC gap leads to a significantly enhanced "apparent mobility". (In macro system, the intrinsic mobility cannot serve to the conductivity due to weak electric field in bulk solution.) The total effect looks like breakdown of pure water. However, notice that this effect is not traditional breakdown of pure water, which actually requires the electric field around 1 V/Å [23], about two magnitude orders larger than what we have discussed here. The high electric field in our NECs could not split water molecules directly; however, it enhances water ionization and ion transport, and thus equivalent pure water conductivity. That is why we called this field-driven effect, "virtual breakdown mechanism". The traditional view should be revised that even pure water can be conductive, when the electrode gap is small enough. This "virtual breakdown mechanism" can be applied on almost all types of weakly-ionized materials: such weak ionization actually helps to achieve the virtual breakdown effect.

Device Fabrication

There have been many efforts [24, 25] to fabricate nanogap electrodes.

Electron/ion-beam lithographically-defined nanogap electrodes may not be scalable to large-area fabrication. Chemically-synthesized electrodes [26, 27] and mechanically-fabricated electrodes [28, 29] usually suffer from the lack of controllability. Sacrificial-layer based nanogaps [30-32] require complicated processes and thus perform poor yield[20] especially when nanogaps less than 100 nm. Bohn et al [18, 33, 34] and White et al [19, 20] have done excellent work on nanogap-based reversible redox cycling analysis at low ionic strength; however, their structures may not be suitable for irreversible reactions, especially with gas evolution. The fabrication procedure of our open-cell sandwiched-like NECs is shown in FIG. 42A. First, a film stack of silicon dioxide (thermal oxidation), Pt (bottom cathode metal, electron-beam evaporation), silicon nitride (plasma-enhanced chemical vapor deposition) were deposited on silicon wafers. Afterwards, Ti (adhesion layer) with gold (top anode metal) and Cr (etching mask) were patterned by photolithography, electron-beam evaporation and lift-off process. The patterns consist of contact pads and 1-D gratings with different values of pitch. Here only the top gold anode was patterned and the bottom Pt cathode was a blank film. Next, the silicon nitride was etched with Cr (low sputtering yield [35]) as mask by low DC-bias anisotropic etching that was developed by us [36], to avoid metal atoms sputtered out everywhere during etching. This method can avoid short-circuit between the top and bottom electrodes and thus enhance the yield of device fabrication. Finally, Cr mask was removed by Cr wet etching (ALDRICH®), which can also increase the hydrophilicity of the entire surface. The whole process is yield-controlled and can be scalable to mass manufacturing Platinum and gold were selected as the cathode and anode, respectively, due to their ability to catalyze hydrogen/oxygen evolution; gold is stable towards anodic oxidation [37] to avoid short-circuit between the two electrodes during electrolysis caused by metal dissolution and re-deposition [38]. The experimental set-up is schematically shown in FIG. 42A, with two electrode tips connected to the anode and cathode, and pure deionized water (DI water) was dropped to cover the grating region. The hydrophilicity of the entire surface guaranteed that the water completely wetted the whole electrode structure and gaps. Notice that the field-driven pure water splitting only occurs at the boundary (edges) of each grating line (more details in next section). FIG. 42B-FIG. 42D also shows the fabrication results (40 μm g rating pitch and 72 nm gap distance as an example) observed by unaided eyes (top view), by optical microscopy (top view) and by scanning electron microscopy (SEM) (cross-section view).

Experimental Results

Pure Water

Figure 43A:
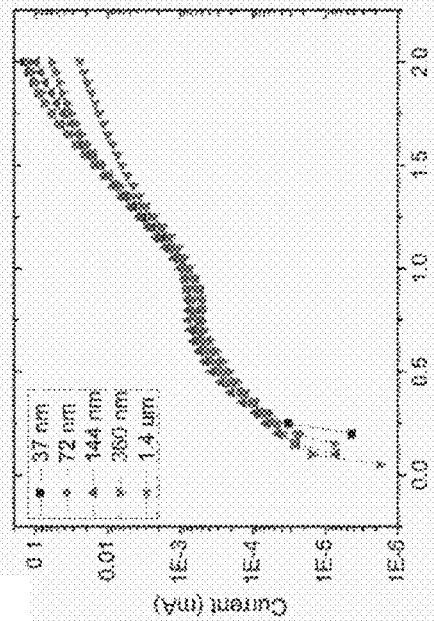
FIG. 43A-FIG. 43D depict in accordance with various embodiments of the invention, I-V curve measurements based on our NECs with pure DI water. The experiment conditions were 22° C., 1 atm, humidity: 45%, scanning step: 50 mV, hold time: 1.5 s, delay time: 1.5 s to guarantee steady state. The devices were with 40 µm grating pitch and different gap distances.
Figure 43B:
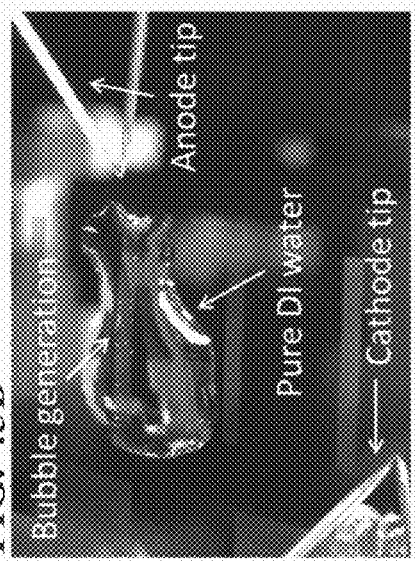
Figure 43C:
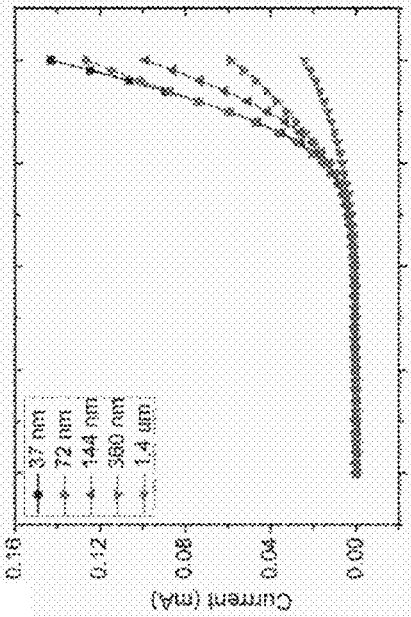
Figure 43D:
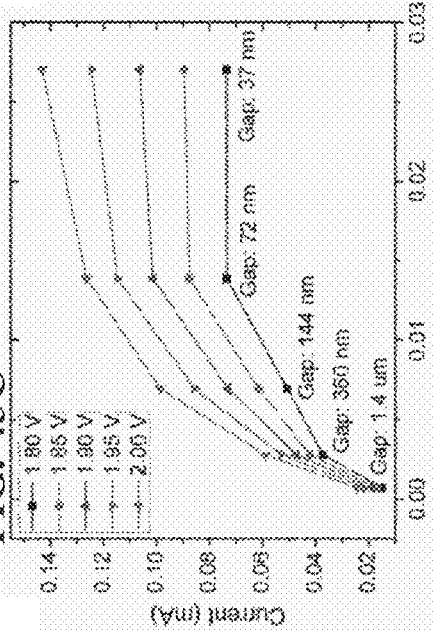
Figures 49A, 49B:
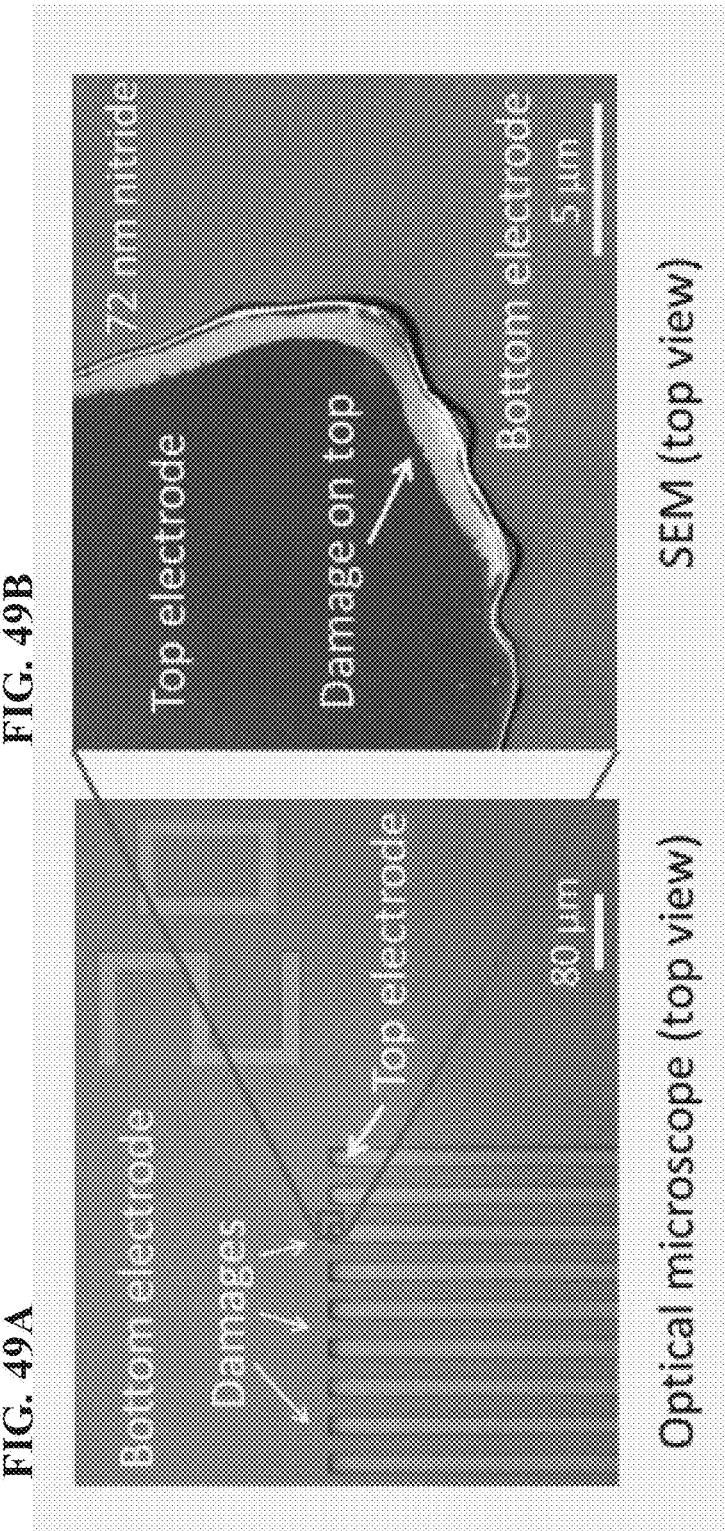
FIG. 49A-FIG. 49B depicts in accordance with various embodiments of the invention, anode damage in pure water when voltage above 5 V. The device shown here is with 72 nm gap and 40 µm pitch.
Figure 50B:
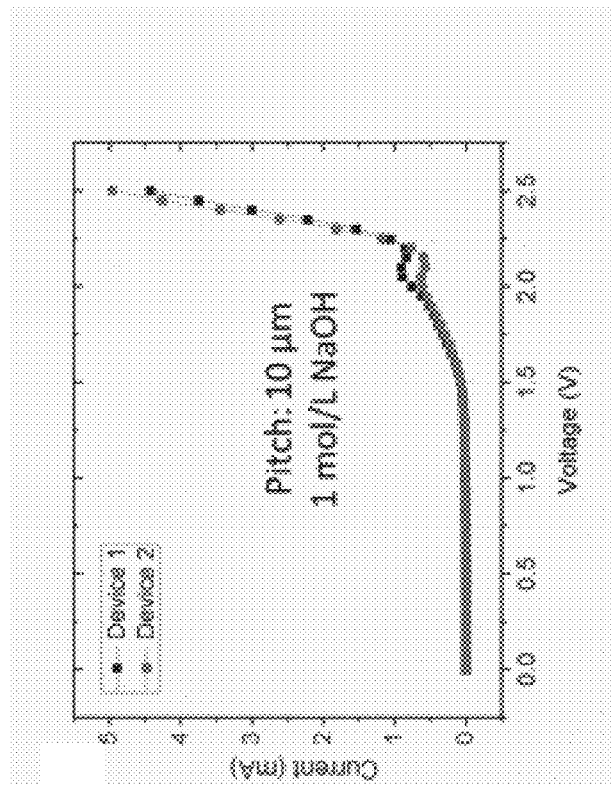
FIG. 50A-FIG. 50B depict in accordance with various embodiments of the invention, bubble effects on plateaus (or peaks) around 2 V in I-V curves based on devices with 72 nm gap and 10 µm pitch, (FIG. 50A) in pure water, (FIG. 50B) in sodium hydroxide solution.
Figure 50A:
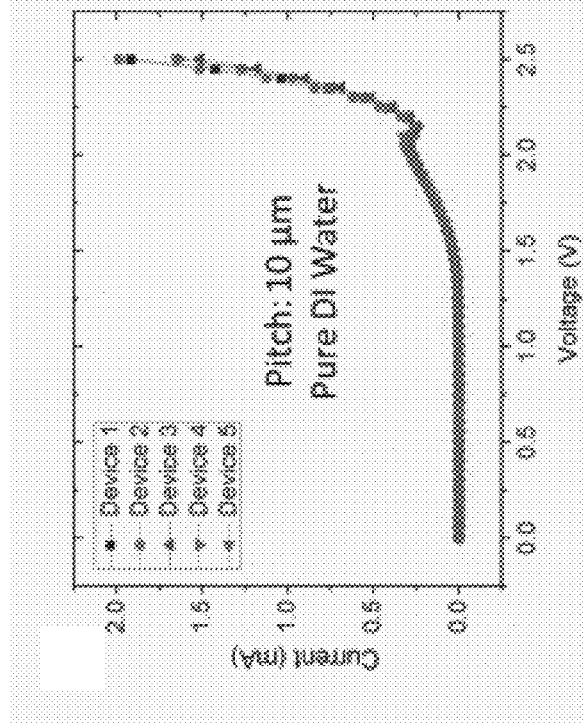

When exposed to air, $CO_2$ dissolution into water (pH around 5.7 [39]) results in the Deby e-length reduction from 1 μm to around 220 nm. For our smallest gap distance 37 nm, the double layer at each electrode has been at least compressed into ⅒ of the original Debye-length. At such deep-sub-Debye-length range, the uniform electric field in the entire gap is inversely proportional to the gap distance at a given voltage. FIG. 43A shows the I-V curves from pure water experiments based on different gap distances from 37 nm to 1.4 μm. When gap distance shrank, the electrolysis current became larger due to higher electric field between two electrodes (FIG. 43A). A voltage plateau around 0.9 V was observed in the log current vs. voltage plot (FIG. 43B), which was independent of the gap distance. This may result from the dissolved oxygen reduction since the DI water was not saturated with inert gas; another reason may be surface oxide formation on gold during water electrolysis [38, 40, 41]. The entire surface became more hydrophilic after first test, which was consistent with the oxidation formation or hydroxide bond residue. In experiments, sometimes anode damage occurred when voltage was above 5 V (FIG. 49A-FIG. 49B). FIG. 43D shows part of the experimental set-up and bubbles generation around 2 V during the pure water splitting (FIG. 50A-FIG. 50B for more bubble effects). In NECs the electron-transfer rate only depends on the cell voltage while the transport rate (mainly by migration) depends both on voltage and gap distance (i.e., electric field). In a plot of electrolysis current vs. gap distance-1 (a scale of electric field) at each voltage, if the reaction is limited by electron-transfer, the current should be relatively independent of the gap distance; however, if the reaction is limited by mass transport, the current should be sensitive to the gap distance (showing a large slope). FIG. 43C clearly demonstrated such effects. For large gaps, a large slope appeared on the figure since the reaction was mass-transport limited; when the gap was small enough, the current reached saturation value only dependent on the voltage, indicating electron-transfer limited reaction. The critical gap distance (or "turning point") between such two states became smaller (moved to the right on the figure) with increasing voltage. This is because the electron-transfer rate increases faster than the mass transport when voltage increases (exponential vs. linear), therefore smaller gaps are necessary in order to achieve saturation current (electron-transfer limited) at higher voltages.

Sodium Hydroxide Solution

Figure 44B:
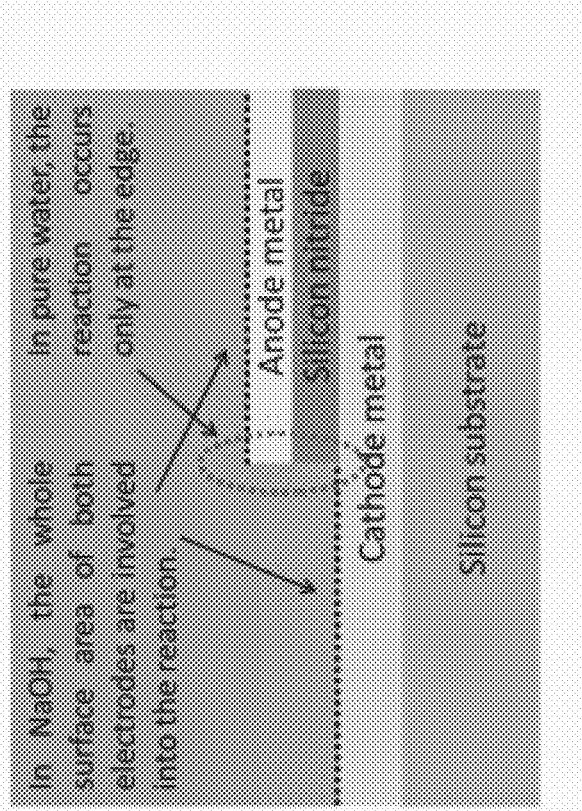
FIG. 44A-FIG. 44B depict in accordance with various embodiments of the invention, comparison between pure water splitting and water splitting in 1 mol/L sodium hydroxide solution, both based on our NECs. The experiment conditions were the same in FIG. 43. The devices were with 72 nm gap distance and different grating pitches.
Figure 44A:
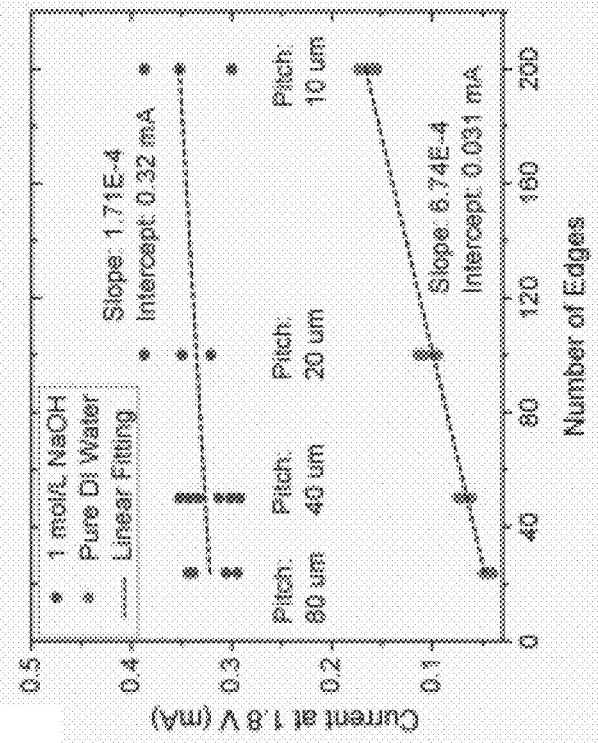

The electrolysis of pure water and 1 mol/L sodium hydroxide solution were compared in FIG. 44A, both based on our NECs with the same gap distance 72 nm and different grating pitches. For pure water, the electrolysis current at 1.8 V linearly increased with the number of grating edges; while for sodium hydroxide solution, the current was less dependent on the number of edges (i.e., grating pitch) and the data dispersion was significantly larger than that of pure water. The mechanism is shown in FIG. 44B. For pure water splitting, the reaction only occurs at the edges where the electrode distance is small enough to couple the two half-reactions together; at the "non-edge" region (i.e., top face) of the grating line, the scenario is just like pure water splitting in macrosystem (self-limited due to large electrode distance). On the contrary, in sodium hydroxide solution the entire surface was involved in supporting the reaction. That is because Debye-length in 1 mol/L sodium hydroxide solution is less than 1 nm, still significantly smaller than the electrode distance (72 nm here). Thus, the two half-reactions are not coupled together and are still diffusion-limited, just like that in macrosystem where the reactions occurs on all accessible parts of the electrodes. Therefore, the current greatly depends on the effective reaction area. In our present experiments, the area was that covered by the solution droplet and was not accurately controlled. Thus, the current from sodium hydroxide solution was not sensitive to grating pitches and presented significant variability (see more discussions in FIG. 51A-FIG. 51B). In comparison, the current from pure water was not sensitive to the area of the droplet region, and bubbles could only form within the grating region. Also discussed herein are the two voltage plateaus around 0.4 V and 1.2 V, respectively, on the log-plot of the I-V curves in sodium hydroxide solution. Notice that the current from sodium hydroxide solution still increased slightly with the number of edges. Even though it was diffusion limited, at the edges the overall diffusion length had shrunk to 72 nm. Therefore more edges could slightly enhance the electrolysis current. Notice that the effective reaction area in sodium hydroxide solution was much larger than that in pure water. Even under such unfavorable conditions, the electrolysis current from pure water was comparable to that from 1 mol/L sodium hydroxide solution, indicating more than $10^5$-fold enhancement of the apparent conductivity of pure water. (The conductivity of 1 mol/L sodium hydroxide solution and common pure water (equilibrated with CO2 in air) are $2 \times 10^5$ μS/cm and 1 μS/cm [39], respectively.) From the linear fitting, we can conclude that when the grating pitches are smaller than 2 μm, the electrolysis current from pure water can be even higher than that from 1 mol/L sodium hydroxide solution of the same pitch (2 μm pitch is beyond our photolithography capability, therefore we did not attempt it at present stage). These results demonstrate the enhancement of pure water splitting by virtual breakdown effect compared to conventional transport-limited reaction and a potential for greatly increased efficiency for hydrogen production.

Conclusion

Field-driven pure water splitting at room temperature has been successfully achieved in this paper based on our metal-dielectric-metal sandwiched-like nanogap electrochemical cells. The gap distance between anode and cathode down to 37 nm has been demonstrated. In such deep-sub-Debye-length region, high electric field in the entire gap significantly enhances water molecules ionization and mass transport, leading to an electron-transfer limited reaction. This virtual breakdown mechanism can greatly enhance the equivalent conductivity of pure water to more than $10^5$-fold, resulting in electrolysis current comparable to or even high than that from 1 mol/L sodium hydroxide solution, and thus a higher efficiency for hydrogen production. We propose to investigate this virtual breakdown mechanism further. For example, reference electrode can be added to study cathode current and anode current separately; characterizations of capacitance-voltage curves will also provide important information for theoretical analysis. Moreover, such virtual breakdown mechanism can be applied on almost all weakly-ionized materials, and may have applications for ultrafast charging, alcohol electrolysis, carbon-dioxide reduction and fuel cells. Besides, compared to other NECs, our open cells can be simply fabricated on large area with high yield, and have great potentials to enhance the rate of redox reactions for ultra-sensitivity/selectivity. At last, compared to current industrial water electrolysis, such high-efficiency pure water splitting without any electrolyte at room temperature, especially connected to renewable energy sources, is very promising for both mass manufacturing and portable devices for on-demand clean hydrogen production.

Example 3a (Part 2)

Finite Element Calculations

Figure 45:
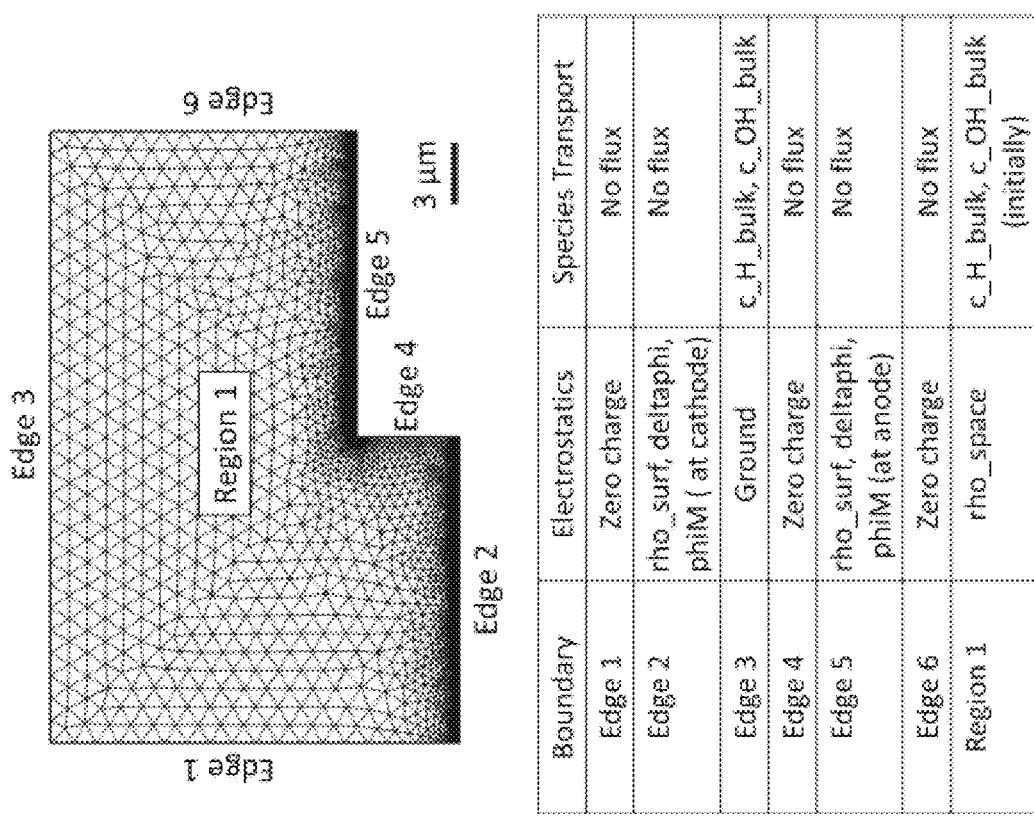
FIG. 45 depicts in accordance with various embodiments of the invention, geometry and boundary conditions setting in finite element calculations.

The simulation results shown in FIG. 40B were achieved using commercial software, Comsol Multiphysics® 5.2. The 2-D geometry and boundary conditions setting are shown in FIG. 45 (take gap distance of 5 μm as an example, only one boundary edge of our sandwiched-like nanogap cells was simulated). The parameters setting are shown in Table Ia.

TABLE Ia

Parameters setting in finite element calculations.

| Name | Value | Unit | Description |
|---|---|---|---|
| T0 | 25 | deg C. | Temperature |
| c_H_bulk | 0.0001 | mol/m^3 | Bulk cation concentration |
| c_OH_bulk | c_H_bulk | | Bulk anion concentration |
| z_H | 1 | | Cation charge |
| z_OH | −1 | | Anion charge |
| D_H | 9.31E−09 | m^2/s | Diffusion coefficient, cation |
| D_OH | 5.26E−09 | m^2/s | Diffusion coefficient, anion |
| eps_H2O | 80 | | Relative permittivity of water |
| xS | 0.2 | nm | Stern layer thickness |
| phi_anode | 0.5 | V | Anode potential |
| rho_space | F_const*(z_H*c_H + z_OH*c_OH) | C/m$^3$ | Space charge density |
| deltaphi | phiM-phi | V | Electrode-OHP potential difference |
| rho_surf | epsilon0_const*eps_H2O*deltaphi/xS | C/m$^2$ | Surface charge density |
| phiM (at anode) | phi_anode/2 | V | Anode potential |
| phiM (at cathode) | −phi_anode/2 | V | Cathode potential |
| thk_nitride | Manually setting | μm | Thickness of silicon nitride layer |

The equations that governed the ions movement and distribution were the steady-state Nernst-Planck equation and the Poisson equation, $$J_i = -D_i \nabla C_i - (z_i F/RT) D_i C_i \nabla \varphi \quad (S1)$$

$$\nabla^2 \varphi = -\rho/\varepsilon_r \varepsilon_0 \quad (S2)$$

where $J_i$, $D_i$, $C_i$, and $z_i$ are the current density, diffusion coefficient, concentration and charge of species i, $\varphi$ is the local electric potential, $\rho$ is the local net charge density in the solution, $\varepsilon_r$ is the static dielectric constant, $\varepsilon_0$, F, R, and T are the permittivity of vacuum, Faraday constant, gas constant and temperature. To simplify the problem, $\varepsilon_r$ of pure water was set constant 80 in the entire solution even though near the electrode surface $\varepsilon_r$ can be reduced to less than 10 [1].

The Debye-length (around 1 μm in pure water) was calculated from Gouy-Chapman theory, which requires infinite electrode plane and potential much smaller than 26 mV at room temperature. Simulation results showed that, even though our modeling could not satisfy the two requirements of Gouy-Chapman theory, the approximation value of 1 μm could still be used since little difference showed up between the theoretical value (from the Gouy-Chapman theory) and simulated value (from the software simulation). Besides, the smallest nanogap between the two electrodes we achieved was 37 nm, which was much smaller than both theoretical value and simulated value. Thus, the claim of "deep-sub-Debye-length" is still valid. Stern layer had been considered in the initial setting; however, the final results had little dependence on with or without Stern layer setting. This is probably because the simulation mesh was not fine enough near the electrode surface. Mesh quality is a key factor of the simulation results. We discovered that finer mesh near the surface greatly enhanced the surface concentration (more obvious when large potential added). However, further finer meshing was not possible due to limited computational resources. Here, more accurate results might not be necessary. Quantitatively, we have demonstrated the double layer overlapping effect, and high electric field (just voltage divided by gap distance) uniformly distributed in the entire gap has been demonstrated as well. For our current research, we determined that these simulation results are sufficient.

Virtual Breakdown Effect.

For pure water splitting in nanogap cells, the two half-reactions are coupled together. Take the anode as an example. At the anode OH$^-$ ions (the reaction ions) come from two parts: one is from water ionization near the anode; the other part comes from the OH$^-$ ions migrated from the cathode to the anode. When the gap is small enough, migration rate can be larger than electron-transfer rate so that the reaction is limited by electron-transfer. Initially, 1 unit of electron-transfer leads to two units of OH$^-$ ions generation, resulting in non-consumed OH$^-$ ions accumulated near the anode. Such ions accumulation at the electrodes slows down further water ionization near the electrodes, to reduce the total OH$^-$ ions generation rate to balance with the 1 unit of electron-transfer in the external circuit. Under steady state condition, the sum of the OH$^-$ ions from the two parts is balanced with the 1 unit of electron-transfer in the external circuit. Such scenario appears like that the water molecules are split into H3O$^+$ and OH$^-$ ions in the middle of the gap, allowing H3O$^+$ ions to drift towards the cathode and OH$^-$ ions to drift towards the anode, respectively. The whole effect looks like that water has been broken-down. However, we should point out that in fact water molecule dissociation still occurs only near the electrode (due to local ion consumption); the water dissociation in the middle of the gap is just the equivalent effect.

RC-Circuit Model

Figure 47:
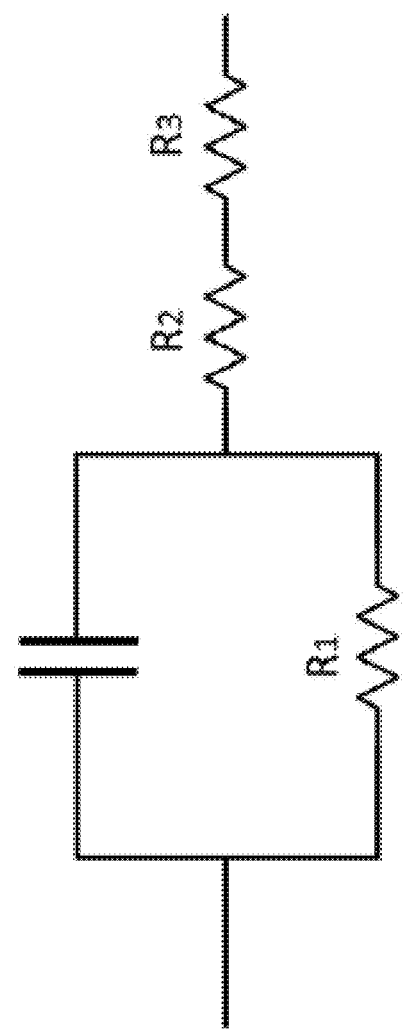
FIG. 47 depicts in accordance with various embodiments of the invention, RC-circuit model of half-reaction of water splitting in nanogap cells.

FIG. 47 shows the RC-circuit model of half-reaction of water splitting in nanogap cells. The capacitor represents the double layer. R1 represents the reaction rate of electron-transfer, which depends only on the changes in potential drop across the interface. R2 represents the mass transport rate, which is related to both voltage and gap distance (i.e., electric field in the gap). R3 represents the water ionization rate. When gap distance is smaller, R2 becomes smaller; while R1 can also be slightly smaller since local reaction ion concentrations become higher and potential drop becomes larger, meaning that R1 is coupled to R2. R3 may depend on R1 because ions are consumed continuously, R3 can be enhanced by shifting the ionization equilibrium. When the gap distance is around Debye-length, R2 is the largest one and determines the whole reaction rate; however, when gap is much smaller than Debye-length, R2 can be smaller than R1, indicating electron-transfer limited reaction. That is to say, when gap distance further decreases, the current reaches a saturation value that only depends on voltage.

Low DC-Bias Silicon Nitride Anisotropic Etching.

Figure 48:
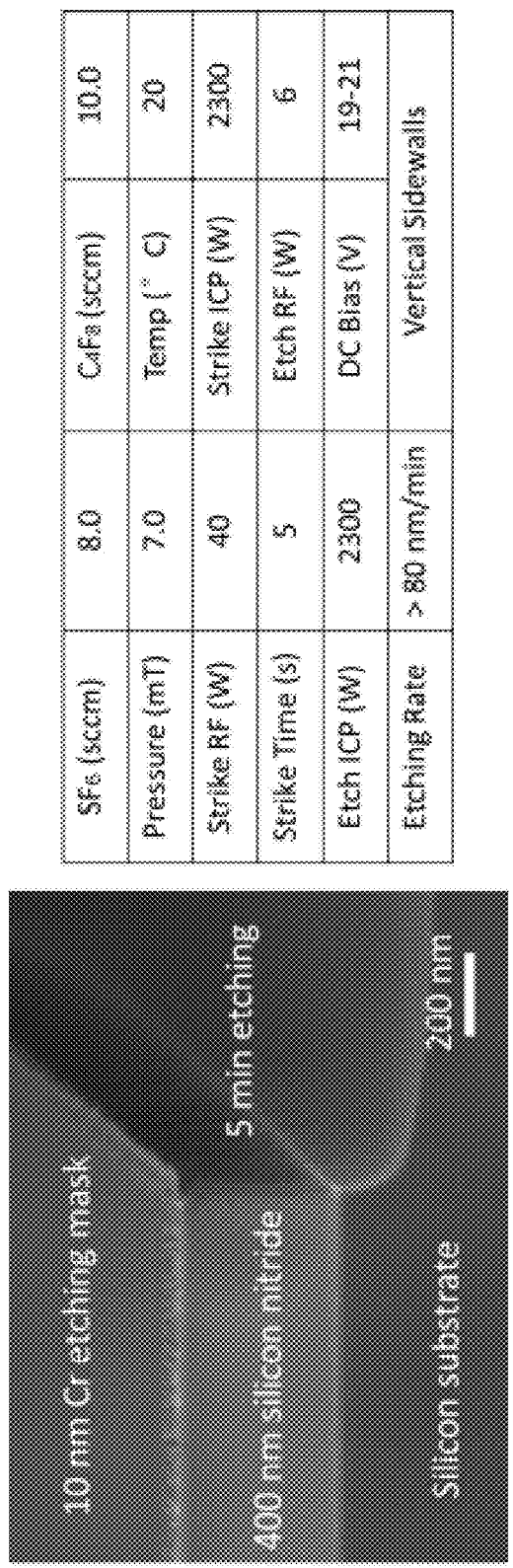
FIG. 48 depicts in accordance with various embodiments of the invention, the recipe parameters and the etching profile of our low DC-bias silicon nitride etching.

To avoid short-circuit between top anode and bottom cathode metal layers, low DC-bias silicon nitride etching technology was developed in order to reduce the ion bombardment effect. In experiments we discovered that traditional nitride etching with high DC-bias could lead to low yield of device fabrication: most of the devices got short-circuit after nitride etching. This was because that the sputtered metal atoms formed short-circuit path on the sidewall, connecting top anode and bottom cathode [2]. By using our low DC-bias etching recipe, the fabrication yield has been improved greatly. The recipe parameters and the etching profile are shown in FIG. 48. The DC-bias of the silicon nitride etching was down to 19-21 V with etching rate larger than 80 nm/min and vertical sidewalls, even better than literature reported values [2]. Exactly vertical sidewalls were not required because in fact a little bit isotropic etching was desired since anode tips at the boundary could form higher electric field.

Anode Damage.

Anode can be roughed during redox cycling [3, 4]. The roughness comes from the electrochemically oxidation and re-deposition of the anode metal, even for gold [3, 5]. In experiments, such anode damage sometimes occurred when the applied voltage values were above 5 V (FIG. 49A-FIG. 49B). Thinner-gap samples were more likely to suffer damage. Moreover, damage always showed up near the grating boundary where the electric field was the highest. Such damage, especially the re-deposition of gold atoms, can lead to short-circuit between the anode and the cathode (especially for smaller gap distances), and thus reducing the lifetime of the devices. To avoid such short-circuit, the maximum external voltage was set to be 2.5 V (to reduce the current density in fact). In this way, the devices can be measured repetitively without obvious damage or short-circuit.

Two possible approaches are proposed here to avoid such anode damage. First, indium tin oxide (ITO) can be used to replace the gold as anode material, with its highest oxidation state which cannot be oxidized further [6, 7]. Second, an ultrathin layer of energy-band offset material [8, 9] may be coated onto the gold anode, with thickness small enough to be conductive to gold while preventing gold contacting water directly.

Bubble Effects

FIG. 50A-FIG. 50B shows plateaus (or peaks) around 2 V in I-V curves, both in pure water measurements and sodium hydroxide solution measurements. We believe that it was due to bubble effects. Around 2 V, bubble generation started to be vigorous enough so that it could be observed by the naked eye. Moreover, devices with smaller gap distance or smaller grating pitches could have more obvious plateaus around 2 V, indicating that such plateaus were determined by the geometry of the structures, rather than electrode electrochemical reactions. This observation is reasonable to expect since bubbles are more likely to be trapped within the smaller gap or smaller pitch structures before releasing, excluding the water involved in the reaction. Therefore, larger voltage leads to larger excluding effect, and thus smaller current, showing negative resistance which performs like a plateau or peak in I-V curves.

Notice that FIG. 50A also shows the consistent results among several tests. The data from different devices were almost exactly the same, especially below 2 V. Above 2 V, the data had a relatively larger error range which we think was due to the bubble effects on current performance. Therefore, we always selected the current data below 2V for analysis and comparison to be free from bubble related artifacts.

Sodium Hydroxide Solution: Reactions in the Entire Surface

Figure 51A:
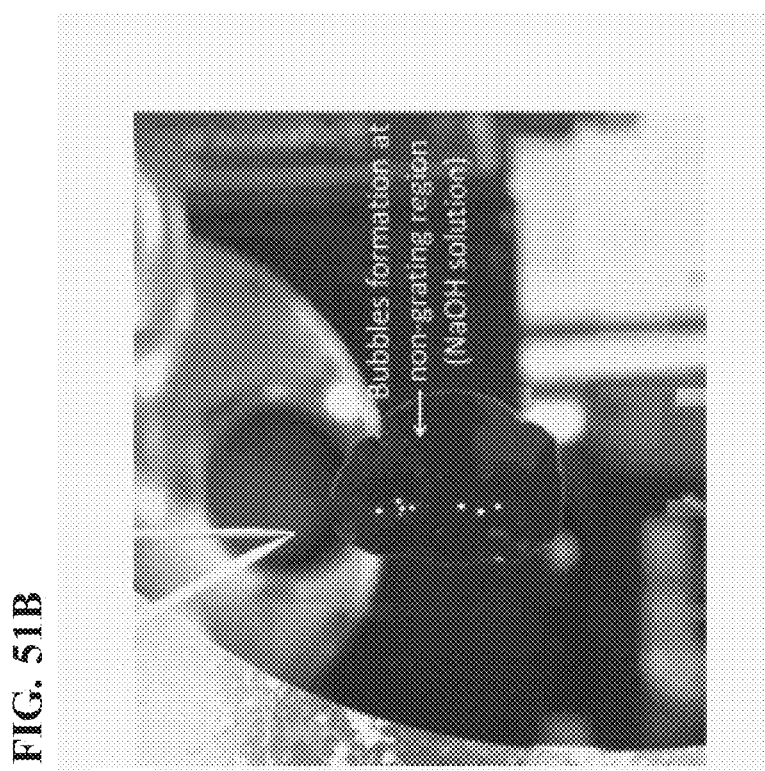
FIG. 51A-FIG. 51B depict in accordance with various embodiments of the invention, evidence of the entire surface involved into the reactions in sodium hydroxide solutions.
Figure 51B:
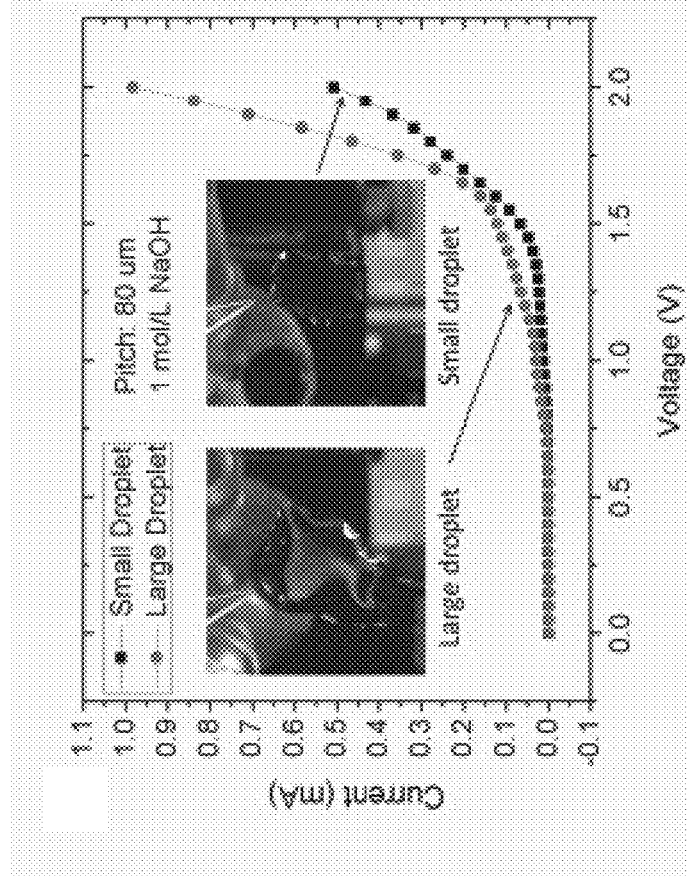

Reactions in pure water only occur at the edge boundary of each grating line in our sandwiched-like nanogap cells. Different from pure water, the entire surface is involved in the reactions in sodium hydroxide solutions. Two types of evidence are shown in FIG. 51A-FIG. 51B. First, the larger droplet of sodium hydroxide solution provided larger current, indicating more surface area involved into the reactions, though the total number of the edges was independent of the droplet size. Second, bubbles could be even generated far away from counter-electrode (i.e., non-grating region), demonstrating that reactions can occur even very far from the grating edges. That is to say, the reactions in sodium hydroxide solutions not only occur at the grating edges, but also over the entire region covered by the droplet.

Plateaus in Log I vs. V Curves

Figures 52A, 52B:
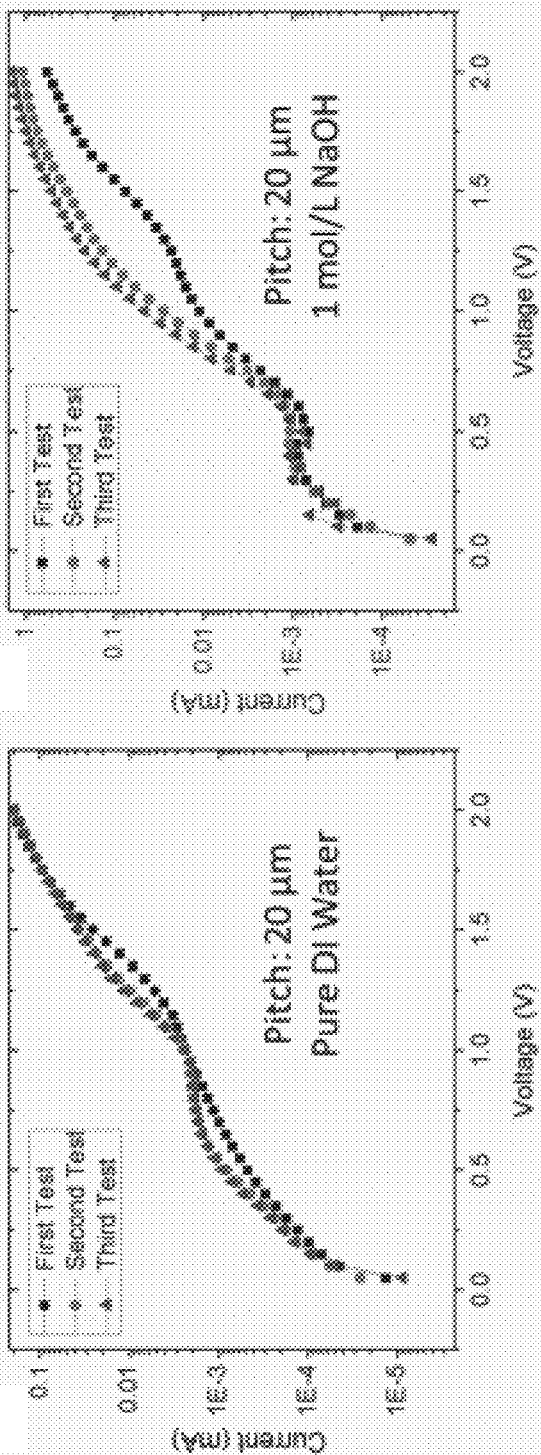
FIG. 52A-FIG. 52B depict in accordance with various embodiments of the invention, plateaus in log I vs. V curves from (FIG. 52A) pure water tests and (FIG. 52B) sodium hydroxide solution tests. The devices were with 72 nm gap distance.

FIG. 52A-FIG. 52B shows the log I vs. V curves from tests of both pure water and sodium hydroxide solution. For pure water, one plateau appeared around 0.9 V (also shown in FIG. 43B). This plateau became flatter after the first test on the same device. For sodium hydroxide solution, two plateaus, around 0.4 V and 1.2 V respectively, were shown on the log I vs. V curves. After first test, the 0.4 V plateau still existed but the 1.2 V plateau disappeared, and the current became much larger (the 2V plateau can be ignored since it is due to the bubble effects). This plateau phenomenon is quite repeatable, no matter what the gap distance or pitch is, indicating that it is more likely related to the intrinsic electrochemical reactions, rather than geometry factors. However, the fundamental mechanism is not clear.

Only a few literature reviews discussed about such plateaus in log I vs. V curves. Without being bound by theory, our hypothesis is the following. The 0.9 V plateau from pure water tests may be attributed to dissolved oxygen reduction or anode gold oxidation (and these two effects might be coupled). For sodium hydroxide solution, the 0.4 V plateau most likely came from the reduction of dissolved oxygen; while the 1.2 V plateau was related to anode gold oxidation. The different values of the oxidation plateaus in pure water and in sodium hydroxide solution was most likely due to the difference in pH values. The 0.4 V plateau would not disappear since for every test new sodium hydroxide solution (without inert gas saturation) was used. For the gold anode, non-conductive oxide state I and conductive oxide state II can form during water splitting [10]. During the first test in sodium hydroxide solution, OH⁻ ions concentration was so large that all surface gold could be oxidized to state II, therefore during the second or third tests no surface gold could be oxidized further (thus the 1.2 V plateau disappeared). Also, because oxide state II was porous and conductive, the distance between anode and cathode had been shortened due to gold oxide islands and the current after the first test could become larger (the larger current could be also attributed to roughness of the surface since effective reaction area became larger [4]). However, for pure water, OH⁻ ions concentration was small so that only oxide state I might form, therefore gold could still be oxidized further into the formation of state I during the second or even third tests (until two or three monolayers of the oxide state I coverage reached [3, 11]), with almost the same electrolysis current or smaller since oxide state I was non-conductive.

However, such plateaus may also result from the formation of oxygen coverage [12], inhibition layer [13] or inert sites [14].

Example 3b (Part 1)

Due to the low conductivity of pure water, using an electrolyte is common for achieving efficient water electrolysis. In the present invention, we provide, in various embodiments a system for the electrolysis of pure water (without any added electrolyte) at room temperature with high efficiency using deep-sub-Debye-length nanogap electrochemical cells. A novel field-driven effect resulted from overlapped electrical double layers can significantly enhance water molecules ionization and mass transport, leading to electron-transfer limited reactions (which is completely different from traditional mechanisms). We have named this process "virtual breakdown mechanism" that couples the two half-reactions together, resulting in more than $10^5$-fold enhancement of the equivalent conductivity of pure water. This fundamental discovery has been theoretically discussed in this paper and experimentally demonstrated in a group of electrochemical cells with nanogaps between two electrodes down to 37 nm. Based on our nanogap electrochemical cells, the electrolysis current density from pure water can be significantly larger than that from 1 mol/L sodium hydroxide solution, indicating the high efficiency of pure water splitting as a potential for on-demand clean hydrogen production.)

We have demonstrated a new approach to improve the electrochemical reaction efficiency, by using electrochemical cells with distance between anode and cathode in nanometer-scale. With these nanogap electrochemical cells (NECs), pure water (without any added electrolyte) can be electrochemically split into hydrogen and oxygen efficiently due to the two half-reactions coupled together, contrary to the traditional thinking that pure water cannot be electrolyzed. Our experiments have demonstrated that the equivalent conductivity of pure water has been enhanced more than $10^5$-fold, and the electrolysis current density from pure water can be greatly larger than that from 1 mol/L sodium hydroxide solution, which results from a completely different microscopic mechanism of field-driven ions transport to enhance water ionization and even virtual breakdown. Compared to current industrial water electrolysis operated at 70-90° C. [2, 3] with strong alkaline electrolyte, our NEC design with pure water can eliminate difficulties of working with strong alkaline electrolyte and also avoid the need for high temperatures, showing a great potential for high energy-efficiency on-demand hydrogen production for both mass manufacturing and portable devices.

For simplicity, consider the solution resistance between anode and cathode for water splitting, as given by $$R = \rho \frac{l}{S} \quad (1)$$

where $\rho$ is the resistivity, l is the resistor length (electrode distance) and S is the cross-section area of the resistor. We found that as the electrode distance shrinks to much smaller than Debye-length $\lambda d$ (around 1 µm for pure water), not only the value of l decreases, but the equivalent resistivity $\rho$ also decreases greatly, which in fact contributes more to the decrease of resistance R. This decrease is attributed to the huge electric field between two electrodes within such deep-sub-Debye-length region (FIG. 40A-FIG. 40B). For water electrolysis with strong electrolyte in macrosystem, the electric field is screened by the double layer, leading to nearly zero electric field in bulk solution (FIG. 40A). However, when the electrode gap distance is smaller than the Debye-length, large electric field can be uniformly distributed in the entire gap due to overlapping of the double layers at the two electrodes. In our metal-dielectric-metal sandwiched-like NECs, the gap distance is tuned by adjusting the silicon nitride thickness and can be easily achieved to deep-sub-Debye-length in pure water. FIG. 40B shows the simulation results of electric field distribution between two electrodes with different gap distances. Close to the electrode regions both the nanogap cell and the macrosystem present a high electric field due to the double layer; however, in bulk solution the electric field in 100 µm macrosystem is only 10 V/m while in 0.1 µm gap the field can reach $10^7$ V/m. Such a high electric field in the entire gap of nanogap cells can result in significant ion enrichment and ion migration [18, 19], and even further water ionization and virtual breakdown.

Theoretical Analysis.

FIG. 41A explains why pure water cannot be split efficiently in macrosystem, in which we take the cathode and $H3O^+$ ions as an example. Initially near the cathode surface water molecules can be dissociated into $H3O^+$ and $OH^-$ ions. $H3O^+$ ions obtain electrons from the cathode leading to hydrogen evolution, while the newly-generated $OH^-$ ions can be transported very slowly through the bulk solution by slow diffusion or hopping processes facilitated by a weak electric field in bulk solution. Moreover, the intrinsic concentration of $H3O^+$ ions in bulk solution of pure water is too low to neutralize the $OH^-$ ions produced near the cathode. These lead to local $OH^-$ ions accumulation (so that the solution near cathode turns alkaline) especially at the cathode surface, causing the potential at the Helmholtz-plane of the cathode to decrease (because of negatively-charged $OH^-$ ions). Such a potential decrease reduces the potential difference between the cathode and Helmholtz-plane, further reducing the reaction rate of hydrogen evolution and thus water splitting. In other words, the reaction becomes very slow or even self-limited, showing a large equivalent resistance between cathode and anode. These phenomena also explain the rise in cathode overpotential, since a more negative cathode potential is necessary to allow the reaction to continue. The fundamental reason is the lack of rapid ion transport inside bulk solution.

When a high-concentration of sodium hydroxide is present in the electrolyte (FIG. 41B), plenty of $Na^+$ ions from bulk solution can move to partially compensate for the charge from the newly-generated $OH^-$ ions near the cathode, restoring the potential difference between the cathode and Helmholtz-plane, to reduce the overpotential requirement and sustain the reaction current. A similar process occurs at the anode. In this way, water electrolysis with strong electrolyte shows a small resistance between two electrodes. However, notice that even though the ion transport inside bulk electrolyte solution is large enough for the continued reaction, at cathode the sodium ions transport is still limited mainly by diffusion (because of the weak electric field in bulk solution)[18, 20], which is often slower than $OH^-$ ions generation (i.e., reaction electron-transfer). Under steady-state conditions, net OH— ions accumulation still occurs at cathode and the potential effect on Helmholtz-plane still exists.

In pure water, when the counter-electrode is placed within the Debye-length (FIG. 41C), large electric field can form in the entire gap. When the gap distance is small enough, initially the transport rate can be even higher than the electron-transfer rate. Once OH⁻ ions are generated at the cathode, they are immediately drawn from cathode to anode, resulting in the OH-ions waiting for electron-transfer at the anode, rather than accumulated at the cathode. The whole reaction would continue even in pure water, but now is limited by electron-transfer. In this case, net OH⁻ ions accumulate near the anode and net H3O⁺ ions accumulate near the cathode, leading to completely opposite pH-value distribution compared to macrosystem (which may be good for protecting the anode against corrosion). Moreover, net OH⁻ ion enrichment near the anode not only enhances the local concentration of the reactant ions but also increases the potential difference between anode and anode Helmholtz-plane (which in fact decreases the overpotential requirement, as in the Frumkin effect[21]). According to the Butler-Volmer equation [22], $$j = Fk^0 \left[ C_O e^{-\alpha F(E-E^{0'})/RT} - C_R e^{(1-\alpha)F(E-E^{0'})/RT} \right] \quad (2)$$

such OH⁻ ions accumulation can significantly increase the electrolysis current, namely water split ting throughput.

Under steady state, the field-driven effect is equivalent to the scenario that water molecules are split into H3O⁺ and OH⁻ ions in the middle of the gap (see FIG. 46 for more explanations), allowing H3O⁺ ions to drift towards the cathode and OH⁻ ions to drift towards the anode, respectively. In other words, such huge electric field not only increases the transport rate, but also enhances the water molecules ionization (for RC-circuit model, see FIG. 47). From a microscopic perspective, the conductivity of water has been enhanced "equivalently". From the equation of conductivity, $$\sigma = nq\mu \quad (3)$$

where q is the ion charge, μ is the ion mobility and n is the ion concentration. Here the ion charge s have not changed. The increased ion concentration only partially contributes to the conductivity. The fundamental change is that two half-reactions are coupled together, and the electric field distribution within the NEC gap leads to a significantly enhanced "apparent mobility". (In macro system, the intrinsic mobility cannot support the conductivity due to the weak electric field in bulk solution.) The total effect looks like breakdown of pure water. However, notice that this effect is not traditional breakdown of pure water, which actually requires the electric field around 1 V/Å [23], about two magnitude orders larger than what we have discussed here. The high electric field in our NECs could not split water molecules directly; however, it enhances water ionization and ion transport, and thus equivalent pure water conductivity. That is why we called this field-driven effect, "virtual breakdown mechanism". The traditional view should be revised that even pure water can be conductive, when the electrode gap is small enough. This "virtual breakdown mechanism" can be applied on almost all types of weakly-ionized materials: such we ak ionization actually helps to achieve the virtual breakdown effect.

Device Fabrication

There have been many efforts [24, 25] to fabricate nanogap electrodes. Electron/ion-beam lithographically-defined nanogap electrodes may not be scalable to large-area fabrication. Chemically-synthesized electrodes [26, 27] and mechanically-fabricated electrodes[28, 29] usually suffer from the lack of controllability. Sacrificial-layer based nanogaps [30-32] require complicated processes and thus perform poor yield [20] especially when nanogaps less than 100 nm. Bohn et al [18, 33, 34] and White et al [19, 20] have done excellent work on nanogap-based reversible redox cycling analysis at low ionic strength; however, their structures may not be suitable for irreversible reactions, especially with gas evolution.

The fabrication procedure of our open-cell sandwiched-like NECs is shown in FIG. 42A. First, a film stack of silicon dioxide (thermal oxidation), Pt (bottom cathode metal, electron-beam evaporation), silicon nitride (plasma-enhanced chemical vapor deposition) were deposited on silicon wafers. Afterwards, Ti (adhesion layer) with gold (top anode metal) and Cr (etching mask) were patterned by photolithography, electron-beam evaporation and lift-off process. The patterns consist of contact pads and 1-D gratings with different values of pitch. Here only the top gold anode was patterned and the bottom Pt cathode was a blank film. Next, the silicon nitride was etched with Cr (low sputtering yield[35]) as mask by low DC-bias anisotropic etching that was developed by us[36], to avoid metal atoms sputtered out everywhere during etching. This method can avoid short-circuit between the top and bottom electrodes and thus enhance the yield of device fabrication. Finally, the Cr mask was removed by Cr wet etching (ALDRICH®), which can also increase the hydrophilicity of the entire surface. The whole process is yield-controlled and can be scalable to mass manufacturing.

Platinum and gold were selected as the cathode and anode, respectively, due to their ability to catalyze hydrogen/oxygen evolution; gold is stable towards anodic oxidation [37] to avoid short-circuit between the two electrodes during electrolysis caused by metal dissolution and re-deposition [38]. The experimental set-up is schematically shown in FIG. 42A, with two electrode tips connected to the anode and cathode, and pure deionized water (DI water) was dropped to cover the grating region. The hydrophilicity of the entire surface guaranteed that the water completely wetted the whole electrode structure and gaps. Notice that the field-driven pure water splitting only occurs at the boundary (edges) of each grating line (more details in next section). FIG. 42B-FIG. 42D also shows the fabrication results (40 μm grating pitch and 72 nm gap distance as an example) observed by unaided eyes (top view), by optical microscopy (top view) and by scanning electron microscopy (SEM) (cross-section view).

Experimental Results

Pure Water.

When exposed to air, $CO_2$ dissolution into water (pH around 5.7 [39]) results in the Debye-length reduction from 1 μm to around 220 nm. For our smallest gap distance 37 nm, the double layer at each electrode has been at least compressed into ⅒ of the original Debye-length, as we claimed "deep-sub-Debye-length". FIG. 43A shows the I-V curves from pure water experiments based on different gap distances from 37 nm to 1.4 μm. When gap distance shrank, the electrolysis current became larger due to higher electric field between two electrodes (FIG. 43A). The threshold voltage around 1.5 V suggests that the energy efficiency is very close to 100% based on a thermoneutral potential of 1.48 V [5]. A voltage plateau around 0.9 V was observed in the log current vs. voltage plot (FIG. 43B), which was independent of the gap distance. This may result from the dissolved oxygen reduction since the DI water was not saturated with inert gas;

another reason may be surface oxide formation on gold during water electrolysis [38, 40, 41]. The entire surface became more hydrophilic after first test, which was consistent with surface oxidation or hydroxide formation. In experiments, sometimes anode damage occurred when the voltage was above 5 V (see FIG. 49A-FIG. 49B). FIG. 43D shows part of the experimental set-up and bubbles generation around 2 V during the pure water splitting (see FIG. 50A-FIG. 50B for more bubble effects).

In NECs the electron-transfer rate only depends on the cell voltage while the transport rate (mainly by migration) depends both on voltage and gap distance (i.e., electric field). In a plot of electrolysis current vs. gap distance-1 (a scale of electric field) at each voltage, if the reaction is limited by electron-transfer, the current should be relatively independent of the gap distance; however, if the reaction is limited by mass transport, the current should be sensitive to the gap distance (showing a large slope). FIG. 43C clearly demonstrated such effects. For large gaps, a large slope appeared on the figure since the reaction was mass-transport limited; when the gap was small enough, the current reached saturation value only dependent on the voltage, indicating an electron-transfer limited reaction. The critical gap distance (or "turning point") between such two states became smaller (moved to the right on the figure) with increasing voltage. This is because the electron-transfer rate increases faster than the mass transport when voltage increases (exponential vs. linear), therefore smaller gaps are necessary in order to achieve saturation current (electron-transfer limited) at higher voltages.

Sodium Hydroxide Solution.

The electrolysis of pure water and 1 mol/L sodium hydroxide solution were compared in FIG. 44A, both based on our NECs with the same gap distance 72 nm and different grating pitches. For pure water, the electrolysis current at 1.8 V linearly increased with the number of grating edges; while for sodium hydroxide solution, the current was less dependent on the number of edges (i.e., grating pitch) and the data dispersion was significantly larger than that of pure water. The mechanism is shown in FIG. 44B. For pure water splitting, the reaction only occurs at the edges where the electrode distance is small enough to couple the two half-reactions together; at the "non-edge" region (i.e., top face) of the grating line, the scenario is just like pure water splitting in macrosystem (self-limited due to large electrode distance). On the contrary, in sodium hydroxide solution the entire surface was involved in supporting the reaction. That is because Debye-length in 1 mol/L sodium hydroxide solution is less than 1 nm, still significantly smaller than the electrode distance (72 nm here). Thus, the two half-reactions are not coupled together and are still diffusion-limited, just like that in macrosystem where the reactions occurs on all accessible parts of the electrodes. Therefore, the current greatly depends on the effective reaction area. In our present experiments, the area was that covered by the solution droplet and was not accurately controlled. Thus, the current from sodium hydroxide solution was not sensitive to grating pitches and presented significant variability (see more discussions in FIG. 51A-FIG. 51B). In comparison, the current from pure water was not sensitive to the area of the droplet region, and bubbles could only form within the grating region. Also discussed here in are the two voltage plateaus around 0.4 V and 1.2 V, respectively, on the log-plot of the I-V cu ryes in sodium hydroxide solution.

Notice that the current from sodium hydroxide solution still increased slightly with the number of edges. Even though it was diffusion limited, at the edges the overall diffusion length had shrunk to 72 nm. Therefore, more edges could slightly enhance the electrolysis current. Notice that the effective reaction area in sodium hydroxide solution was much larger than that in pure water. Even under such unfavorable conditions, the electrolysis current from pure water was comparable to that from 1 mol/L sodium hydroxide solution, indicating much larger current density from pure water and more than $10^5$-fold enhancement of the apparent conductivity of pure water. (The conductivity of 1 mol/L sodium hydroxide solution and common pure water (equilibrated with $CO_2$ in air) are $2 \times 10^5$ µS/cm and 1 µS/cm [39], respectively.) From the linear fitting, we can conclude that when the grating pitches are smaller than 2 µm, the electrolysis current from pure water can be even higher than that from 1 mol/L sodium hydroxide solution of the same pitch (2 µm pitch is beyond our photolithography capability, therefore we did not attempt it at present stage). These results demonstrate the enhancement of pure water splitting by virtual breakdown effect compared to the conventional transport-limited reaction and a potential for greatly increased efficiency for hydrogen production.

Conclusion

Field-driven splitting of pure water at room temperature for high-efficiency hydrogen production has been successfully achieved in this paper based on our metal-dielectric-metal sandwiched-like nanogap electrochemical cells. The gap distance between anode and cathode down to 37 nm has been demonstrated. In such deep-sub-Debye-length region where double layers overlapped, high electric field in the entire gap couples the two half-reactions together, and significantly enhances water molecules ionization and mass transport, leading to an electron-transfer limited reaction. This virtual breakdown mechanism can greatly enhance the equivalent conductivity of pure water by more than $10^5$-fold, resulting in electrolysis current density significantly larger than that from 1 mol/L sodium hydroxide solution, and thus a higher efficiency for hydrogen production. We propose to investigate this virtual breakdown mechanism further. For example, reference electrode can be added to study cathode current and anode current separately; characterizations of capacitance-voltage curves will also provide important information for theoretical analysis. Moreover, such virtual breakdown mechanism can be applied on almost all weakly-ionized materials, and may have applications for ultrafast charging, alcohol electrolysis, carbon-dioxide reduction and fuel cells. Besides, compared to other NECs, our open cells can be simply fabricated on large area with high yield, and have a great potential to enhance the rate of redox reactions for ultra-sensitivity/selectivity. At last, compared to the current industrial water electrolysis, such high-efficiency pure water splitting without any electrolyte at room temperature, especially connected to renewable energy sources, is very promising for both mass manufacturing and portable devices for on-demand clean hydrogen production.

Example 3b (Part 2)

Finite Element Calculations

The simulation results shown in FIG. 40B were achieved using commercial software, Comsol Multiphysics® 5.2. The 2-D geometry and boundary conditions setting are shown in FIG. 45 (take gap distance of 5 µm as an example, only one boundary edge of our sandwiched-like nanogap cells was simulated). The parameters setting are shown in Table Ib.

TABLE Ib

Parameters setting in finite element calculations.

| Name | Value | Unit | Description |
|---|---|---|---|
| T0 | 25 | deg C. | Temperature |
| c_H_bulk | 0.0001 | mol/m^3 | Bulk cation concentration |
| c_OH_bulk | c_H_bulk | mol/m^3 | Bulk anion concentration |
| z_H | 1 | | Cation charge |
| z_OH | −1 | | Anion charge |
| D_H | 9.31E−09 | m^2/s | Diffusion coefficient, cation |
| D_OH | 5.26E−09 | m^2/s | Diffusion coefficient, anion |
| eps_H2O | 80 | | Relative permittivity of water |
| xS | 0.2 | nm | Stern layer thickness |
| phi_anode | 0.5 | V | Anode potential |
| rho_space | F_const*(z_H*c_H + z_OH*c_OH) | C/m$^3$ | Space charge density |
| deltaphi | phiM-phi | V | Electrode-OHP potential difference |
| rho_surf | epsilon0_const*eps_H2O*deltaphi/xS | C/m$^2$ | Surface charge density |
| phiM (at anode) | phi_anode/2 | V | Anode potential |
| phiM (at cathode) | −phi_anode/2 | V | Cathode potential |
| thk_nitride | Manually setting | μm | Thickness of silicon nitride layer |

The equations that governed the ions movement and distribution were the steady-state Nernst-Planck equation and the Poisson equation, $$J_i = -D_i \nabla C_i - (z_i F/RT) D_i C_i \nabla \varphi \quad \text{(S1)}$$

$$\nabla^2 \varphi = -\rho/\varepsilon_r \varepsilon_0 \quad \text{(S2)}$$

where $J_i$, $D_i$, $C_i$, and $z_i$ are the current density, diffusion coefficient, concentration and charge of species I, $\varphi$ is the local electric potential, $\rho$ is the local net charge density in the solution, $\varepsilon_r$ is the static dielectric constant, $\varepsilon_0$, $F$, $R$, and $T$ are the permittivity of vacuum, Faraday constant, gas constant and temperature. To simplify the problem, $\varepsilon_r$ of pure water was set constant 80 in the entire solution even though near the electrode surface $\varepsilon_r$ can be reduced to less than 10 [1].

The Debye-length (around 1 μm in pure water) was calculated from Gouy-Chapman theory, which requires infinite electrode plane and potential much smaller than 26 mV at room temperature. Simulation results showed that, even though our modeling could not satisfy the two requirements of Gouy-Chapman theory, the approximation value of 1 μm could still be used since little difference showed up between the theoretical value (from the Gouy-Chapman theory) and simulated value (from the software simulation). Besides, the smallest nanogap between the two electrodes we achieved was 37 nm, which was much smaller than both theoretical value and simulated value. Thus, the claim of "deep-sub-Debye-length" is still valid.

Stern layer had been considered in the initial setting; however, the final results had little dependence on with or without Stern layer setting. This is probably because the simulation mesh was not fine enough near the electrode surface. Mesh quality is a key factor of the simulation results. We discovered that finer mesh near the surface greatly enhanced the surface concentration (more obvious when large potential added). However, further finer meshing was not possible due to limited computational resources. Here, more accurate results might not be necessary. Quantitatively, we have demonstrated the double layer overlapping effect, and high electric field (just voltage divided by gap distance) uniformly distributed in the entire gap has been demonstrated as well. For our current research, we determined that these simulation results are sufficient.

Virtual Breakdown Effect

For pure water splitting in nanogap cells, the two half-reactions are coupled together. Take the anode as an example. At the anode OH— ions (the reaction ions) come from two parts: one is from water ionization near the anode; the other part comes from the OH⁻ ions migrated from the cathode to the anode. When the gap is small enough, migration rate can be larger than electron-transfer rate so that the reaction is limited by electron-transfer. Initially, 1 unit of electron-transfer leads to two units of OH⁻ ions generation, resulting in non-consumed OH⁻ ions accumulated near the anode. Such ions accumulation at the electrodes slows down further water ionization near the electrodes, to reduce the total OH⁻ ions generation rate to balance with the 1 unit of electron-transfer in the external circuit. Under steady state condition, the sum of the OH⁻ ions from the two parts is balanced with the 1 unit of electron-transfer in the external circuit. Such scenario appears like that the water molecules are split into H3O⁺ and OH⁻ ions in the middle of the gap (FIG. 46), allowing H3O⁺ ions to drift towards the cathode and OH⁻ ions to drift towards the anode, respectively. The whole effect looks like that water has been broken-down. However, we should point out that in fact water molecule dissociation still occurs only near the electrode (due to local ion consumption); the water dissociation in the middle of the gap is just the equivalent effect.

RC-Circuit Model

FIG. 47 shows the RC-circuit model of half-reaction of water splitting in nanogap cells. The capacitor represents the double layer. R1 represents the reaction rate of electron-transfer, which depends only on the changes in potential drop across the interface. R2 represents the mass transport rate, which is related to both voltage and gap distance (i.e., electric field in the gap). R3 represents the water ionization rate. When gap distance is smaller, R2 becomes smaller; while R1 can also be slightly smaller since local reaction ion concentrations become higher and potential drop becomes larger, meaning that R1 is coupled to R2. R3 may depend on R1 because ions are consumed continuously, thus R3 can be enhanced by shifting the ionization equilibrium. When the gap distance is around Debye-length, R2 is the largest one and determines the whole reaction rate; however, when gap is much smaller than Debye-length, R2 can be smaller than R1, indicating electron-transfer limited reaction. That is to say, when gap distance further decreases, the current reaches a saturation value that only depends on voltage.

Low DC-Bias Silicon Nitride Anisotropic Etching

To avoid short-circuit between top anode and bottom cathode metal layers, low DC-bias silicon nitride etching technology was developed in order to reduce the ion bombardment effect. In experiments we discovered that traditional nitride etching with high DC-bias could lead to low yield of device fabrication: most of the devices got short-circuit after nitride etching. This was because that the sputtered metal atoms formed short-circuit path on the sidewall, connecting top anode and bottom cathode [2]. By using our low DC-bias etching recipe, the fabrication yield has been improved greatly. The recipe parameters and the etching profile are shown in FIG. 48. The DC-bias of the silicon nitride etching was down to 19-21 V with etching rate larger than 80 nm/min and vertical sidewalls, even better than literature reported values [2]. Exactly vertical sidewalls were not required because in fact a little bit isotropic etching was desired since anode tips at the boundary could form higher electric field.

Anode Damage.

Anode can be roughed during redox cycling [3, 4]. The roughness comes from the electrochemically oxidation and re-deposition of the anode metal, even for gold [3, 5]. In experiments, such anode damage sometimes occurred when the applied voltage values were above 5 V (FIG. 49A-FIG. 49B). Thinner-gap samples were more likely to suffer damage. Moreover, damage always showed up near the grating boundary where the electric field was the highest. Such damage, especially the re-deposition of gold atoms, can lead to short-circuit between the anode and the cathode (especially for smaller gap distances), and thus reducing the lifetime of the devices. To avoid such short-circuit, the maximum external voltage was set to be 2.5 V (to reduce the current density in fact). In this way, the devices can be measured repetitively without obvious damage or short-circuit.

Two possible approaches are proposed here to avoid such anode damage. First, indium tin oxide (ITO) can be used to replace the gold as anode material, with its highest oxidation state which cannot be oxidized further [6, 7]. Second, an ultrathin layer of energy-band offset material [8, 9] may be coated onto the gold anode, with thickness small enough to be conductive to gold while preventing gold contacting water directly.

Bubble Effects

FIG. 52A-FIG. 52B shows the log I vs. V curves from tests of both pure water and sodium hydroxide solution. For pure water, one plateau appeared around 0.9 V (also shown in FIG. 4 3B). This plateau became flatter after the first test on the same device. For sodium hydroxide solution, two plateaus, around 0.4 V and 1.2 V respectively, were shown on the log I vs. V curves. After first test, the 0.4 V plateau still existed but the 1.2 V plateau disappeared, and the current became much larger (the 2V plateau can be ignored since it is due to the bubble effects). This plateau phenomenon is quite repeatable, no matter what the gap distance or pitch is, indicating that it is more likely related to the intrinsic electrochemical reactions, rather than geometry factors. However, the fundamental mechanism is not clear.

Only a few literature reviews discussed about such plateaus in log I vs. V curves. Without being bound by theory, our hypothesis is the following. The 0.9 V plateau from pure water tests may be attributed to dissolved oxygen reduction or anode gold oxidation (and these two effects might be coupled).

For sodium hydroxide solution, the 0.4 V plateau most likely came from the reduction of dissolved oxygen; while the 1.2 V plateau was related to anode gold oxidation. The different values of the oxidation plateaus in pure water and in sodium hydroxide solution was most likely due to the difference in pH values. The 0.4 V plateau would not disappear since for every test new sodium hydroxide solution (without inert gas saturation) was used. For the gold anode, non-conductive oxide state I and conductive oxide state II can form during water splitting[10]. During the first test in sodium hydroxide solution, OH$^-$ ions concentration was so large that all surface gold could be oxidized to state II, therefore during the second or third tests no surface gold could be oxidized further (thus the 1.2 V plateau disappeared). Also, because oxide state II was porous and conductive, the distance between anode and cathode had been shortened due to gold oxide islands and the current after the first test could become larger (the larger current could be also attributed to roughness of the surface since effective reaction area became larger [4]). However, for pure water, OH— ions concentration was small so that only oxide state I might form, therefore gold could still be oxidized further into the formation of state I during the second or even third tests (until two or three monolayers of the oxide state I coverage reached [3, 11]), with almost the same electrolysis current or smaller since oxide state I was non-conductive. However, such plateaus may also result from the formation of oxygen coverage [12], inhibition layer [13] or inert sites [14].

Example 3c (Part 1)

Due to the low conductivity of pure water, using an electrolyte is common for achieving efficient water electrolysis. In the present invention, we provide, in various embodiments a system for the efficient electrolysis of pure water (without any added electrolyte) at room temperature using deep-sub-Debye-length nanogap electrochemical cells. A novel field-assisted effect resulted from overlapped electrical double layers can greatly enhance water molecules ionization and mass transport, leading to electron-transfer limited reactions. We have named this process "virtual breakdown mechanism" (which is completely different from traditional mechanisms) that couples the two half-reactions together, greatly reducing the energy losses arising from ion transport and presenting a new way to increase the efficiency of water electrolysis. This fundamental discovery has been theoretically discussed in this paper and experimentally demonstrated in a group of electrochemical cells with nanogaps between two electrodes down to 37 nm. Based on our nanogap electrochemical cells, the electrolysis current density from pure water can be significantly larger than that from 1 mol/L sodium hydroxide solution, indicating the much higher efficiency of pure water splitting as a potential for on-demand clean hydrogen production.

We have demonstrated a novel approach to water electrolysis that could potentially lead to higher efficiency, by using electrochemical cells with distance between anode and cathode in nanometer-scale. With these nanogap electrochemical cells (NECs), pure water (without any added electrolyte) can be electrolyzed efficiently to generate hydrogen and oxygen due to the large electric field in the entire electrode gap, contrary to the traditional thinking that pure water cannot be electrolyzed. Our experiments have demonstrated that the equivalent conductivity of pure water has been enhanced more than $10^5$-fold, and the electrolysis current density from pure water can be greatly larger than that from 1 mol/L sodium hydroxide solution, which results from a completely different microscopic mechanism of field-assisted water ionization and even "virtual breakdown". The splitting of pure water based on NECs greatly reduces the energy losses arising from ion transport and presents a new way to increase the efficiency of water electrolysis, indicating a great potential for high-efficiency on-demand hydrogen production for both mass manufacturing and portable devices; it is also fundamentally inspiring in the nano-electrochemistry field for many other applications.

For simplicity, consider the solution resistance between anode and cathode for water splitting, as given by $$R = \rho \frac{l}{S} \quad (1)$$

where $\rho$ is the resistivity, l is the resistor length (electrode distance) and S is the cross-section area of the resistor. We found that as the electrode distance shrinks to much smaller than Debye-length $\lambda_d$ (around 1 µm for pure water), not only the value of l decreases, but the equivalent resistivity $\rho$ also decreases greatly, which in fact contributes more to the decrease of resistance R. This decrease is attributed to the huge electric field between two electrodes within such deep-sub-Debye-length region (FIG. 53A-FIG. 53B). For water electrolysis with strong electrolyte in macrosystem, the electric field is screened by the double layer, leading to nearly zero electric field in bulk solution (FIG. 53A). However, when the electrode gap distance is smaller than the Debye-length, large electric field can be uniformly distributed in the entire gap due to overlapping of the double layers at the two electrodes. In our metal-dielectric-metal sandwiched-like NECs, the gap distance is tuned by adjusting the silicon nitride thickness and can be easily achieved to deep-sub-Debye-length in pure water. FIG. 53B shows the simulation results of electric field distribution between two electrodes with different gap distances. Close to the electrode regions both the nanogap cell and the macrosystem present a high electric field due to the double layer; however, in bulk solution the electric field in 100 µm macrosystem is only 10 V/m while in 37 nm gap the field can be above $10^7$ V/m. Such a high electric field in the entire gap of nanogap cells can result in significant ion enrichment and rapid ion migration [18, 19], leading to electron-transfer limited reactions, and even further field-assisted water ionization and virtual breakdown.

Device Fabrication

There have been many efforts [20, 21] to fabricate nanogap electrodes. Electron/ion-beam lithographically-defined nanogap electrodes may not be scalable to large-area fabrication. Chemically-synthesized electrodes [22, 23] and mechanically-fabricated electrodes [24, 25] usually suffer from the lack of controllability. Sacrificial-layer based nanogaps [26-28] require complicated processes and thus perform poor yield [29] especially when nanogaps less than 100 nm. Bohn et al [18, 30, 31] and White et al [19, 29] have done excellent work on nanogap-based reversible redox cycling analysis at low ionic strength; however, those structures may not be suitable for irreversible reactions, especially with gas evolution.

The fabrication procedure of our open-cell sandwiched-like NECs is shown in FIG. 42A. First, a film stack of silicon dioxide (thermal oxidation), Pt (bottom cathode metal, electron-beam evaporation), silicon nitride (plasma-enhanced chemical vapor deposition) were deposited on silicon wafers. Afterwards, Ti (adhesion layer) with gold (top anode metal) and Cr (etching mask) were patterned by photolithography, electron-beam evaporation and lift-off process. The patterns consist of contact pads and 1-D gratings with different values of pitch. Here only the top gold anode was patterned and the bottom Pt cathode was a blank film. Next, the silicon nitride was etched with Cr as mask (low sputtering yield [32]) by low DC-bias anisotropic etching that was developed by us [33], to avoid metal atoms sputtered out everywhere during etching. This method can avoid short-circuit between the top and bottom electrodes and thus greatly enhance the yield of device fabrication. Then, the Cr mask was removed by Cr wet etching (ALDRICH®), which can also increase the hydrophilicity of the entire surface. Finally, the sample was completely cleaned by acetone, isopropyl alcohol, and deionized water (DI water) to remove all residual ions for further measurement. The whole process is yield-controlled and can be scaled for mass manufacturing.

Platinum was selected as the cathode due to its good catalysis for hydrogen evolution; while gold was the anode because of its stability towards anodic oxidation [34], in order to avoid short-circuit between the two electrodes during electrolysis caused by metal dissolution and re-deposition [35]. The quality of the silicon nitride layer was good enough within our measurement scope, proven by the dry sweep of I-V measurement for every single device before the measurement with pure water (typically the dry sweep current is more than three orders of magnitude smaller than the current from pure water tests and with little hysteresis). The experimental set-up is schematically shown in FIG. 42A, with two electrode tips connected to the anode and cathode, and pure DI water was dropped to cover the grating region. The hydrophilicity of the entire surface guaranteed that the water completely wetted the whole electrode structure and gaps. Notice that the field-assisted pure water splitting only occurs at the boundary (edges) of each grating line (more details in next section). FIG. 42B-FIG. 42D also shows the fabrication results (40 µm grating pitch and 72 nm gap distance as an example) observed by unaided eyes (top view), by optical microscopy (top view) and by scanning electron microscopy (SEM) (cross-section view).

Experimental Results

Pure Water.

When exposed to air, $CO_2$ dissolution into water (pH around 5.7 [36]) results in the Debye-length decreasing from 1 µm to around 220 nm. For our smallest gap distance 37 nm, the double layer at each electrode has been at least compressed into 1/10 of the original Debye-length, as we claimed "deep-sub-Debye-length". FIG. 43A shows the I-V curves from pure water experiments based on different gap distances from 37 nm to 1.4 µm. When gap distance shrank, the electrolysis current became larger due to higher electric field between two electrodes (FIG. 43A). The threshold voltage around 1.5 V was very close to the theoretically minimum required enthalpic potential of 1.48 V [13], indicating a small overpotential on the gold anode. A voltage plateau around 0.9 V was observed in the log current vs. voltage plot (FIG. 43B), which was independent of the gap distance. This may result from the dissolved oxygen reduction since the DI water was not saturated with inert gas; another reason may be surface oxide formation on gold during water electrolysis [35, 37, 38]. The entire surface became more hydrophilic after the first test, which was consistent with surface oxidation or hydroxide formation. In experiments, sometimes anode damage occurred when the voltage was above 5 V due to electrochemical roughness. That is also the reason why only forward sweeping was accomplished here (see FIG. 49A-FIG. 49B for more details). FIG. 43D shows part of the experimental set-up and bubbles generation around 2 V during the pure water splitting (see FIG. 50A-FIG. 50B for more bubble effects).

The results presented in FIG. 43C demonstrated that the reactions in our NECs were limited by electron-transfer rate. In NECs the electron-transfer rate only depends on the cell voltage while the mass transport rate (mainly by migration) depends both on voltage and gap distance (i.e., electric field). In a plot of electrolysis current vs. gap distance$^{-1}$ (a scale of electric field) at each voltage, if the reaction is limited by electron-transfer, the current should be relatively independent of the gap distance; however, if the reaction is limited by mass transport, the current should be sensitive to the gap distance (showing a large slope). This effect was clearly shown in FIG. 43C. For large gaps (comparable to Debye-length), a large slope appeared on the figure since the reaction was mass-transport limited; when the gap was small enough (deep-sub-Debye-length), the current reached saturation value that only depended on the voltage, indicating an electron-transfer limited reaction. The critical gap distance (or "turning point") between such two states became smaller (moved to the right on the figure) with increasing voltage. This is because the electron-transfer rate increases faster than the mass transport when voltage increases (exponential vs. linear), therefore smaller gaps are necessary in order to achieve saturation current (electron-transfer limited) at higher voltages.

Sodium Hydroxide Solution.

Figure 54B:
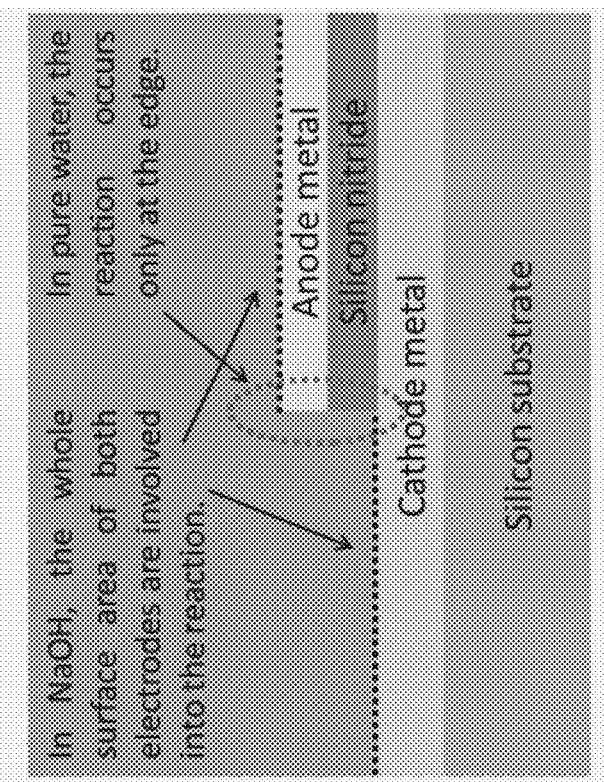
FIG. 54A-FIG. 54B depict in accordance with various embodiments of the invention, comparison between pure water splitting and water splitting in 1 mol/L sodium hydroxide solution, both based on our NECs. The experiment conditions were the same as in FIG. 43. The devices were with 72 nm gap distance and different grating pitches.
Figure 54A:
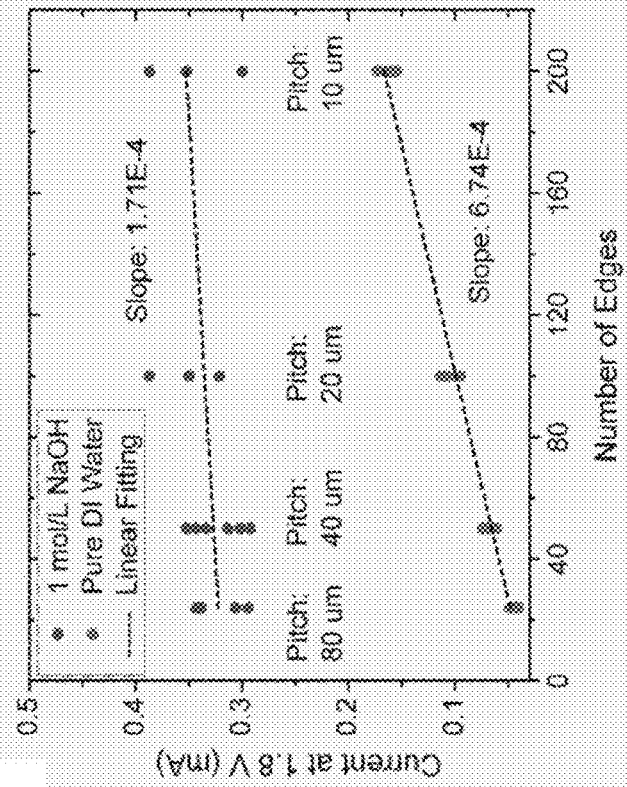

The electrolysis of pure water and 1 mol/L sodium hydroxide solution were compared in FIG. 54A, both based on our NECs with the same gap distance 72 nm and different grating pitches. For pure water, the electrolysis current at 1.8 V linearly increased with the number of grating edges; while for sodium hydroxide solution, the current was much less dependent on the number of edges (i.e., grating pitch) and the data dispersion was significantly larger than that of pure water. The mechanism is shown in FIG. 54B Band will be discussed further under the Discussion section. For pure water splitting, the reaction only occurs at the edges where high electric field uniformly distributed between the two electrodes. On the contrary, in sodium hydroxide solution the entire surface is involved in supporting the reaction. In our present experiments, such effective reaction area was that covered by the solution droplet and was not accurately controlled. Thus, the current from sodium hydroxide solution was not sensitive to grating pitches and presented significant variability (see more evidence in FIG. 51A-FIG. 51B). In comparison, the current from pure water was not sensitive to the area of the droplet region, and bubbles could only form within the grating region. Also discussed herein are the two voltage plateaus around 0.4 V and 1.2 V, respectively, on the log-plot of the I-V curves from sodium hydroxide solution measurements.

Notice that the effective reaction area in sodium hydroxide solution was much larger than that in pure water. Even under such unfavorable conditions, the electrolysis current from pure water was comparable to that from 1 mol/L sodium hydroxide solution, indicating much larger current density from pure water and more than $10^5$-fold enhancement of the apparent conductivity of pure water. (The conductivity of 1 mol/L sodium hydroxide solution and $CO_2$-equilibrated pure water are $2 \times 10^5$ µS/cm and 1 µS/cm[36], respectively.) From the linear fitting, we can conclude that when the grating pitches are smaller than 2 µm, the electrolysis current from pure water can be even higher than that from 1 mol/L sodium hydroxide solution (2 µm pitch is beyond our photolithography capability, therefore we did not attempt it at present stage). These results demonstrate a great potential of splitting of pure water with better performance compared to conventional electrolyte-added water splitting for high-efficiency hydrogen production.

Discussion

To fully explain the fundamental difference between pure water splitting and conventional electrolyte-added water splitting, we first have to discuss why pure water cannot be split efficiently in macrosystem (FIG. 41A). Here we take the cathode as an example. Initially near the cathode surface water molecules can be dissociated into $H_3O^+$ and $OH^-$ ions. $H_3O^+$ ions obtain electrons from the cathode leading to hydrogen evolution, while the newly-generated $OH^-$ ions can be transported very slowly through the bulk solution by slow diffusion or hopping processes, facilitated by a weak electric field in bulk solution. Moreover, the intrinsic concentration of $H_3O^+$ ions in bulk solution of pure water is too low to neutralize the $OH^-$ ions produced near the cathode. These lead to local $OH^-$ ions accumulation (so that the solution near cathode turns alkaline) especially at the cathode surface, causing the potential at the Helmholtz-plane of the cathode to decrease (because of negatively-charged $OH^-$ ions). Such potential decrease reduces the potential difference between the cathode and Helmholtz-plane, further reducing the reaction rate of hydrogen evolution and thus water splitting. In other words, the reaction becomes very slow or even self-limited, showing a large equivalent resistance between cathode and anode. These phenomena also explain the rise in cathode overpotential, since a more negative cathode potential is necessary to overcome the decrease of the potential difference between the cathode and Helmholtz-plane. The fundamental reason is the lack of rapid ion transport inside bulk solution.

When a high-concentration of sodium hydroxide is present in the electrolyte (FIG. 41B), plenty of $Na^+$ ions from bulk solution can move to partially compensate for the accumulated charges from the newly-generated $OH^-$ ions near the cathode, restoring the potential difference between the cathode and Helmholtz-plane, to reduce the overpotential requirement and sustain the reaction current. A similar process occurs at the anode. In this way, water electrolysis with strong electrolyte shows a small resistance between the two electrodes and the whole reaction of water splitting can continue. However, notice that even though the ion transport inside bulk electrolyte solution is large enough to keep the reactions continuing, at cathode the sodium ions transport is still limited mainly by diffusion (because of the weak electric field in bulk solution) [18, 29], which is often slower than $OH^-$ ions generation (i.e., reaction electron-transfer) especially when the current density is large enough. Under steady-state conditions, net $OH^-$ ions accumulation still occurs at cathode and the potential effect on Helmholtz-plane still exists. Without being bound by theory, here we propose our hypothesis on the mechanism of pure water splitting. In pure water, when the counter-electrode is placed within the Debye-length (FIG. 41C), large electric field can form in the entire gap. When the gap distance is small enough, initially the transport rate can be even higher than the electron-transfer rate. Once $OH^-$ ions are generated at the cathode, they are immediately drawn from cathode to anode, resulting in the $OH^-$ ions waiting for electron-transfer at the anode, rather than accumulated at the cathode. In this way, the whole reactions would continue even in pure water, but now are limited by electron-transfer. Without being bound by theory, such hypothesis implies that in this case net $OH^-$ ions accumulate near the anode and net $H_3O^+$ ions accumulate near the cathode, leading to completely opposite pH-value distribution compared to macrosystem (which may be good for protecting the anode against corrosion). Moreover, such net $OH^-$ ion enrichment near the anode not only enhances the local concentration of the reactant ions, but also increases the potential difference between anode and anode Helmholtz-plane (which in fact decreases the overpotential requirement, as in the Frumkin effect [39]). According to the Butler-Volmer equation [40], $$j = Fk^0 \left[ C_O e^{-\alpha F(E-E^{0'})/RT} - C_R e^{(1-\alpha)F(E-E^{0'})/RT} \right] \quad (2)$$

such $OH^-$ ions accumulation can significantly increase the electrolysis current density, namely water splitting throughput.

The proposed mechanism can successfully explain the small overpotential on the gold anode demonstrated in FIG. 43A, the electron-transfer limitation demonstrated in FIG. 43C and the larger current density from pure water demonstrated in FIG. 54A; it can also explain the different performance of pure water and sodium hydroxide solution shown in FIG. 54B. For pure water splitting, the reaction only occurs at the edges where high electric field uniformly distributed in the entire gap; at the "non-edge" region (i.e., top face) of the grating line, the scenario is just like pure water splitting in macrosystem (self-limited due to large electrode distance). On the contrary, in sodium hydroxide solution the entire surface is involved in supporting the reaction. That is because the Debye-length in 1 mol/L sodium hydroxide solution is less than 1 nm, still significantly smaller than the electrode distance (72 nm here). Thus, the two half-reactions are separated and still diffusion-limited, just like that in macrosystem where the reactions occur on all accessible parts of the electrodes. Therefore, the electrolysis current from sodium hydroxide solution depends on the entire effective reaction area. In FIG. 54A, the slope (increased electrolysis current per edge) from the pure water curve was significantly larger than the slope from the sodium hydroxide solution curve, indicating much larger contribution to electrolysis current from the field-assisted effect than from the diffusion effect.

Without being bound by theory, based on our hypothesis, the two half-reactions become coupled together in pure water splitting in NECs. Take the anode as an example. At the anode $OH^-$ ions (the reaction ions) come from two parts: one is from water ionization near the anode; the other part comes from the $OH^-$ ions migrated from the cathode to the anode. Under steady-state condition, such two parts of $OH^-$ ions are balanced with the amount of electrons from the external circuit. Notice that, although water molecule dissociation still occurs only near the electrode (due to local ions continuous consumption), it appears like that the water molecules are split into $H_3O^+$ and $OH^-$ ions in the middle of the gap, allowing $H_3O^+$ ions to drift towards the cathode and $OH^-$ ions to drift towards the anode, respectively. In other words, such huge electric field not only increases the transport rate, but also enhances the water molecules ionization (i.e., ions concentration). From a microscopic perspective, the conductivity of water has been enhanced "equivalently". From the equation of conductivity, $$\sigma = nq\mu \quad (3)$$

where q is the ion charge, $\mu$ is the ion mobility and n is the ion concentration. Here the ion charges have not changed. The increased ion concentration only partially contributes to the conductivity. The fundamental change is the uniform electric field within the NEC gap leading to a significantly enhanced "apparent mobility". (In macrosystem, the intrinsic mobility cannot support the conductivity due to the weak electric field in bulk solution.) The total effect looks like breakdown of pure water. However, notice that this effect is not traditional breakdown of pure water, which actually requires the electric field around 1 V/Å [41], about two magnitude orders larger than what we have achieved here. The high electric field in our NECs could not split water molecules directly. However, it can take advantage of the self-ionization of the water molecule to $H_3O^+$ and $OH^-$ ions that are continuously consumed at the electrodes, facilitating the following equilibrium reaction to shift in the ionization direction, $$2H_2O \Leftrightarrow H_3O^+ + OH^- \quad (4)$$

Such field-assisted ionization, plus the strong ion transport, performs in a manner similar to the breakdown of pure water. That is why we called this field-assisted effect, "virtual breakdown mechanism". The traditional view should be revised that even pure water can be electrolyzed, when the electrode gap is small enough. This "virtual breakdown mechanism" can be applied on almost all types of weakly-ionized materials: such weak ionization actually helps to achieve the virtual breakdown effect. These findings may open up new possibilities and inspire new electrochemical applications.

Conclusion

Fundamentally different from conventional and well-established water electrolysis that relies on high concentrations of added electrolyte, field-assisted splitting of pure water at room temperature has been successfully achieved in this paper based on our metal-dielectric-metal sandwiched-like nanogap electrochemical cells. The gap distance between anode and cathode down to 37 nm has been demonstrated. In such deep-sub-Debye-length region where the double layers overlapped, high electric field in the entire gap couples the two half-reactions together, and significantly enhances water molecules ionization and mass transport, leading to an electron-transfer limited reaction. This virtual breakdown mechanism can reduce the energy losses arising from ion transport, and greatly enhance the equivalent conductivity of pure water by more than $10^5$-fold, resulting in the electrolysis current density significantly larger than that from 1 mol/L sodium hydroxide solution, and thus a higher efficiency for hydrogen production. Moreover, such virtual breakdown mechanism can be applied on almost all weakly-ionized materials, and may have applications for ultrafast charging, alcohol electrolysis, carbon-dioxide reduction and fuel cells. Besides, compared to other NECs, our open cells can be simply fabricated on large area with high yield, and have a great potential to enhance the redox cycling rate for ultra-sensitivity/selectivity. At last, compared to the current industrial water electrolysis, such high-efficiency pure water splitting without any electrolyte at room temperature, especially connected to renewable energy sources, is very promising for both mass manufacturing and portable devices for on-demand clean hydrogen production.

Example 3c (Part 2)

Finite Element Calculations

The simulation results shown in FIG. 53B were achieved using commercial software, Comsol Multiphysics® 5.2. The 2-D geometry and boundary conditions setting are shown in FIG. 45 (take gap distance of 5 μm as an example, only one boundary edge of our sandwiched-like nanogap cells was simulated). The parameters setting are shown in Table Ic.

TABLE Ic

Parameters setting in finite element calculations.

| Name | Value | Unit | Description |
|---|---|---|---|
| T0 | 25 | deg C. | Temperature |
| c_H_bulk | 0.0001 | mol/m^3 | Bulk cation concentration |
| c_OH_bulk | c_H_bulk | mol/m^3 | Bulk anion concentration |
| z_H | 1 | | Cation charge |
| z_OH | −1 | | Anion charge |
| D_H | 9.31E−09 | m^2/s | Diffusion coefficient, cation |
| D_OH | 5.26E−09 | m^2/s | Diffusion coefficient, anion |
| eps_H2O | 80 | | Relative permittivity of water |
| xS | 0.2 | nm | Stern layer thickness |
| phi_anode | 0.5 | V | Anode potential |
| rho_space | F_const*(z_H*c_H + z_OH*c_OH) | C/m³ | Space charge density |
| deltaphi | phiM-phi | V | Electrode-OHP potential difference |
| rho_surf | epsilon0_const*eps_H2O*deltaphi/xS | C/m² | Surface charge density |
| phiM (at anode) | phi_anode/2 | V | Anode potential |
| phiM (at cathode) | −phi_anode/2 | V | Cathode potential |
| thk_nitride | Manually setting | μm | Thickness of silicon nitride layer |

The equations that governed the ions movement and distribution were the steady-state Nernst-Planck equation and the Poisson equation, $$J_i = -D_i \nabla C_i - (z_i F/RT) D_i C_i \nabla \varphi \quad (S1)$$

$$\nabla^2 \varphi = -\rho/\varepsilon_r \varepsilon_0 \quad (S2)$$

where $J_i$, $D_i$, $C_i$, and $z_i$ are the current density, diffusion coefficient, concentration and charge of species i, $\varphi$ is the local electric potential, $\rho$ is the local net charge density in the solution, $\varepsilon_r$ is the static dielectric constant, $\varepsilon_0$, F, R, and T are the permittivity of vacuum, Faraday constant, gas constant and temperature. To simplify the problem, $\varepsilon_r$ of pure water was set constant 80 in the entire solution even though near the electrode surface $\varepsilon_r$ can be reduced to less than 10 [1].

The calculation of the Debye-length of pure water, around 1 μm, from Gouy-Chapman theory requires infinite electrode plane and potential much smaller than 26 mV at room temperature. Simulation results showed that, even though our modeling could not satisfy the two requirements of Gouy-Chapman theory, the approximation value of 1 μm could still be valid since little difference showed up between the theoretical value (from the Gouy-Chapman theory) and simulated value (from the software simulation). Besides, the smallest nanogap between the two electrodes we achieved was 37 nm, which was much smaller than both theoretical value and simulated value. Thus, the claim of "deep-sub-Debye-length" is still valid.

Stern layer had been considered in the initial setting; however, the final results had little dependence on with or without Stern layer setting. This is probably because the simulation mesh was not fine enough near the electrode surface. Mesh quality is a key factor of the simulation results. We discovered that finer mesh near the surface greatly enhanced the surface concentration (more obvious when large potential added). However, further finer meshing was not possible due to limited computational resources. Here, more accurate results might not be necessary. Quantitatively, we have demonstrated the double layer overlapping effect, and high electric field (just voltage divided by gap distance) uniformly distributed in the entire gap. For our current research, we determined that these simulation results are sufficient.

Low DC-Bias Silicon Nitride Anisotropic Etching

To avoid short-circuit between top anode and bottom cathode metal layers, low DC-bias silicon nitride etching technology was developed in order to reduce the ion bombardment effect. In experiments we discovered that traditional nitride etching with high DC-bias could lead to low yield of device fabrication: most of the devices got short-circuit after nitride etching. This was because that the sputtered metal atoms formed short-circuit path on the sidewall, connecting top anode and bottom cathode [2]. By using our low DC-bias etching recipe, the fabrication yield has been improved greatly. The recipe parameters and the etching profile are shown in FIG. 48. The DC-bias of the silicon nitride etching was down to 19-21 V with etching rate larger than 80 nn/min and vertical sidewalls, even better than literature reported values [2]. Exactly vertical sidewalls were not required because in fact a little bit isotropic etching was desired since anode tips at the boundary could form higher electric field.

Anode Damage

Anode can be roughed during redox cycling [3, 4]. The roughness comes from the electrochemically oxidation (forward sweeping) and re-deposition (backward sweeping) of the anode metal, even for gold [3, 5]. In experiments, such anode damage sometimes occurred when the applied voltage values were above 5 V (FIG. 49A-FIG. 49B). Thinner-gap samples were more likely to suffer damage. Moreover, damage always showed up near the grating boundary where the electric field was the highest. Such damage, especially the re-deposition of gold atoms, can lead to short-circuit between the anode and the cathode (especially for smaller-gap samples), and thus reducing the lifetime of the devices. To avoid such short-circuit, the backward sweeping was removed, and the maximum external voltage for forward sweeping was set to be 2.5 V (to reduce the current density in fact). In this way, the devices can be measured repetitively without obvious damage or short-circuit.

Two possible approaches are proposed here to avoid such anode damage. First, indium tin oxide (ITO) may be used to replace the gold as anode material, with its highest oxidation state which cannot be oxidized further [6, 7]. Second, an ultrathin layer of energy-band offset material [8, 9] may be coated onto the gold anode, with thickness small enough to be conductive to gold while preventing gold contacting water directly.

Bubble Effects

FIG. 50A-FIG. 50B shows plateaus (or peaks) around 2 V in I-V curves, both in pure water measurements and sodium hydroxide solution measurements. We believe that it was due to bubble effects. Around 2 V, bubble generation started to be vigorous enough so that it could be observed by the naked eye. Moreover, devices with smaller gap distance or smaller grating pitches had more obvious plateaus around 2 V, indicating that such plateaus were determined by the geometry of the structures, rather than electrode electrochemical reactions. This observation is reasonable since bubbles are more likely to be trapped within the smaller gap or smaller pitch structures before releasing, excluding the water involved in the reaction. Therefore, larger voltage leads to larger excluding effect, reducing the current and showing negative resistance which performs like a plateau or peak in I-V curves.

Notice that FIG. 50A also shows the result consistency among several tests. The data from different devices were almost exactly the same, especially below 2 V. Above 2 V, the data had a relatively larger error range which we think was due to the bubble effects on current performance. Therefore, we always selected the data below 2V for analysis and comparison to be free from bubble related artifacts.

Sodium Hydroxide Solution: Reactions in the Entire Surface

Reactions in pure water only occur at the edge boundary of each grating line in our sandwiched-like nanogap cells. Different from pure water, the entire surface is involved into the reactions in sodium hydroxide solutions. Two types of evidence are shown in FIG. 51A-FIG. 51B. First, larger droplet of sodium hydroxide solution provided larger current, indicating more surface area involved into the reactions, though the total number of the edges was independent of the droplet size. Second, bubbles could be even generated far away from the counter-electrode (i.e., non-grating region), indicating that the reactions can occur even very far from the grating edges. That is to say, the reactions in sodium hydroxide solutions occur not only at the grating edges, but also over the entire region covered by the droplet.

Plateaus in Log I Vs. V Curves

FIG. 52A-FIG. 52B shows the log I vs. V curves from tests of pure water and sodium hydroxide solution on the same device, respectively. For pure water, one plateau appeared around 0.9 V (also shown in FIG. 43B), which became flatter after the first test on the same device. For sodium hydroxide solution, two plateaus, around 0.4 V and 1.2 V respectively, were shown on the log I vs. V curves. After the first test, the 0.4 V plateau still existed but the 1.2 V plateau disappeared, and the current became much larger (the 2V plateau can be ignored since it was due to the bubble effects). This plateau phenomenon is quite repeatable, no matter what the gap distance or pitch is, indicating that it is more likely related to the intrinsic electrochemical reactions, rather than geometry factors. However, the fundamental mechanism is still not clear.

Only a few literature reviews discussed about such plateaus in log I vs. V curves. Without being bound by theory, our hypothesis is the following. The 0.9 V plateau from pure water tests may be attributed to dissolved oxygen reduction or anode gold oxidation (and these two effects might be coupled). For sodium hydroxide solution, the 0.4 V plateau most likely came from the reduction of dissolved oxygen; while the 1.2 V plateau was related to anode gold oxidation. The different values of the oxidation plateaus in pure water and in sodium hydroxide solution was most likely due to the difference in pH values. The 0.4 V plateau would not disappear since for every test fresh sodium hydroxide solution (without inert gas saturation) was used. For the gold anode, non-conductive oxide state I and conductive oxide state II can form during water splitting [10]. During the first test in sodium hydroxide solution, OH$^-$ ions concentration was so large that all surface gold could be oxidized to state II, therefore during the second or third tests no surface gold could be oxidized further (thus the 1.2 V plateau disappeared). Also, because oxide state II was porous and conductive, the distance between anode and cathode had been shortened due to gold oxide islands, and the current after the first test could become larger (the larger current could be also attributed to roughness of the surface so that effective reaction area became larger [4]). However, for pure water, OH$^-$ ions concentration was small so that only oxide state I might form, therefore gold could still be oxidized further into the formation of state I during the second or even third tests (until two or three monolayers of the oxide state I coverage reached [3, 11]), with almost the same electrolysis current or smaller since oxide state I was non-conductive. However, such plateaus may also result from the formation of oxygen coverage [12], inhibition layer [13] or inert sites [14].

Detailed experiments are necessary to get a clearer fundamental understanding of the mechanism underlying such plateaus. First, inert gas saturated pure water and sodium hydroxide solution should be utilized; second, anode current and cathode current should be studied separately; third, crystal plane of original gold and final anode oxidation should be further analyzed by spectroscopy measurement. However, since this problem is beyond the scope of our present study, we have not included such experiments in this paper.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

REFERENCES

References for Example 3a (Part 1)

1. Holladay, J. D., Hu, J., King, D. L. & Wang, Y. An overview of hydrogen production technologies. *Catalysis Today* 139, 244-260 (2009).
2. Zoulias, E., Varkaraki, E., Lymberopoulos, N., Christodoulou, C. N. & Karagiorgis, G. N. A review on water electrolysis. *TCJST* 4, 41-71 (2004).
3. de Souza, R. F., Padilha, J. C., Gonçalves, R. S., de Souza, M. O. & Rault-Berthelot, J. Electrochemical hydrogen production from water electrolysis using ionic liquid as electrolytes: Towards the best device. *Journal of Power Sources* 164, 792-798 (2007).
4. Ursua, A., Gandia, L. M. & Sanchis, P. Hydrogen Production From Water Electrolysis: Current Status and Future Trends. *Proceedings of the IEEE* 100, 410-426 (2012).
5. Leroy, R. Industrial water electrolysis: Present and future. *International Journal of Hydrogen Energy* 8, 401-417 (1983).
6. Fujishima, A. & Honda, K. Electrochemical Photolysis of Water at a Semiconductor Electrode. *Nature* 238, 37-38 (1972).
7. Liu, C., Tang, J., Chen, H. M., Liu, B. & Yang, P. A Fully Integrated Nanosystem of Semiconductor Nanowires for Direct Solar Water Splitting. *Nano Letters* 13, 2989-2992 (2013).
8. Luo, J. et al. Water photolysis at 12.3% efficiency via perovskite photovoltaics and Earth-abundant catalysts. *Science* 345, 1593-1596 (2014).
9. de Levie, R. The electrolysis of water. *Journal of Electroanalytical Chemistry* 476, 92-93 (1999).
10. Santos, D. M. F., Sequeira, C. A. C. & Figueiredo, J. L. Hydrogen production by alkaline water electrolysis. *Quimica Nova* 36, 1176-1193 (2013).
11. Gong, M. et al. Nanoscale nickel oxide/nickel heterostructures for active hydrogen evolution electrocatalysis. *Nature Communications* 5, 4695 (2014).

12. Wang, H. et al. Bifunctional non-noble metal oxide nanoparticle electrocatalysts through lithium-induced conversion for overall water splitting. *Nature Communications* 6, 7261 (2015).
13. Cobo, S. et al. A Janus cobalt-based catalytic material for electro-splitting of water. *Nature Materials* 11, 802-807 (2012).
14. Doenitz, W., Schmidberger, R., Steinheil, E. & Streicher, R. Hydrogen production by high temperature electrolysis of water vapour. *International Journal of Hydrogen Energy* 5, 55-63 (1980).
15. LeRoy, R. L. The Thermodynamics of Aqueous Water Electrolysis. *Journal of The Electrochemical Society* 127, 1954 (1980).
16. Carmo, M., Fritz, D. L., Mergel, J. & Stolten, D. A comprehensive review on PEM water electrolysis. *International Journal of Hydrogen Energy* 38, 4901-4934 (2013).
17. Rashid, M., Al Mesfer, M. K., Naseem, H. & Danish, M. Hydrogen production by water electrolysis: a review of alkaline water electrolysis, PEM water electrolysis and high temperature water electrolysis. *International Journal of Engineering and Advanced Technology* 4, 2249-8958 (2015).
18. Ma, C., Contento, N. M. & Bohn, P. W. Redox Cycling on Recessed Ring-Disk Nanoelectrode Arrays in the Absence of Supporting Electrolyte. *Journal of the American Chemical Society* 136, 7225-7228 (2014).
19. Chen, Q., McKelvey, K., Edwards, M. A. & White, H. S. Redox Cycling in Nanogap Electrochemical Cells. The Role of Electrostatics in Determining the Cell Response. *The Journal of Physical Chemistry C* 120, 17251-17260 (2016).
20. Xiong, J., Chen, Q., Edwards, M. A. & White, H. S. Ion Transport within High Electric Fields in Nanogap Electrochemical Cells. *ACS Nano* 9, 8520-8529 (2015).
21. Timmer, B., Sluyters-Rehbach, M. & Sluyters, J. H. Electrode kinetics and double layer structure. *Surface Science* 18, 44-61 (1969).
22. Bard, A. J. & Faulkner, L. R. *Electrochemical methods: fundamentals and applications*. (Wiley, 2001).
23. Stuve, E. M. Ionization of water in interfacial electric fields: An electrochemical view. *Chemical Physics Letters* 519-520, 1-17 (2012).
24. Li, T., Hu, W. & Zhu, D. Nanogap Electrodes. *Advanced Materials* 22, 286-300 (2010).
25. Rassaei, L., Singh, P. S. & Lemay, S. G. Lithography-Based Nanoelectrochemistry. *Analytical Chemistry* 83, 3974-3980 (2011).
26. Chen, F., Qing, Q., Ren, L., Wu, Z. & Liu, Z. Electrochemical approach for fabricating nanogap electrodes with well controllable separation. *Applied Physics Letters* 86, 123105 (2005).
27. Liu, S., Tok, J. B.-H. & Bao, Z. Nanowire Lithography: Fabricating Controllable Electrode Gaps Using Au—Ag—Au Nanowires. *Nano Letters* 5, 1071-1076 (2005).
28. Zhao, Q. et al. Nanoscale Electrodes for Flexible Electronics by Swelling Controlled Cracking. *Advanced Materials* 28, 6337-6344 (2016).
29. Beesley, D. J. et al. Sub-15-nm patterning of asymmetric metal electrodes and devices by adhesion lithography. *Nature Communications* 5, (2014).
30. Wolfrum, B., Zevenbergen, M. & Lemay, S. Nanofluidic Redox Cycling Amplification for the Selective Detection of Catechol. *Analytical Chemistry* 80, 972-977 (2008).
31. Kätelhön, E. et al. Nanocavity Redox Cycling Sensors for the Detection of Dopamine Fluctuations in Microfluidic Gradients. *Analytical Chemistry* 82, 8502-8509 (2010).
32. Zevenbergen, M. A. G., Wolfrum, B. L., Goluch, E. D., Singh, P. S. & Lemay, S. G. Fast Electron-Transfer Kinetics Probed in Nanofluidic Channels. *Journal of the American Chemical Society* 131, 11471-11477 (2009).
33. Ma, C., Xu, W., Wichert, W. R. A. & Bohn, P. W. Ion Accumulation and Migration Effects on Redox Cycling in Nanopore Electrode Arrays at Low Ionic Strength. *ACS Nano* 10, 3658-3664 (2016).
34. Fu, K., Han, D., Ma, C. & Bohn, P. W. Electrochemistry at single molecule occupancy in nanopore-confined recessed ring-disk electrode arrays. *Faraday Discuss.* (2016). doi:10.1039/C6FD00062B
35. Laegreid, N. & Wehner, G. K. Sputtering Yields of Metals for Ar+ and Ne+ Ions with Energies from 50 to 600 ev. *Journal of Applied Physics* 32, 365 (1961).
36. Wang, Y., Liu, H., Li, Y. & Wu, W. Low DC-bias silicon nitride anisotropic etching. *Journal of Vacuum Science & Technology B, Nanotechnology and Microelectronics: Materials, Processing, Measurement, and Phenomena* 33, 06FA01 (2015).
37. Takeno, N. Atlas of Eh-pH diagrams. *Geological survey of Japan open file report* 419, 102 (2005).
38. Diaz-Morales, O., Calle-Vallejo, F., de Munck, C. & Koper, M. T. M. Electrochemical water splitting by gold: evidence for an oxide decomposition mechanism. *Chemical Science* 4, 2334 (2013).
39. Pashley, R. M., Rzechowicz, M., Pashley, L. R. & Francis, M. J. De-Gassed Water Is a Better Cleaning Agent. *The Journal of Physical Chemistry B* 109, 1231-1238 (2005).
40. Oesch, U. & Janata, J. Electrochemical study of gold electrodes with anodic oxide films—I. Formation and reduction behaviour of anodic oxides on gold. *Electrochimica Acta* 28, 1237-1246 (1983).
41. Rossmeisl, J., Logadottir, A. & Nørskov, J. K. Electrolysis of water on (oxidized) metal surfaces. *Chemical Physics* 319, 178-184 (2005).
42. Kikuchi, K., Nagata, S., Tanaka, Y., Saihara, Y. & Ogumi, Z. Characteristics of hydrogen nanobubbles in solutions obtained with water electrolysis. *Journal of Electroanalytical Chemistry* 600, 303-310 (2007).
43. Kikuchi, K. et al. Concentration of hydrogen nanobubbles in electrolyzed water. *Journal of Colloid and Interface Science* 298, 914-919 (2006).

References for Example 3a (Part 2)

1. Joshi, R. P., Qian, J., Schoenbach, K. H. & Schamiloglu, E. Microscopic analysis for water stressed by high electric fields in the prebreakdown regime. *Journal of Applied Physics* 96, 3617 (2004).
2. Wang, Y., Liu, H., Li, Y. & Wu, W. Low DC-bias silicon nitride anisotropic etching. *Journal of Vacuum Science & Technology B, Nanotechnology and Microelectronics: Materials, Processing, Measurement, and Phenomena* 33, 06FA01 (2015).
3. Diaz-Morales, O., Calle-Vallejo, F., de Munck, C. & Koper, M. T. M. Electrochemical water splitting by gold: evidence for an oxide decomposition mechanism. *Chemical Science* 4, 2334 (2013).
4. Gao, P., Gosztola, D., Leung, L.-W. H. & Weaver, M. J. Surface-enhanced Raman scattering at gold electrodes: dependence on electrochemical pretreatment conditions and comparisons with silver. *Journal of Electroanalytical Chemistry and Interfacial Electrochemistry* 233, 211-222 (1987).
5. Yeo, B. S., Klaus, S. L., Ross, P. N., Mathies, R. A. & Bell, A. T. Identification of Hydroperoxy Species as Reaction Intermediates in the Electrochemical Evolution of Oxygen on Gold. *Chem Phys Chem* n/a-n/a (2010). doi: 10.1002/cphc.201000294
6. Wang Hao, Zhong Cheng, Li Jin & Jiang Yiming. Electrochemical corrosion behaviors of ITO films at anodic and cathodic polarization in sodium hydroxide solution. in 1-4 (IEEE, 2008). doi:10.1109/ICEPT.2008.4607097
7. Matsumoto, Y. & Sato, E. Electrocatalytic properties of transition metal oxides for oxygen evolution reaction. *Materials Chemistry and Physics* 14, 397-426 (1986).
8. Chen, Y. W. et al. Atomic layer-deposited tunnel oxide stabilizes silicon photoanodes for water oxidation. *Nature Materials* 10, 539-544 (2011).
9. Bao, J. Photoelectrochemical water splitting: A new use for bandgap engineering. *Nature Nanotechnology* 10, 19-20 (2015).
10. Lohrengel, M. M. & Schultze, J. W. Electrochemical properties of anodic gold oxide layers—I. *Electrochimica Acta* 21, 957-965 (1976).
11. Oesch, U. & Janata, J. Electrochemical study of gold electrodes with anodic oxide films—I. Formation and reduction behaviour of anodic oxides on gold. *Electrochimica Acta* 28, 1237-1246 (1983).
12. Rossmeisl, J., Logadottir, A. & Nørskov, J. K. Electrolysis of water on (oxidized) metal surfaces. *Chemical Physics* 319, 178-184 (2005).
13. Conway, B. E., Sattar, M. A. & Gilroy, D. Electrochemistry of the nickel-oxide electrode—V. Self-passivation effects in oxygen-evolution kinetics. *Electrochimica Acta* 14, 677-694 (1969).
14. Lu, P. W. T. Electrochemical-Ellipsometric Studies of Oxide Film Formed on Nickel during Oxygen Evolution. *Journal of The Electrochemical Society* 125, 1416 (1978).

References for Example 3b (Part 1)

1. Holladay, J. D., Hu, J., King, D. L. & Wang, Y. An overview of hydrogen production technologies. *Catalysis Today* 139, 244-260 (2009).
2. Zoulias, E., Varkaraki, E., Lymberopoulos, N., Christodoulou, C. N. & Karagiorgis, G. N. A review on water electrolysis. *TCJST* 4, 41-71 (2004).
3. de Souza, R. F., Padilha, J. C., Gonçalves, R. S., de Souza, M. O. & Rault-Berthelot, J. Electrochemical hydrogen production from water electrolysis using ionic liquid as electrolytes: Towards the best device. *Journal of Power Sources* 164, 792-798 (2007).
4. Ursua, A., Gandia, L. M. & Sanchis, P. Hydrogen Production From Water Electrolysis: Current Status and Future Trends. *Proceedings of the IEEE* 100, 410-426 (2012).
5. Leroy, R. Industrial water electrolysis: Present and future. *International Journal of Hydrogen Energy* 8, 401-417 (1983).
6. Fujishima, A. & Honda, K. Electrochemical Photolysis of Water at a Semiconductor Electrode. *Nature* 238, 37-38 (1972).
7. Liu, C., Tang, J., Chen, H. M., Liu, B. & Yang, P. A Fully Integrated Nanosystem of Semiconductor Nanowires for Direct Solar Water Splitting. *Nano Letters* 13, 2989-2992 (2013).
8. Luo, J. et al. Water photolysis at 12.3% efficiency via perovskite photovoltaics and Earth-abundant catalysts. *Science* 345, 1593-1596 (2014).
9. de Levie, R. The electrolysis of water. *Journal of Electroanalytical Chemistry* 476, 92-93 (1999).
10. Santos, D. M. F., Sequeira, C. A. C. & Figueiredo, J. L. Hydrogen production by alkaline water electrolysis. *Quimica Nova* 36, 1176-1193 (2013).
11. Gong, M. et al. Nanoscale nickel oxide/nickel heterostructures for active hydrogen evolution electrocatalysis. *Nature Communications* 5, 4695 (2014).
12. Wang, H. et al. Bifunctional non-noble metal oxide nanoparticle electrocatalysts through lithium-induced conversion for overall water splitting. *Nature Communications* 6, 7261 (2015).
13. Cobo, S. et al. A Janus cobalt-based catalytic material for electro-splitting of water. *Nature Materials* 11, 802-807 (2012).
14. Doenitz, W., Schmidberger, R., Steinheil, E. & Streicher, R. Hydrogen production by high temperature electrolysis of water vapour. *International Journal of Hydrogen Energy* 5, 55-63 (1980).
15. LeRoy, R. L. The Thermodynamics of Aqueous Water Electrolysis. *Journal of The Electrochemical Society* 127, 1954 (1980).
16. Carmo, M., Fritz, D. L., Mergel, J. & Stolten, D. A comprehensive review on PEM water electrolysis. *International Journal of Hydrogen Energy* 38, 4901-4934 (2013).
17. Rashid, M., Al Mesfer, M. K., Naseem, H. & Danish, M. Hydrogen production by water electrolysis: a review of alkaline water electrolysis, PEM water electrolysis and high temperature water electrolysis. *International Journal of Engineering and Advanced Technology* 4, 2249-8958 (2015).
18. Ma, C., Contento, N. M. & Bohn, P. W. Redox Cycling on Recessed Ring-Disk Nanoelectrode Arrays in the Absence of Supporting Electrolyte. *Journal of the American Chemical Society* 136, 7225-7228 (2014).
19. Chen, Q., McKelvey, K., Edwards, M. A. & White, H. S. Redox Cycling in Nanogap Electrochemical Cells. The Role of Electrostatics in Determining the Cell Response. *The Journal of Physical Chemistry C* 120, 17251-17260 (2016).
20. Xiong, J., Chen, Q., Edwards, M. A. & White, H. S. Ion Transport within High Electric Fields in Nanogap Electrochemical Cells. *ACS Nano* 9, 8520-8529 (2015).
21. Timmer, B., Sluyters-Rehbach, M. & Sluyters, J. H. Electrode kinetics and double layer structure. *Surface Science* 18, 44-61 (1969).
22. Bard, A. J. & Faulkner, L. R. *Electrochemical methods: fundamentals and applications*. (Wiley, 2001).
23. Stuve, E. M. Ionization of water in interfacial electric fields: An electrochemical view. *Chemical Physics Letters* 519-520, 1-17 (2012).
24. Li, T., Hu, W. & Zhu, D. Nanogap Electrodes. *Advanced Materials* 22, 286-300 (2010).
25. Rassaei, L., Singh, P. S. & Lemay, S. G. Lithography-Based Nanoelectrochemistry. *Analytical Chemistry* 83, 3974-3980 (2011).
26. Chen, F., Qing, Q., Ren, L., Wu, Z. & Liu, Z. Electrochemical approach for fabricating nanogap electrodes with well controllable separation. *Applied Physics Letters* 86, 123105 (2005).

27. Liu, S., Tok, J. B.-H. & Bao, Z. Nanowire Lithography: Fabricating Controllable Electrode Gaps Using Au—Ag—Au Nanowires. *Nano Letters* 5, 1071-1076 (2005).
28. Zhao, Q. et al. Nanoscale Electrodes for Flexible Electronics by Swelling Controlled Cracking. *Advanced Materials* 28, 6337-6344 (2016).
29. Beesley, D. J. et al. Sub-15-nm patterning of asymmetric metal electrodes and devices by adhesion lithography. *Nature Communications* 5, (2014).
30. Wolfrum, B., Zevenbergen, M. & Lemay, S. Nanofluidic Redox Cycling Amplification for the Selective Detection of Catechol. *Analytical Chemistry* 80, 972-977 (2008).
31. Kätelhön, E. et al. Nanocavity Redox Cycling Sensors for the Detection of Dopamine Fluctuations in Microfluidic Gradients. *Analytical Chemistry* 82, 8502-8509 (2010).
32. Zevenbergen, M. A. G., Wolfrum, B. L., Goluch, E. D., Singh, P. S. & Lemay, S. G. Fast Electron-Transfer Kinetics Probed in Nanofluidic Channels. *Journal of the American Chemical Society* 131, 11471-11477 (2009).
33. Ma, C., Xu, W., Wichert, W. R. A. & Bohn, P. W. Ion Accumulation and Migration Effects on Redox Cycling in Nanopore Electrode Arrays at Low Ionic Strength. *ACS Nano* 10, 3658-3664 (2016).
34. Fu, K., Han, D., Ma, C. & Bohn, P. W. Electrochemistry at single molecule occupancy in nanopore-confined recessed ring-disk electrode arrays. *Faraday Discuss.* (2016). doi:10.1039/C6FD00062B
35. Laegreid, N. & Wehner, G. K. Sputtering Yields of Metals for Ar+ and Ne+ Ions with Energies from 50 to 600 ev. *Journal of Applied Physics* 32, 365 (1961).
36. Wang, Y., Liu, H., Li, Y. & Wu, W. Low DC-bias silicon nitride anisotropic etching. *Journal of Vacuum Science & Technology B, Nanotechnology and Microelectronics: Materials, Processing, Measurement, and Phenomena* 33, 06FA01 (2015).
37. Takeno, N. Atlas of Eh-pH diagrams. *Geological survey of Japan open file report* 419, 102 (2005).
38. Diaz-Morales, O., Calle-Vallejo, F., de Munck, C. & Koper, M. T. M. Electrochemical water splitting by gold: evidence for an oxide decomposition mechanism. *Chemical Science* 4, 2334 (2013).
39. Pashley, R. M., Rzechowicz, M., Pashley, L. R. & Francis, M. J. De-Gassed Water Is a Better Cleaning Agent. *The Journal of Physical Chemistry B* 109, 1231-1238 (2005).
40. Oesch, U. & Janata, J. Electrochemical study of gold electrodes with anodic oxide films—I. Formation and reduction behaviour of anodic oxides on gold. *Electrochimica Acta* 28, 1237-1246 (1983).
41. Rossmeisl, J., Logadottir, A. & Nørskov, J. K. Electrolysis of water on (oxidized) metal surfaces. *Chemical Physics* 319, 178-184 (2005).
42. Kikuchi, K., Nagata, S., Tanaka, Y., Saihara, Y. & Ogumi, Z. Characteristics of hydrogen nanobubbles in solutions obtained with water electrolysis. *Journal of Electroanalytical Chemistry* 600, 303-310 (2007).
43. Kikuchi, K. et al. Concentration of hydrogen nanobubbles in electrolyzed water. *Journal of Colloid and Interface Science* 298, 914-919 (2006).

References for Example 3b (Part 2)

1. Joshi, R. P., Qian, J., Schoenbach, K. H. & Schamiloglu, E. Microscopic analysis for water stressed by high electric fields in the prebreakdown regime. *Journal of Applied Physics* 96, 3617 (2004).
2. Wang, Y., Liu, H., Li, Y. & Wu, W. Low DC-bias silicon nitride anisotropic etching. *Journal of Vacuum Science & Technology B, Nanotechnology and Microelectronics: Materials, Processing, Measurement, and Phenomena* 33, 06FA01 (2015).
3. Diaz-Morales, O., Calle-Vallejo, F., de Munck, C. & Koper, M. T. M. Electrochemical water splitting by gold: evidence for an oxide decomposition mechanism. *Chemical Science* 4, 2334 (2013).
4. Gao, P., Gosztola, D., Leung, L.-W. H. & Weaver, M. J. Surface-enhanced Raman scattering at gold electrodes: dependence on electrochemical pretreatment conditions and comparisons with silver. *Journal of Electroanalytical Chemistry and Interfacial Electrochemistry* 233, 211-222 (1987).
5. Yeo, B. S., Klaus, S. L., Ross, P. N., Mathies, R. A. & Bell, A. T. Identification of Hydroperoxy Species as Reaction Intermediates in the Electrochemical Evolution of Oxygen on Gold. *Chem Phys Chem* n/a-n/a (2010). doi: 10.1002/cphc.201000294
6. Wang Hao, Zhong Cheng, Li Jin & Jiang Yiming. Electrochemical corrosion behaviors of ITO films at anodic and cathodic polarization in sodium hydroxide solution. in 1-4 (IEEE, 2008). doi:10.1109/ICEPT.2008.4607097
7. Matsumoto, Y. & Sato, E. Electrocatalytic properties of transition metal oxides for oxygen evolution reaction. *Materials Chemistry and Physics* 14, 397-426 (1986).
8. Chen, Y. W. et al. Atomic layer-deposited tunnel oxide stabilizes silicon photoanodes for water oxidation. *Nature Materials* 10, 539-544 (2011).
9. Bao, J. Photoelectrochemical water splitting: A new use for bandgap engineering. *Nature Nanotechnology* 10, 19-20 (2015).
10. Lohrengel, M. M. & Schultze, J. W. Electrochemical properties of anodic gold oxide layers—I. *Electrochimica Acta* 21, 957-965 (1976).
11. Oesch, U. & Janata, J. Electrochemical study of gold electrodes with anodic oxide films—I. Formation and reduction behaviour of anodic oxides on gold. *Electrochimica Acta* 28, 1237-1246 (1983).
12. Rossmeisl, J., Logadottir, A. & Nørskov, J. K. Electrolysis of water on (oxidized) metal surfaces. *Chemical Physics* 319, 178-184 (2005).
13. Conway, B. E., Sattar, M. A. & Gilroy, D. Electrochemistry of the nickel-oxide electrode—V. Self-passivation effects in oxygen-evolution kinetics. *Electrochimica Acta* 14, 677-694 (1969).
14. Lu, P. W. T. Electrochemical-Ellipsometric Studies of Oxide Film Formed on Nickel during Oxygen Evolution. *Journal of The Electrochemical Society* 125, 1416 (1978).

References for Example 3c (Part 1)

1. Holladay, J. D., Hu, J., King, D. L. & Wang, Y. An overview of hydrogen production technologies. *Catalysis Today* 139, 244-260 (2009).
2. Fujishima, A. & Honda, K. Electrochemical Photolysis of Water at a Semiconductor Electrode. *Nature* 238, 37-38 (1972).
3. Liu, C., Tang, J., Chen, H. M., Liu, B. & Yang, P. A Fully Integrated Nanosystem of Semiconductor Nanowires for Direct Solar Water Splitting. *Nano Letters* 13, 2989-2992 (2013).
4. Luo, J. et al. Water photolysis at 12.3% efficiency via perovskite photovoltaics and Earth-abundant catalysts. *Science* 345, 1593-1596 (2014).

5. de Levie, R. The electrolysis of water. *Journal of Electroanalytical Chemistry* 476, 92-93 (1999).
6. Zoulias, E., Varkaraki, E., Lymberopoulos, N., Christodoulou, C. N. & Karagiorgis, G. N. A review on water electrolysis. *TCJST* 4, 41-71 (2004).
7. Santos, D. M. F., Sequeira, C. A. C. & Figueiredo, J. L. Hydrogen production by alkaline water electrolysis. *Quimica Nova* 36, 1176-1193 (2013).
8. de Souza, R. F., Padilha, J. C., Gonçalves, R. S., de Souza, M. O. & Rault-Berthelot, J. Electrochemical hydrogen production from water electrolysis using ionic liquid as electrolytes: Towards the best device. *Journal of Power Sources* 164, 792-798 (2007).
9. Ursua, A., Gandia, L. M. & Sanchis, P. Hydrogen Production From Water Electrolysis: Current Status and Future Trends. *Proceedings of the IEEE* 100, 410-426 (2012).
10. Gong, M. et al. Nanoscale nickel oxide/nickel heterostructures for active hydrogen evolution electrocatalysis. *Nature Communications* 5, 4695 (2014).
11. Wang, H. et al. Bifunctional non-noble metal oxide nanoparticle electrocatalysts through lithium-induced conversion for overall water splitting. *Nature Communications* 6, 7261 (2015).
12. Cobo, S. et al. A Janus cobalt-based catalytic material for electro-splitting of water. *Nature Materials* 11, 802-807 (2012).
13. Leroy, R. Industrial water electrolysis: Present and future. *International Journal of Hydrogen Energy* 8, 401-417 (1983).
14. Doenitz, W., Schmidberger, R., Steinheil, E. & Streicher, R. Hydrogen production by high temperature electrolysis of water vapour. *International Journal of Hydrogen Energy* 5, 55-63 (1980).
15. LeRoy, R. L. The Thermodynamics of Aqueous Water Electrolysis. *Journal of The Electrochemical Society* 127, 1954 (1980).
16. Carmo, M., Fritz, D. L., Mergel, J. & Stolten, D. A comprehensive review on PEM water electrolysis. *International Journal of Hydrogen Energy* 38, 4901-4934 (2013).
17. Rashid, M., Al Mesfer, M. K., Naseem, H. & Danish, M. Hydrogen production by water electrolysis: a review of alkaline water electrolysis, PEM water electrolysis and high temperature water electrolysis. *International Journal of Engineering and Advanced Technology* 4, 2249-8958 (2015).
18. Ma, C., Contento, N. M. & Bohn, P. W. Redox Cycling on Recessed Ring-Disk Nanoelectrode Arrays in the Absence of Supporting Electrolyte. *Journal of the American Chemical Society* 136, 7225-7228 (2014).
19. Chen, Q., McKelvey, K., Edwards, M. A. & White, H. S. Redox Cycling in Nanogap Electrochemical Cells. The Role of Electrostatics in Determining the Cell Response. *The Journal of Physical Chemistry C* 120, 17251-17260 (2016).
20. Li, T., Hu, W. & Zhu, D. Nanogap Electrodes. *Advanced Materials* 22, 286-300 (2010).
21. Rassaei, L., Singh, P. S. & Lemay, S. G. Lithography-Based Nanoelectrochemistry. *Analytical Chemistry* 83, 3974-3980 (2011).
22. Chen, F., Qing, Q., Ren, L., Wu, Z. & Liu, Z. Electrochemical approach for fabricating nanogap electrodes with well controllable separation. *Applied Physics Letters* 86, 123105 (2005).
23. Liu, S., Tok, J. B.-H. & Bao, Z. Nanowire Lithography: Fabricating Controllable Electrode Gaps Using Au—Ag—Au Nanowires. *Nano Letters* 5, 1071-1076 (2005).
24. Zhao, Q. et al. Nanoscale Electrodes for Flexible Electronics by Swelling Controlled Cracking. *Advanced Materials* 28, 6337-6344 (2016).
25. Beesley, D. J. et al. Sub-15-nm patterning of asymmetric metal electrodes and devices by adhesion lithography. *Nature Communications* 5, (2014).
26. Wolfrum, B., Zevenbergen, M. & Lemay, S. Nanofluidic Redox Cycling Amplification for the Selective Detection of Catechol. *Analytical Chemistry* 80, 972-977 (2008).
27. Kätelhön, E. et al. Nanocavity Redox Cycling Sensors for the Detection of Dopamine Fluctuations in Microfluidic Gradients. *Analytical Chemistry* 82, 8502-8509 (2010).
28. Zevenbergen, M. A. G., Wolfrum, B. L., Goluch, E. D., Singh, P. S. & Lemay, S. G. Fast Electron-Transfer Kinetics Probed in Nanofluidic Channels. *Journal of the American Chemical Society* 131, 11471-11477 (2009).
29. Xiong, J., Chen, Q., Edwards, M. A. & White, H. S. Ion Transport within High Electric Fields in Nanogap Electrochemical Cells. *ACS Nano* 9, 8520-8529 (2015).
30. Ma, C., Xu, W., Wichert, W. R. A. & Bohn, P. W. Ion Accumulation and Migration Effects on Redox Cycling in Nanopore Electrode Arrays at Low Ionic Strength. *ACS Nano* 10, 3658-3664 (2016).
31. Fu, K., Han, D., Ma, C. & Bohn, P. W. Electrochemistry at single molecule occupancy in nanopore-confined recessed ring-disk electrode arrays. *Faraday Discuss.* (2016). doi:10.1039/C6FD00062B
32. Laegreid, N. & Wehner, G. K. Sputtering Yields of Metals for Ar+ and Ne+ Ions with Energies from 50 to 600 ev. *Journal of Applied Physics* 32, 365 (1961).
33. Wang, Y., Liu, H., Li, Y. & Wu, W. Low DC-bias silicon nitride anisotropic etching. *Journal of Vacuum Science & Technology B, Nanotechnology and Microelectronics: Materials, Processing, Measurement, and Phenomena* 33, 06FA01 (2015).
34. Takeno, N. Atlas of Eh-pH diagrams. *Geological survey of Japan open file report* 419, 102 (2005).
35. Diaz-Morales, O., Calle-Vallejo, F., de Munck, C. & Koper, M. T. M. Electrochemical water splitting by gold: evidence for an oxide decomposition mechanism. *Chemical Science* 4, 2334 (2013).
36. Pashley, R. M., Rzechowicz, M., Pashley, L. R. & Francis, M. J. De-Gassed Water Is a Better Cleaning Agent. *The Journal of Physical Chemistry B* 109, 1231-1238 (2005).
37. Oesch, U. & Janata, J. Electrochemical study of gold electrodes with anodic oxide films—I. Formation and reduction behaviour of anodic oxides on gold. *Electrochimica Acta* 28, 1237-1246 (1983).
38. Rossmeisl, J., Logadottir, A. & Nørskov, J. K. Electrolysis of water on (oxidized) metal surfaces. *Chemical Physics* 319, 178-184 (2005).
39. Timmer, B., Sluyters-Rehbach, M. & Sluyters, J. H. Electrode kinetics and double layer structure. *Surface Science* 18, 44-61 (1969).
40. Bard, A. J. & Faulkner, L. R. *Electrochemical methods: fundamentals and applications*. (Wiley, 2001).
41. Stuve, E. M. Ionization of water in interfacial electric fields: An electrochemical view. *Chemical Physics Letters* 519-520, 1-17 (2012).
42. Kikuchi, K., Nagata, S., Tanaka, Y., Saihara, Y. & Ogumi, Z. Characteristics of hydrogen nanobubbles in solutions obtained with water electrolysis. *Journal of Electroanalytical Chemistry* 600, 303-310 (2007).
43. Kikuchi, K. et al. Concentration of hydrogen nanobubbles in electrolyzed water. *Journal of Colloid and Interface Science* 298, 914-919 (2006).

References for Example 3c (Part 2)

1. Joshi, R. P., Qian, J., Schoenbach, K. H. & Schamiloglu, E. Microscopic analysis for water stressed by high electric fields in the prebreakdown regime. *Journal of Applied Physics* 96, 3617 (2004).
2. Wang, Y., Liu, H., Li, Y. & Wu, W. Low DC-bias silicon nitride anisotropic etching. *Journal of Vacuum Science & Technology B, Nanotechnology and Microelectronics: Materials, Processing, Measurement, and Phenomena* 33, 06FA01 (2015).
3. Diaz-Morales, O., Calle-Vallejo, F., de Munck, C. & Koper, M. T. M. Electrochemical water splitting by gold: evidence for an oxide decomposition mechanism. *Chemical Science* 4, 2334 (2013).
4. Gao, P., Gosztola, D., Leung, L.-W. H. & Weaver, M. J. Surface-enhanced Raman scattering at gold electrodes: dependence on electrochemical pretreatment conditions and comparisons with silver. *Journal of Electroanalytical Chemistry and Interfacial Electrochemistry* 233, 211-222 (1987).
5. Yeo, B. S., Klaus, S. L., Ross, P. N., Mathies, R. A. & Bell, A. T. Identification of Hydroperoxy Species as Reaction Intermediates in the Electrochemical Evolution of Oxygen on Gold. *Chem Phys Chem* n/a-n/a (2010). doi:10.1002/cphc.201000294
6. Wang Hao, Zhong Cheng, Li Jin & Jiang Yiming. Electrochemical corrosion behaviors of ITO films at anodic and cathodic polarization in sodium hydroxide solution. in 1-4 (IEEE, 2008). doi:10.1109/ICEPT.2008.4607097
7. Matsumoto, Y. & Sato, E. Electrocatalytic properties of transition metal oxides for oxygen evolution reaction. *Materials Chemistry and Physics* 14, 397-426 (1986).
8. Chen, Y. W. et al. Atomic layer-deposited tunnel oxide stabilizes silicon photoanodes for water oxidation. *Nature Materials* 10, 539-544 (2011).
9. Bao, J. Photoelectrochemical water splitting: A new use for bandgap engineering. *Nature Nanotechnology* 10, 19-20 (2015).
10. Lohrengel, M. M. & Schultze, J. W. Electrochemical properties of anodic gold oxide layers—I. *Electrochimica Acta* 21, 957-965 (1976).
11. Oesch, U. & Janata, J. Electrochemical study of gold electrodes with anodic oxide films—I. Formation and reduction behaviour of anodic oxides on gold. *Electrochimica Acta* 28, 1237-1246 (1983).
12. Rossmeisl, J., Logadottir, A. & Nørskov, J. K. Electrolysis of water on (oxidized) metal surfaces. *Chemical Physics* 319, 178-184 (2005).
13. Conway, B. E., Sattar, M. A. & Gilroy, D. Electrochemistry of the nickel-oxide electrode—V. Self-passivation effects in oxygen-evolution kinetics. *Electrochimica Acta* 14, 677-694 (1969).
14. Lu, P. W. T. Electrochemical-Ellipsometric Studies of Oxide Film Formed on Nickel during Oxygen Evolution. *Journal of The Electrochemical Society* 125, 1416 (1978).

What is claimed is:
1. A nanoelectrode system for generating hydrogen from water, comprising:
   an anode comprising multiple prongs; and
   a cathode,
   wherein the anode and the cathode are separated by a distance of 10 nm 40 nm.
2. The system of claim 1, further comprising a dielectric material situated between the anode and the cathode, wherein the dielectric material is 10 nm 40 nm thick.
3. The system of claim 2, wherein the system has a metal-insulator-metal (MIM) structure.
4. The system of claim 2, wherein the dielectric material comprises silicon nitride.
5. The system of claim 2, further comprising a substrate in contact with the cathode.
6. The system of claim 5, wherein the substrate comprises silicon.
7. The system of claim 2, wherein the system is a vertical nanoelectrode system.
8. The system of claim 1, wherein a portion of the anode is coated with a dielectric material.
9. The system of claim 1, wherein the cathode comprises a metal.
10. The system of claim 9, wherein the metal is Ti or Pt, or a combination thereof.
11. The system of claim 1, wherein the anode comprises a metal.
12. The system of claim 11, wherein the metal is Ti, Au, Ni, or indium-tin-oxide (ITO), or a combination thereof.
13. The system of claim 1, further comprising water.
14. The system of claim 13, wherein the water does not have electrolytes.
15. A method for generating hydrogen from water, comprising: applying an electric current to the system of claim 13 so as to create an electric field between the anode and cathode and thereby generating hydrogen from the water.
16. The system of claim 1, wherein the system is a horizontal nanoelectrode system.
17. The system of claim 1, wherein the cathode comprises multiple prongs.
18. The system of claim 1, comprising at least two anodes, each anode comprising multiple prongs.
19. A composition for generating hydrogen from water, comprising: an anode comprising multiple prongs, a cathode, a substrate in contact with the cathode, and a dielectric material situated between the anode and the cathode, wherein the dielectric material is 10 nm-40 nm thick.
20. A method for fabricating a nanoelectrode device, comprising:
   depositing a cathode metal on a substrate to provide a cathode;
   depositing a dielectric material on said cathode, wherein said dielectric material is 10 nm-40 nm thick;
   depositing an anode metal on said dielectric material to provide an anode, wherein the anode comprises multiple prongs; and
   etching the dielectric material.
21. The method of claim 20, wherein the etching comprises using a low-DC bias reactive-ion etching (RIE) process.

* * * * *